June 26, 1962 A. H. FAULKNER 3,041,400

ELECTRONIC SWITCHING SYSTEM

Filed Jan. 6, 1958 24 Sheets-Sheet 1

INVENTOR.
ALFRED H. FAULKNER

BY C. A. Gulbrandsen

ATTY.

INVENTOR.
ALFRED H. FAULKNER
BY C. A. Gulbrandsen
ATTY.

INVENTOR.
ALFRED H. FAULKNER
BY
C. A. Gulbrandsen
ATTY.

INVENTOR.
ALFRED H. FAULKNER
BY C. A. Gulbrandsen
ATTY.

June 26, 1962 A. H. FAULKNER 3,041,400

ELECTRONIC SWITCHING SYSTEM

Filed Jan. 6, 1958 24 Sheets-Sheet 5

INVENTOR.
ALFRED H. FAULKNER

BY
C. A. Gulbrandsen
ATTY

INVENTOR.
ALFRED H. FAULKNER
BY
C. A. Gulbrandsen
ATTY.

June 26, 1962 A. H. FAULKNER 3,041,400

ELECTRONIC SWITCHING SYSTEM

Filed Jan. 6, 1958 24 Sheets-Sheet 7

INVENTOR.
ALFRED H. FAULKNER

BY C. A. Gulbrandsen

ATTY.

INVENTOR.
ALFRED H. FAULKNER
BY
C. A. Gulbrandsen
ATTY.

INVENTOR.
ALFRED H. FAULKNER
BY
C. A. Gulbrandsen
ATTY.

INVENTOR.
ALFRED H. FAULKNER
BY
ATTY.

June 26, 1962 A. H. FAULKNER 3,041,400

ELECTRONIC SWITCHING SYSTEM

Filed Jan. 6, 1958 24 Sheets-Sheet 11

INVENTOR.
ALFRED H. FAULKNER

BY C. A. Gulbrandsen

ATTY.

June 26, 1962 A. H. FAULKNER 3,041,400

ELECTRONIC SWITCHING SYSTEM

Filed Jan. 6, 1958 24 Sheets-Sheet 12

INVENTOR.
ALFRED H. FAULKNER

BY C. A. Gulbrandsen

ATTY.

INVENTOR.
ALFRED H. FAULKNER
BY C. A. Gulbrandsen
ATTY.

INVENTOR.
ALFRED H. FAULKNER
BY
C. A. Gulbrandsen
ATTY.

INVENTOR.
ALFRED H. FAULKNER
BY
C. A. Gulbrandsen
ATTY.

INVENTOR.
ALFRED H. FAULKNER
BY C. A. Gulbrandsen
ATTY.

INVENTOR.
ALFRED H. FAULKNER
BY C. A. Gulbrandsen
ATTY.

June 26, 1962 A. H. FAULKNER 3,041,400

ELECTRONIC SWITCHING SYSTEM

Filed Jan. 6, 1958 24 Sheets-Sheet 18

INVENTOR.
ALFRED H. FAULKNER
BY
C. A. Gulbrandsen
ATTY.

June 26, 1962 A. H. FAULKNER 3,041,400

ELECTRONIC SWITCHING SYSTEM

Filed Jan. 6, 1958 24 Sheets-Sheet 19

INVENTOR.
ALFRED H. FAULKNER
BY
C. A. Gulbrandsen
ATTY.

INVENTOR.
ALFRED H. FAULKNER
BY C. A. Gulbrandsen
ATTY.

INVENTOR.
ALFRED H. FAULKNER
BY
C. A. Gulbrandsen
ATTY.

INVENTOR.
ALFRED H. FAULKNER
BY
C. A. Gulbrandsen
ATTY.

INVENTOR.
ALFRED H. FAULKNER
BY
C. A. Gulbrandsen
ATTY.

INVENTOR.
ALFRED H. FAULKNER
BY
C. A. Gulbrandsen
ATTY.

United States Patent Office 3,041,400

Patented June 26, 1962

3,041,400
ELECTRONIC SWITCHING SYSTEM

Alfred H. Faulkner, Redondo Beach, Calif., assignor to Automatic Electric Laboratories, Inc., a corporation of Delaware Filed Jan. 6, 1958, Ser. No. 707,298
31 Claims. (Cl. 179—15)

The invention relates in general to electronic switching systems especially for purposes of telephone communication. More particularly the invention relates to time division multiplex systems which is a well-known transmission technique for concentrating a number of communication terminals to one transmission channel.

Basically the embodiment of the invention herein disclosed is a 10 line electronic telephone system equipped with three links, wherein time division multiplexing is employed for both the voice transmission and control circuits. All of the circuitry is fully transistorized and the subscriber station equipment is conventional, except that tone signalling is used in lieu of the usual ringer.

Because of the inherent difficulty of two way transmission over the same common highway, multiplex-type telephone systems conventionally employ one highway for the transmission of signals, such as speech signals, in one direction and a separate highway for the transmission of signals in the opposite direction. Proposals for two way transmission over the same highway have been made, but these transmission arrangements were relatively complex. With these problems in mind, I have developed a simple and effective system for two way communication over the same highway. Reference is made in this connection to my copending application Serial No. 530,085, filed August 23, 1955, now Patent No. 2,931,863, and Serial No. 548,611, filed November 3, 1955, now Patent No. 2,854,516. The system shown in the present application contains a number of improvements over said formerly filed application.

Accordingly, it is the principal object of my invention to provide an improved automatic telephone system, of the time-division multiplex type, for selectively establishing a two-way communication path between any two lines in the system by way of a common highway interconnecting said lines.

Another object of the invention is to provide an improved method of selecting the called line responsive to digital impulses transmitted from the calling line.

Another object of the invention is to provide an improved circuit arrangement for ringing the called line.

A further object of the invention is to provide an improved circuit arrangement for controlling the supervision and signalling of the calling and called lines.

One feature of the invention is the provision of a transmission gate at each end of the common transmission highway, with a constant voltage diode connected in said highway, the transmission of signals being accomplished by transferring potential by way of said diode from one gate to another, depending on the direction of transmission of said signals.

Other objects and features of the invention will be understood from an examination of the following description, taken in conjunction with the following drawings, in which:

FIG. 1 is a trunking diagram of the electronic telephone system shown herein by way of example, only two line circuits out of the ten being shown in FIG. 1.

FIGS. 2, 3, 4A, and 4B arranged in the manner shown in FIG. 24 illustrate the details of two of the line circuits and the line-link common equipment. Also one of the link circuits is diagrammatically illustrated. This series of drawings is used to explain the overall operation of the system, FIG. 1.

FIGS. 5 to 20 inclusive, when arranged in the manner shown in FIG. 25 illustrate the details of the system outlined in FIGS. 1 to 4B. FIGS. 5 and 6 have numerals beginning with 2 and 3 and that is because these numerals are identical with those of FIGS. 2 and 3.

GENERAL OPERATION

This system employs a time division multiplex arrangement having a time slot per line. Each time slot provides two-way transmission between its line circuit and a link. In each link, the line finder and the connector each includes a delay line with an arrangement for coupling the delay-line output and input to circulate pulses. These pulses are used in conjunction with distributor pulses to control the multiplex transmission, and are also used for various other functions. During a connection, the circulating delay lines of the line finder and the connector deliver output pulses respectively in the time slots of the calling and the called lines.

In operation, one of the idle links is allotted for the next call. Scanning pulses are transmitted through the line finder delay line of the allotted link to the line circuits. Detection of a calling condition on a line causes the delay line of the finder to circulate pulses in the time slot of the calling line, and the corresponding delay line of the connector to circulate pulses in time slot zero.

Conventional dial impulses are transmitted from the calling station to its line circuit, and from there over a multiplex control connection to the link. Each dial impulse causes the circulating pulses in the connector delay line to be advanced one time slot, by means of an auxiliary delay line, from zero to one, and then to succeeding time positions; so that at the end of the dialled digit these circulating pulses are in the time slot of the called line.

The busy test, switch through, ringing, and answer then occur in succession. Release of both lines at the termination of a call blocks further circulation of pulses in the delay lines of both the finder and the connector.

GENERAL IDENTIFICATION OF THE SYSTEM

Figure 1:
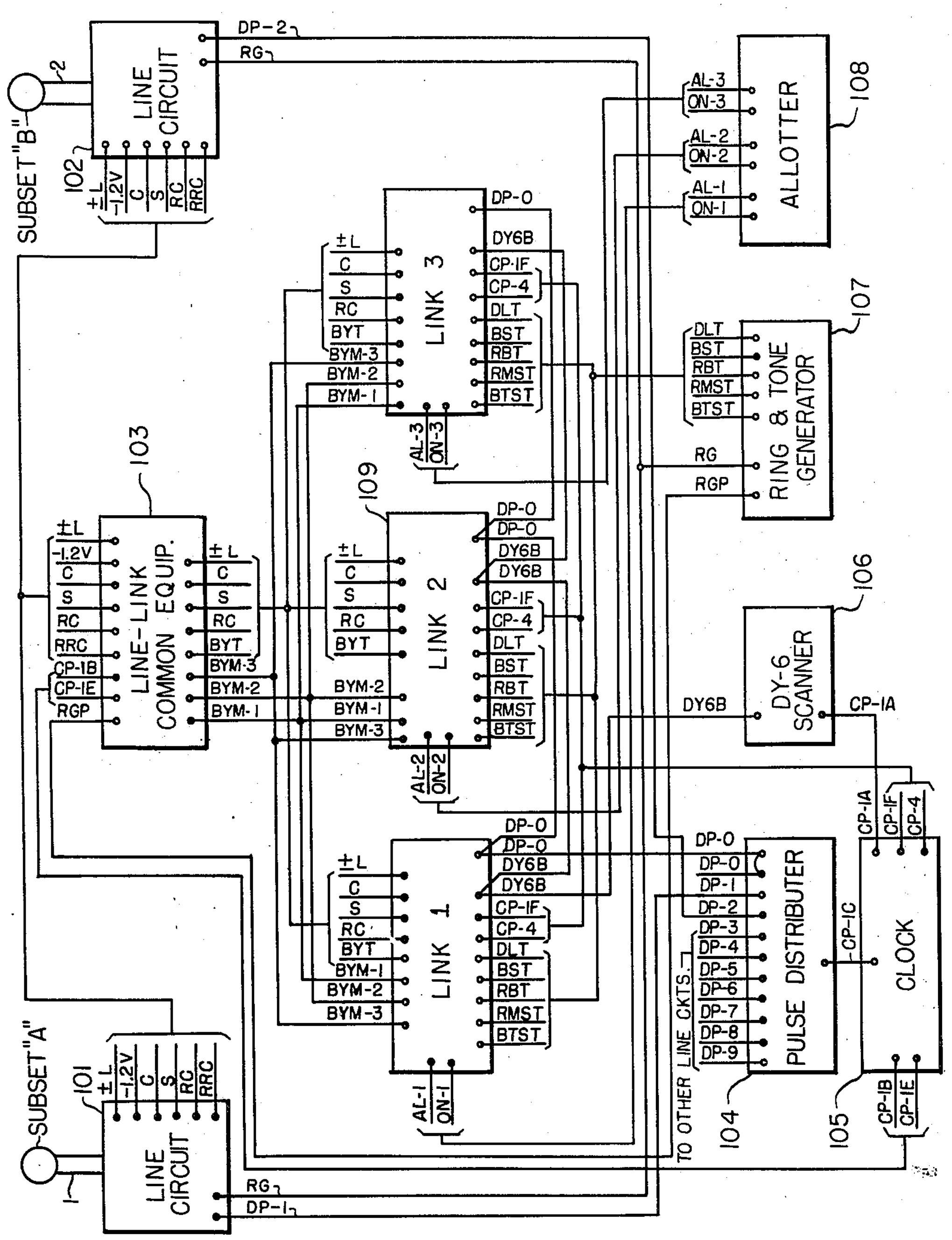
Figure 2:
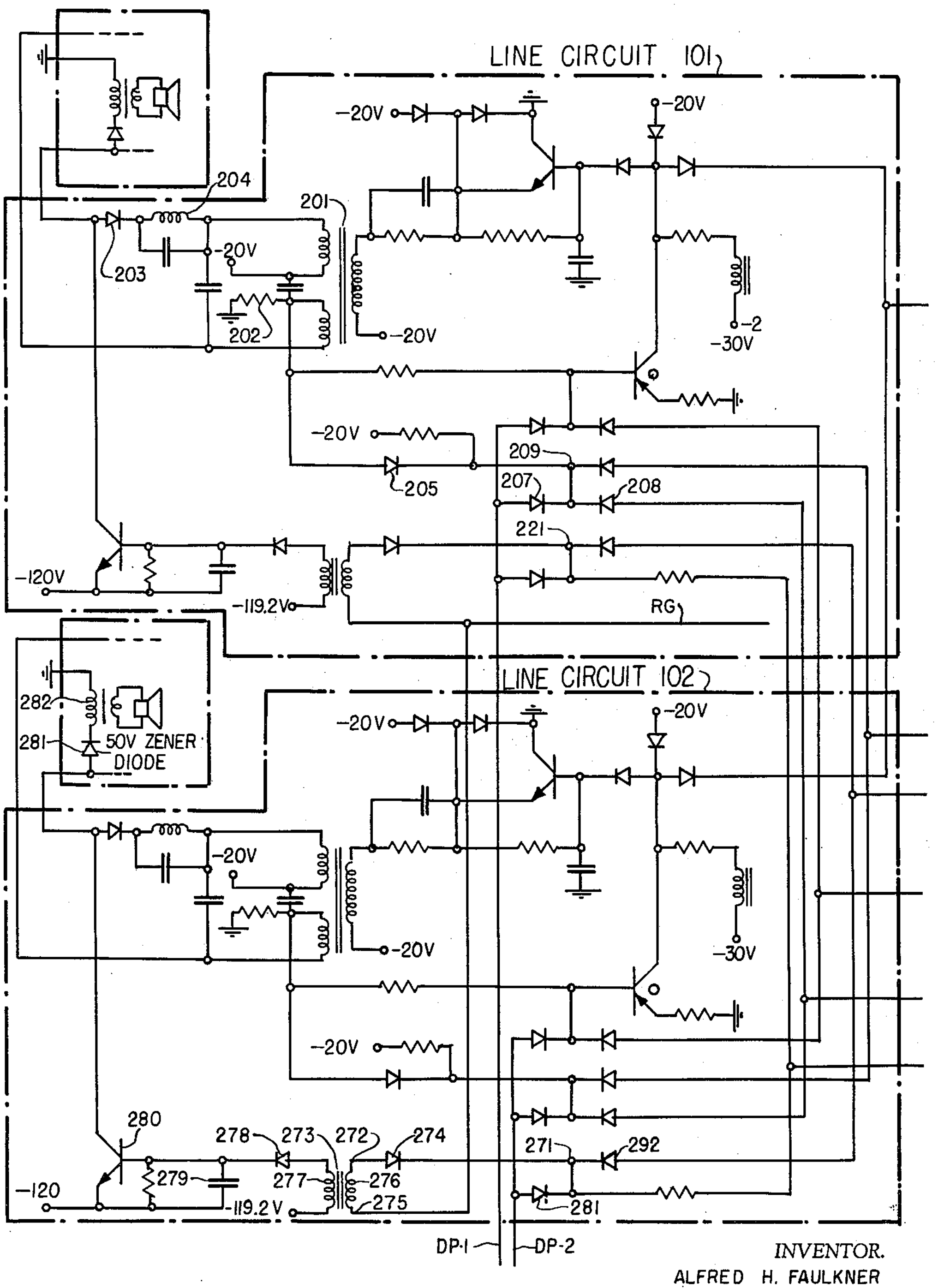
Figure 3:
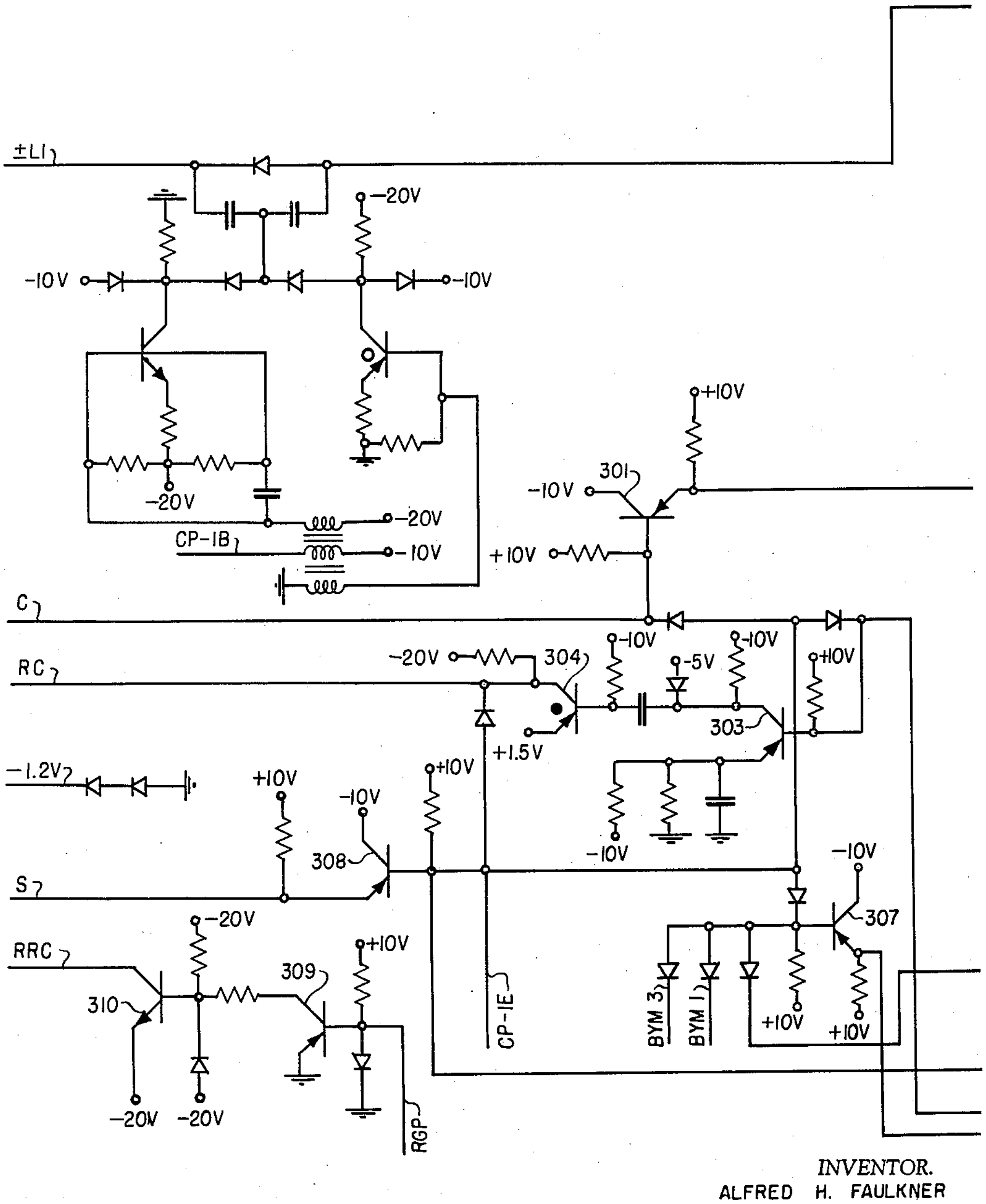

FIG. 1 shows the entire system except that only two line circuits have been illustrated. The present embodiment of the system is a design for 10 lines although it could be expanded to a greater number within the scope of the invention.

The two line circuits 101 and 102 shown in FIG. 1 are associated with subsets "A" and "B" and connected thereto by lines 1 and 2.

All the line circuits of the system are connected in common to the line-link common equipment as shown, and also in common to lead RG of the ring and tone generator. Each line circuit has a connection individual to itself and connected to the pulse distributor. Thus leads DP–1 to DP–0 are the leads over which each line circuit is assigned its particular time slot in the time division multiplex system.

Lead ±L is the common highway of the system over which all the intelligence of the system except for the ringing is transmitted. Lead −1.2 v. is used for clamping and, for convenience, the diodes associated therewith are placed in the line-link common equipment as will be explained later. Lead C and lead S are control leads over which a link is seized and dialling occurs. Leads RC and RRC are control leads over which ringing is controlled.

The line-link common equipment 103 performs various functions such as amplifying pulses transmitted between the link and line circuits of the system and also clamps the common highway between pulse periods to prevent cross talk.

Lead RGP is associated with the ring and tone generator and is instrumental in subscriber ringing. Lead BYT and leads BYM–1, BYM–2, BYM–3 which are respectively associated with the three link circuits are utilized to prevent the calling line from seizing more than one link. Lead CP–1E is utilized to produce sharper pulses on leads C, RC, S and BYT, and lead CP–1B has a pulse impressed thereon which helps prevent cross talk.

There are three links shown in this system which are identical and which introduce dial tone, busy tone and ring back tone into the transmission system over leads DLT, BST, and RBT respectively.

A signal on lead BTST starts busy tone on the busy tone lead BST. Lead RMST starts the ringing generator in the ring and tone generator circuit. Leads CP–4 and CP–1F shape and synchronize the pulses in the time slots which are admitted to a link circuit. Leads AL–1 to AL–3 and ON–1 to ON–3 are from the allotter and determine which link will be assigned to the next calling subscriber.

The allotter circuit itself is a ring-of-three counting chain arranged to allot a call to an idle link.

The pulse distributor circuit feeds pulses to the line circuits in their assigned time slot over the leads DP–1 to DP–0. Also lead DP–0 is connected to the links for dialling purposes.

The clock circuit is essentially an oscillator which produces variously spaced pulses which control timing and pulse generating circuits.

The DY–6 scanner introduces a 1.5 microsecond pulse every 22 microseconds over lead DY6B into the links whereby the links scan the line circuits and test for a calling line.

The ring and tone generator circuit produces dial tone over lead DLT, busy tone over lead BST, and ring back tone over lead RBT. Leads RG and RGP are utilized to provide ringing to the line circuits.

Figure 4A:
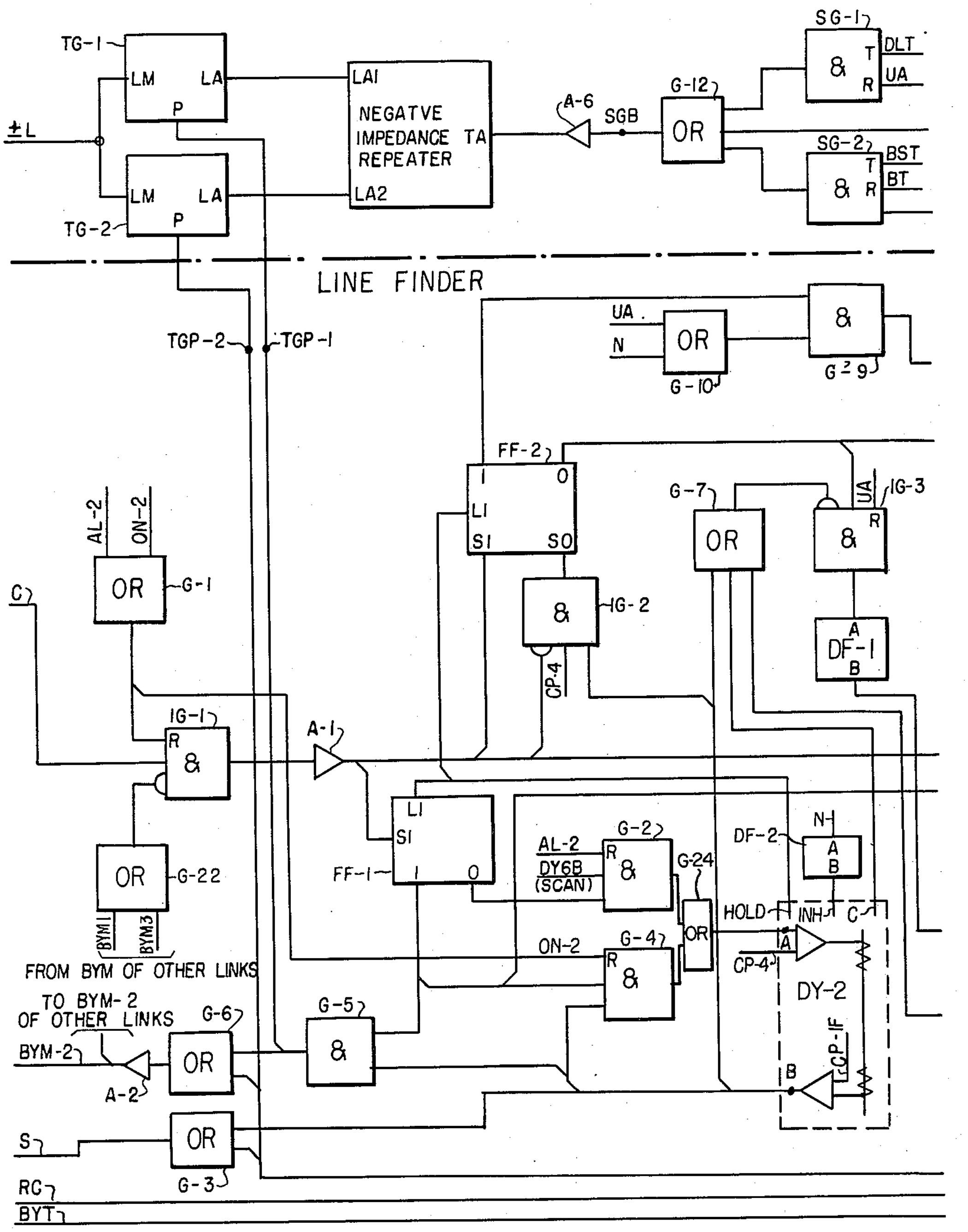
Figure 4B:
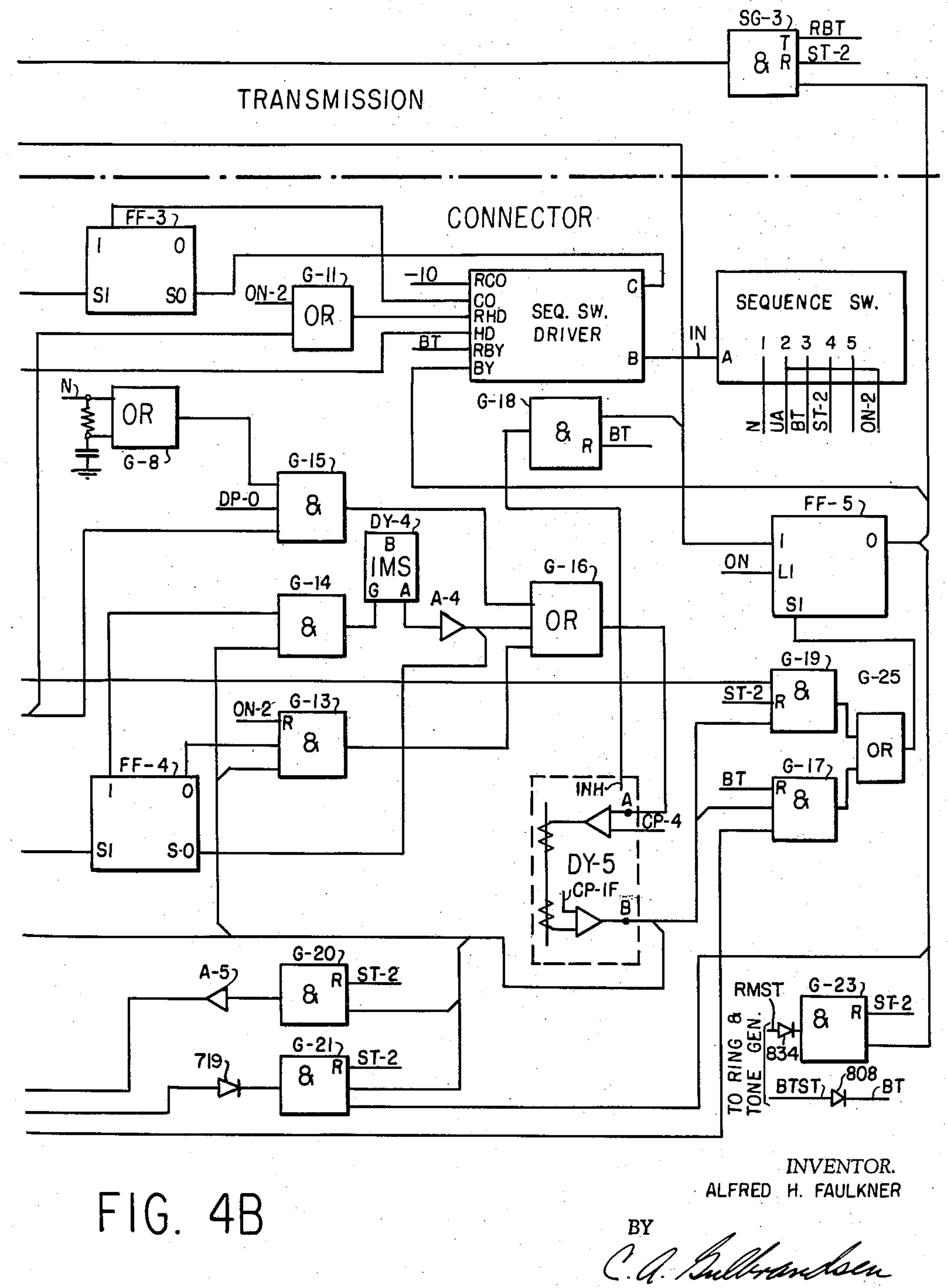

One of the links is shown in functional block diagram form in FIGS. 4A and 4B. The logic gates G–1 to G–25 may be of the type having a diode connected between each input lead and the common output lead, and having a resistor connected from the output lead to a source of D.C. potential; except that in some of the "and" gates this resistor is connected in place of a diode between the output lead and one of the input leads designated R, the D.C. potential being applied from an external source to this input. The "and" gates have ground potential at the output until all the inputs are negative, then the output is negative; and the "or" gates have the output at ground potential until any one input is negative, then the output is negative. The gates IG–1 to IG–3 are "and" gates, except that one of the inputs designated by a semi-circle is an inhibit lead. A negative signal on this inhibit lead blocks negative input pulses at the other inputs from reaching the output.

The signal gates SG–1 to SG–3 pass a tone signal at input T when negative signals are applied simultaneously to the other input leads.

The transmission gates TG–1 and TG–2 control the transmission of signals in both directions between audio at lead LA and time division multiplex at lead LM in a time slot of control pulses applied to terminal P. The negative impedance repeater amplifies signals in both directions between the LA leads, and also couples signals from the lead TA to one of the transmission gates.

Amplifiers are represented by a triangular form.

The differentiating circuits DF–1 and DF–2 are circuits including a series condenser and a shunt resistor for converting a change of potential at the input A to a pulse at the output B.

Each of the flip-flop circuits FF–1 to FF–5 has up to five external connections, leads S0, S1, 1, 0, and L1. Normally a negative potential is present on the lead L1, in which case a pulse on the S1 lead places a negative potential on lead 1 and removes it from lead 0, and conversely a pulse on the lead S0 places negative potential on lead 0 and removes it from lead 1. If a negative potential does not appear on lead L1, then the flip-flop cannot be set to have a negative potential on lead 1.

If a pulse of over 20 microseconds duration is placed upon either lead S1 or S0 when the other is at constant potential, the flip-flop will reset itself. That is, a pulse of over 20 microseconds in duration on lead S1 will cause a negative potential to be placed on lead 1 at the beginning of the pulse and ground to be placed on lead 1 at the end of the pulse. However, a differentiating circuit placed in the S1 lead will prevent the flip-flop from resetting itself regardless of the pulse duration. Since the flip-flop circuit is symmetrical, a similar action will occur with a pulse of over 20 microseconds duration on lead S0.

Summarizing for the flip-flops, a pulse of less than 20 microseconds in duration on lead S0 causes negative potential to be placed on lead 0, and ground on lead 1 and a pulse of less than 20 microseconds on lead S1 causes a negative potential to be placed on lead 1 and ground on lead 0. This assumes a negative potential on lead L1 which is the normal condition, but if the negative potential does not appear on lead L1, then negative potential cannot appear on lead 1. If a pulse of over approximately 20 microseconds appears on lead S0 or S1 then the flip-flop will reset itself at the end of the pulse.

The circuits DY–2 and DY–5 are magnetostriction delay lines. They comprise a nickel tube with a transmitting coil and a receiving coil wound thereon. A blocking oscillator circuit feeds an electrical impulse to the transmitting coil responsive to an input pulse at terminal A, and an electrical circuit associated with the receiving coil shapes and forms the pulse and transmits it to the output terminal D. The pulses are synchronized by clock pulses applied to the lead CP–4. Delay is obtained by the time required for a mechanical pulse to travel in the nickel tube from the transmitting coil to the receiving coil. Thus, a pulse at input A results in a regenerated pulse at output B delayed a given time.

These magnetostriction delay lines are also provided with auxiliary features. A negative potential on the inhibit lead INH blocks output at B. In delay line DY–2, a negative potential is produced on the hold lead by a train of pulses recirculated in the delay line. A negative potential is placed on lead C during the time that there is a pulse at input A.

Circuit DY–4 is a wire wound electrical delay line having a shield extending the length of the line. The terminals A and B are the opposite ends of the wire, and terminal G is connected to the shield. This is a one microsecond delay line which is open circuited at the terminal B. Therefore, a pulse is reflected to provide a total delay of 2 microseconds.

The sequence switch driver performs the function of generating pulses for advancing the sequence switch. Simultaneous −10 volt input signals on hold lead HD and resistance input to hold gate RHD causes −10 volt pulses delayed an interval of T1 microseconds on terminal B and simultaneously −5 volt pulses on lead C to be generated. Similar delayed pulses, delayed by intervals of T2 and T3 microseconds are generated when −10 volts is applied simultaneously to changeover leads CO and RCO or busy test leads BY and RBY. The time duration T1 is greater than T2 which is greater than T3.

The sequence switch circuit has five steady state conditions and it is in its home or normal position when negative potential appears on lead N. An input pulse on lead A causes the negative potential condition to advance to lead UA and a subsequent pulse on lead A will cause the negative potential condition to advance to lead BT and so on until it reaches its home position again and the cycle has been completed. When the negative potential condition is advanced to lead UA, there is also a negative potential condition on lead ON and that condition remains there as long as the circuit is not in its home or normal position.

Detailed schematic diagrams of all of the circuits are shown in FIGS. 5–20, and described in the detailed description.

OVERALL OPERATION OF THE SYSTEM

*Seizure of a Calling Line*

The operation of the system will be described with reference to FIGS. 2, 3, 4A, and 4B. The common equipment, including the pulse distributor, clock, DY–6 scanner, ring and tone generator, and allotter are not shown but leads which are associated with any of these circuits are so marked.

Functional symbols are employed to describe the operation of the link circuit while the details of the line circuits and line-link common equipment are shown.

Let us assume that the allotter has assigned link 2 to be seized by the next calling party. For an explanation of this process see the section titled "Allotter." A potential of −10 volts then appears on lead AL–2. The DY–6 scanner places a negative output pulse on lead DY6B every 22 microseconds as will become clearer by reference to the section titled, "DY–6 Scanner." Flip-flop FF1 (FIG. 4A) is in its "flop" position which means that the 0 lead of FF1 will have −10 volts thereon, it being assumed that the normal position is the "flop" position; see the section titled "Flip-Flop." Therefore, it can be seen in FIG. 4A at gates G–2 and G–24 that a pulse will be gated through to lead A of delay line DY–2 every 22 microseconds. This pulse is of the same shape and phase as the pulse on lead DY6B, see FIG. 21 for the relationship of the pulse on DY6B with the other pulses in the system.

This pulse is fed into delay line DY–2 and emerges 20 microseconds later at lead B of delay line DY–2. For details see the section titled "Delay Line DY–2." This pulse is fed through gate G–3 to lead S, therefrom into the line-link common equipment and into the base of transistor 308 which is an impedance matcher as explained in the section titled, "Line-Link Common Equipment," and from there the pulse travels to all the line circuits over lead S but there is no effect at this time. As can be seen, one line circuit is scanned every 22 microseconds or in other words a pulse appears in a new time slot every 22 microseconds. Therefore each line circuit is simultaneously pulsed by the pulse-distributor and the scanner only once every 220 microseconds or 4550 per second.

Figure 21:
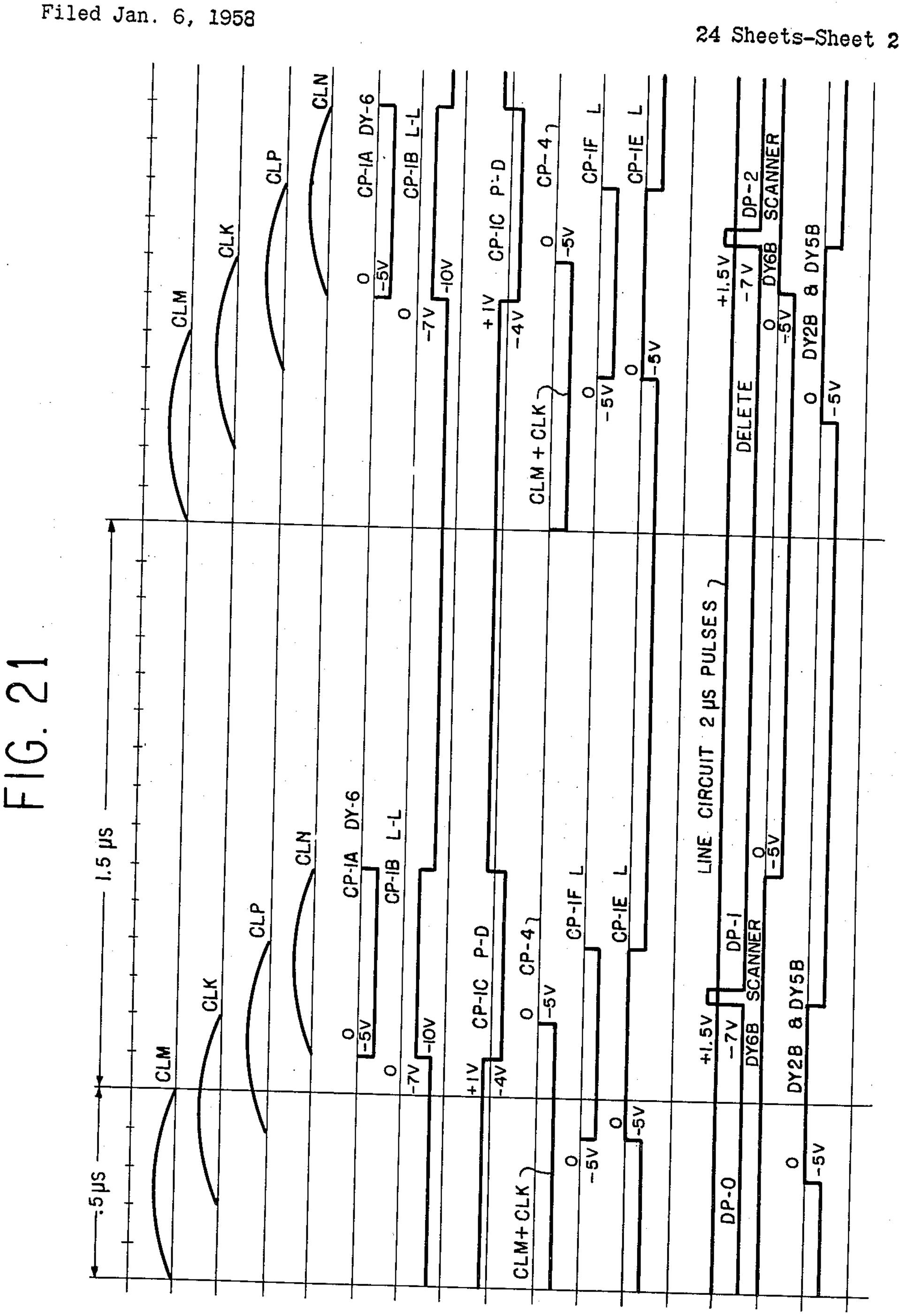
FIG. 21 illustrates the approximate shape and time relationship of the various pulses of the system.

The pulse distributor sends a pulse to each line circuit in its time slot every 20 microseconds; see section titled, "Pulse Distributor." See FIG. 21 for space relation of the pulse on lead DP–1. The remainder of the pulses on leads DP–2 to DP–0 are the same but only 2 microseconds apart.

Even when a pulse appears on lead S at the same time that a pulse appears on a DP—N lead, for instance lead DP–1, there will be no effect on the system until the calling party initiates the call. Let us assume that the calling party is at subset "A" which is connected to line circuit 101 by line 1.

When the calling party initiates a call, a circuit is completed from ground through resistor 202, a winding on transformer 201, the calling party's line loop, diode 203, inductor 204, and a second winding on transformer 201 to —20 volts. The loop resistance is compensated in the calling party's subset "A" and all other subsets to provide a line circuit of 30 milliamperes. Thus there is a 10 volt drop across resistor 202 which appears across diode 205 biasing it in the reverse direction. Point 209 remains near ground, however, due to the shunt paths through diode 207 and 208 to ground on leads DP–1 and S respectively. Actually there is approximately +1.5 volts on lead DP–1 and that is explained in the section titled, "Pulse Distributor."

When the calling party has initiated the call by closing the subscriber loop circuit and a pulse appears simultaneously on leads S and DP–1, then point 209 swings to −5 volts and transmits a pulse over lead C to the preselected link, which is link 2 in this example. The pulse is sent through an emitter follower amplifier associated with transistor 301 in the line-link common equipment where impedance matching occurs as explained in the section titled, "Line-Link Common Equipment." From there the pulse is transmitted to inhibit gate IG–1 of link 2.

Since the allotter has preselected link 2, −10 volts appears on lead AL–2 and that is gated through gate G–1 to gate IG–1. The gate IG–1 therefore opens when the first pulse arrives on lead C and that pulse is therefrom fed to amplifier A–1, and from there to flip-flop FF1 lead S–1. This flips flip-flop FF1 which removes −10 volts from lead 0 and places −10 volts on lead 1 causing gate G–2 to close. Gate G–4 now opens as a negative voltage is placed on lead ON–2, as will be seen later, and on lead 1 of flip-flop FF1, and also because of the pulse on lead DY2B which is the scanning pulse just described.

Therefore the pulse on DY2B is fed back to the input lead DY2A through gates G–4 and G–24 and a pulse in time slot 1 corresponding to the calling party will circulate in the delay line DY–2.

The recirculation pulses are also sent to gate G–5 which is now opened by these pulses because −10 volts appears on lead 1 of flip-flop FF1. From gate G–5 the pulses are sent to the calling party transmission gate TG–1 which is described in the section titled "Transmission." These pulses are also sent to and through gate G–6 and amplifier A–2 to the busy mark amplifier associated with transistor 307 as is described in the section titled "Line-Link Common Equipment." The pulses which emerge from the busy mark amplifier are fed back to the links over lead BYT to gate G–17 of each link where they are used in testing for a busy called party as will be seen later.

The recirculating pulses which emerge from amplifier A–2 are also fed to the other links over lead BYM–2 to gate G–22 of the other links where they are used to block the seizure of the other links by the same calling party.

The recirculating pulses are also sent through gate G–3 to lead S and from lead S to diode 208 where these pulses arrive simultaneously with the pulses on lead DP–1. Thus, the line circuit associated with line 1 or the calling party line is connected to link 2, since the pulses on leads DP–1 and S thereafter occur simultaneously, at 20 microsecond intervals.

The first pulse on lead C which initiated the foregoing also was fed to flip-flop FF2 lead S–1 where it flipped flip-flop FF2 thus causing −10 volts to be removed from lead 0 and placed on lead 1 of flip-flop FF2. This causes a step voltage to be applied through gate G–9 to input S–1 of flip-flop FF3. Gate G–9 is opened by the step voltage from flip-flop FF2 because there is a negative voltage on lead N at this time, which will be seen later, thus enabling gate G–9 to pass a step voltage.

Flip-flop FF3 therefore flips and a step voltage is generated at lead 1 of flip-flop FF3 and applied to input CO of the sequence switch driver causing it to generate a pulse at each of its outputs B and C after a brief delay. For details see the section titled "Sequence Switch Driver." The pulse on lead C of the sequence switch driver flops flip-flop FF3, resetting it. The pulse on lead B of the sequence switch driver is fed to the input A of the sequence switch, and causes the sequence switch to advance from its N or normal position to the UA position. See the section titled, "Sequence Switch," for details of operation. This also results in —10 volts being removed from lead N and being placed on lead ON–2 which causes the allotter to advance, which removes —10 volts from lead AL–2. Gates G–4 and IG–1 receive —10 volts through gate G–1 from lead ON–2 in place of lead AL–2.

When flip-flop FF1 flipped, it also opened gate G–15 to permit pulses on lead DP–0 in the "0" time slot to pass through gate G–15 and G–16 to the input A of delay line DY–5, causing it to generate pulses at its output lead B, which are in the "0" time slot. These output pulses have no effect at this time. Following the brief delay introduced in the sequence switch driver the sequence switch transferred —10 volts from lead N to lead ON–2 thereby closing gate G–15 and opening gate G–13 to complete a recirculating path from output lead B of delay line DY–5 to the input A of delay line DY–5 through gates G–13 and G–16. Therefore relay line DY–5 continues to generate pulses at output B in time slot "0" independently of the pulse distributor lead DP–0.

With the sequence switch in position UA, —10 volts is applied to the signal gate SG–1 enabling the signal gate SG–1 to transmit dial tone from lead DLT through gate G–12 and amplifier A–6 to the negative impedance repeater and thence through the transmission gate TG–1 to the calling party's line over the voice transmission common highway that being lead ±L as is explained in the section titled "Transmission." The link is now prepared to receive dial impulses.

When the calling party dials and the calling line is opened by the dial impulses the point 209 is clamped to ground through diode 205 and resistor 202, thus interrupting the train of pulses on lead C in time slot 1 for the duration of the dial impulse. In the absence of these pulses, inhibit gate IG–2 passes the pulses which are on lead B of delay line DY–2 to the input S–0 of flip-flop FF2 causing it to flop which in turn flips flip-flop FF4 through inhibit gate IG–3 and the differentiating circuit DF–1.

The —10 volts which is on lead 1 of flip-flop FF4 when it is in its flipped position opens gate G–14 to the output pulses of delay line DY–5 and ground on lead 0 of flip-flop FF4 closes gate G–13 which interrupts the recirculating path previously mentioned. The next output from lead B of delay line DY–5 passes through gate G–14 to delay line DY–4 which is a 2 microsecond delay line, since the pulse travels the length of delay line DY–4 in one microsecond, is reflected at the open-circuited end, and returns to the input after a total delay of 2 microseconds. The reflected pulse passes through amplifier A–4 and gate G–16 to the input A of delay line DY–5 to trigger it in time slot 1. The pulse from amplifier A–4 also flops flip-flop FF4 which opens gate G–13 and close gate G–14. The recirculating pulse in delay line DY–5 now recirculates in time slot 1 instead of time slot "0."

At the end of the first dial impulse, the calling party's line is closed and, as a result, pulses in the calling party's time slot 1, again appear on lead C. This occurs because point 209 is no longer clamped to ground through diode 205 and resistor 202. These pulses cause inhibit gate IG–2 to block pulses from lead B of delay line DY–2 and the first of the pulses flips flip-flop FF2 which in turn flips flip-flop FF3. Flip-flop FF3 applies —10 volts to input CO of the sequence switch driver but not long enough to cause the sequence switch driver to operate before the next impulse, if any, of the dialled digit is received.

At the start of the second impulse, the calling party's line is opened, again clamping point 209 to ground and interrupting the pulses on lead C. Flip-flop FF2 is flopped again to cause the pulse in delay line DY–5 to advance to time slot 2 in the same manner as described for the first dial impulse. Thus the pulse which recirculates in delay line DY–5 is advanced one time slot for each dial impulse.

When flip-flop FF2 flops at the start of a dial impulse it causes flip-flop FF3 to flop also as can be understood by reference to the section titled "Flip-Flop," thus preventing operation of the sequence switch driver during the series of impulses because the voltage present at lead CO of sequence switch driver is not held there long enough to enable the sequence switch driver to generate a pulse at B to advance the sequence switch. See the section titled "Sequence Switch Driver" for details of operation of the sequence switch driver. Flip-flops FF2 and FF3, in turn, flip at the end of each impulse, as described previously.

*Busy Test*

After the last impulses of the dialled digit has been received, and let us assume that the called party corresponds to the dialled digit 2 and therefore after two dial impulses have been received, flip-flop FF3 remains flipped, thus causing the sequence switch driver to generate a pulse, after a brief delay, and advance the sequence switch to its busy test position, BT. Then position UA has ground thereon which blocks inhibit gate IG–3 to prevent further operation of flip-flop FF4 and ground on positions UA and N blocks gate G–9 which prevents further operation of flip-flop FF3.

The voltage on lead BT is applied to input RBY of the sequence switch driver thus preparing the sequence switch driver for busy test. See the section titled, "Sequence Switch Driver," for details. The voltage on lead BT also opens gate G–17 to coincident pulses from lead BYT and delay line DY–5. In the event the called line is busy, a pulse in the called line's time slot will appear on lead BYT coincident with the pulse circulating in delay line DY–5. If this is the case then gate G–17 will open and a pulse will pass through gates G–17 and G–25 and flip flip-flop FF5. This places —10 volts on lead 1 and ground on lead 0 of flip-flop FF5. The ground on lead 0 of flip-flop FF5 is sent to the input BY where it prevents the sequence switch driver from generating a pulse which would advance the sequence switch at this time.

The —10 volts on lead BT enables gate G–18 to pass the step voltage on lead 1 of flip-flop FF5 to the inhibit input INH to stop the circulating pulses in delay line DY–5. See the section titled "Delay Line DY–5" for details. At the same time, the step voltage from flip-flop FF5 lead 1 opens supervisory gate SG–2 to transmit busy tone to the calling party through gate G–12, amplifier A–6, the negative impedance repeater, and the transmission system to the calling party in the same manner as dial tone. Busy tone appeared on lead BST because the —10 volts on lead BT was sent through diode 808 to lead BTST thereby causing the busy tone to be placed on lead BST. See the section titled, "Dial and Busy Tone Generator," for details. Release from a busy condition is similar to release from a completed call condition and is readily ascertained by reference to the section titled, "Release."

*Switch Through*

If the called line is not busy there is no output from gate G–17 during the busy test interval. Therefore —10 volts remains on lead 0 of flip-flop FF5 and is fed to input BY of the sequence switch driver and this now enables the sequence switch driver to generate a pulse, after a brief delay, which advances the sequence switch to its switch through position ST–2. This action grounds lead BT to prevent further generation of pulses by the sequence switch driver and closes gates G–17 and G–18.

The —10 volts on lead ST–2 permits the pulse circulating in delay line DY–5 to pass through gate G–20, amplifier A–5, gate G–6, amplifier A–2 to lead BYM–2, and back through the busy mark amplifier in the line-link common equipment to the busy mark lead BYT, to mark the called line busy. The pulses from delay line DY–5 emerging from amplifier A–5 also flow through gate G–3 to lead S and to input P of transmission gate TG–2 to prepare a transmission path to the called line circuit.

*Ringing*

The −10 volts on lead ST–2 also opens gate G–21 to pass pulses from lead B of delay line DY–5, through diode 719 to lead RC. The pulses in the called line time slot on lead RC are transmitted through the amplifier in the line-link common equipment associated with transistors 303 and 304 to point 271 in the line circuit 102 associated with the called line, and to all other similar points in the remaining line circuits. The input pulse to the amplifier associated with lead RC is −5 volts but the output pulse is an 8.5 volt pulse, going from +1.5 volts when the pulse is absent to −7 volts during the time the pulse is on. See the section titled, "Line-Link Common Equipment," for details. The −10 volts on lead ST–2 coupled with the −10 volts on lead 0 of flip-flop FF5 open gate G–23 and through diode 834 place approximately −10 volts on lead RMST. This starts the operation of the ringing generator which causes three different audio tones to be placed in sequence on lead RG. This sequence is repeated three times followed by a pause of about three seconds before the sequence is started again. Also current flows over lead RGP from the Ring and Tone Generator during the time that the sequence of tones appear on lead RG.

When the sequence of tones is being fed to the line circuit over lead RG, current flows over lead RGP to transistor 309 in the line-link common equipment, and causes transistor 309 to saturate, which in turn causes transistor 310 to saturate, to thereby place −20 volts on lead RRC. Therefore −20 volts is fed to all the line circuits over lead RRC.

For the duration of the coincidence pulses on leads DP–2 and RC, −5 to −7 volts is applied from point 271 to point 272 of transformer 273 through diode 274. Lead RG which is connected to terminal 275 of transformer 273 is alternately clamped to ground and raised to −10 volts at the ringing frequency rate as can be seen by references to the section titled, "Ringing and Tone Generator." Assuming that lead RG is clamped to ground the current flow in winding 276 of transformer 273 increases linearly at a rate determined by the applied voltage and the inductance of winding 276 of transformer 273, reaching 3 to 4 milliamps by the end of time slot 2.

The secondary winding 277 of transformer 273 is effectively open circuited at this time since the induced voltage biases diode 278 in the reverse direction because of the winding arrangement of transformer 273.

When the pulse on lead DP–2 expires it clamps point 271 to +1.5 volts through diode 281 as can be seen by reference to the section titled, "Pulse Distributor." The flux in transformer 273 now commences to decay, reversing the voltage induced in its secondary and hence causing a current to flow through diode 278 and the base-emitter path of transistor 280. The low forward resistance of this circuit beyond the characteristic knee limits the voltage across winding 277 of transformer 273 to between ½ and 1 volt. The flux therefore decays at only one-tenth the rate at which it rose during the input pulse.

The primary voltage is also limited by reason of the nature of the secondary load, hence diode 274 remains reverse biased. Current flows in the secondary winding 277 of transformer 273 for practically the entire 18 microsecond interval between successive input pulses.

Capacitor 279 smooths the wave form so as to provide a continuous drive to the base of transistor 280. The amplified current from the collector of transistor 280 flows over lead −L and a 50 volt Zener diode, 281, in subset "B" to ground through the speaker transformer 282. As can be seen, this current varies in accordance with the ringing signal on lead RG thereby producing an audible signal at subset "B."

The ring back tone as explained in the section titled "Ring and Tone Generator" is placed on lead RBT and since −10 volts is on lead ST–2, gate SG–3 opens and allows ring back tone to be sent into the transmission system in a similar manner as is the dial tone and busy tone previously mentioned.

*Answer*

When the called party answers, the −10 volts developed across resistor 252 by closure of the line loop causes a pulse train to be transmitted over lead C as has been described. These pulses arrive at gate G–19 coincident with those from delay line DY–5 and pass through gates G–19 and G–25 to flip-flop FF5. Ground on lead 0 of flip-flop FF5 closes gate G–21 to block pulses in the called party's time slot from reaching lead RC which causes ringing to be interrupted because diode 292 is not blocked any longer. Ground on lead 0 of flip-flop FF5 also blocks gate SG–3 which interrupts ring back tone.

*Transmission*

The calling party and the called party are now in a condition permitting a bi-directional exchange of information. The calling party at subset "A" will transmit and receive intelligence to and from the transmission section of the link circuit in its particular assigned time slot and the called party at subset "B" will do likewise in its particular assigned time slot. The intelligence transmitted by the calling party must be stored in the transmission section of the link circuit until the called party's time slot occurs and vice versa.

Referring particularly to the transmission of intelligence between the calling party's line circuit and the link, a transmission gate in the calling party's line circuit and in the link circuit are pulsed open simultaneously during the calling party's time slot. The intelligence transmitted to the link during the calling party's time slot is stored until transmission gates in the called party's line circuit and in the link circuit are simultaneously opened during the called party's time slot, thus enabling the intelligence stored in the link to be sent to the called party, and this is repeated 50,000 times each second. The operation of the transmission circuit in the opposite direction of transmission is similar.

Figure 23:
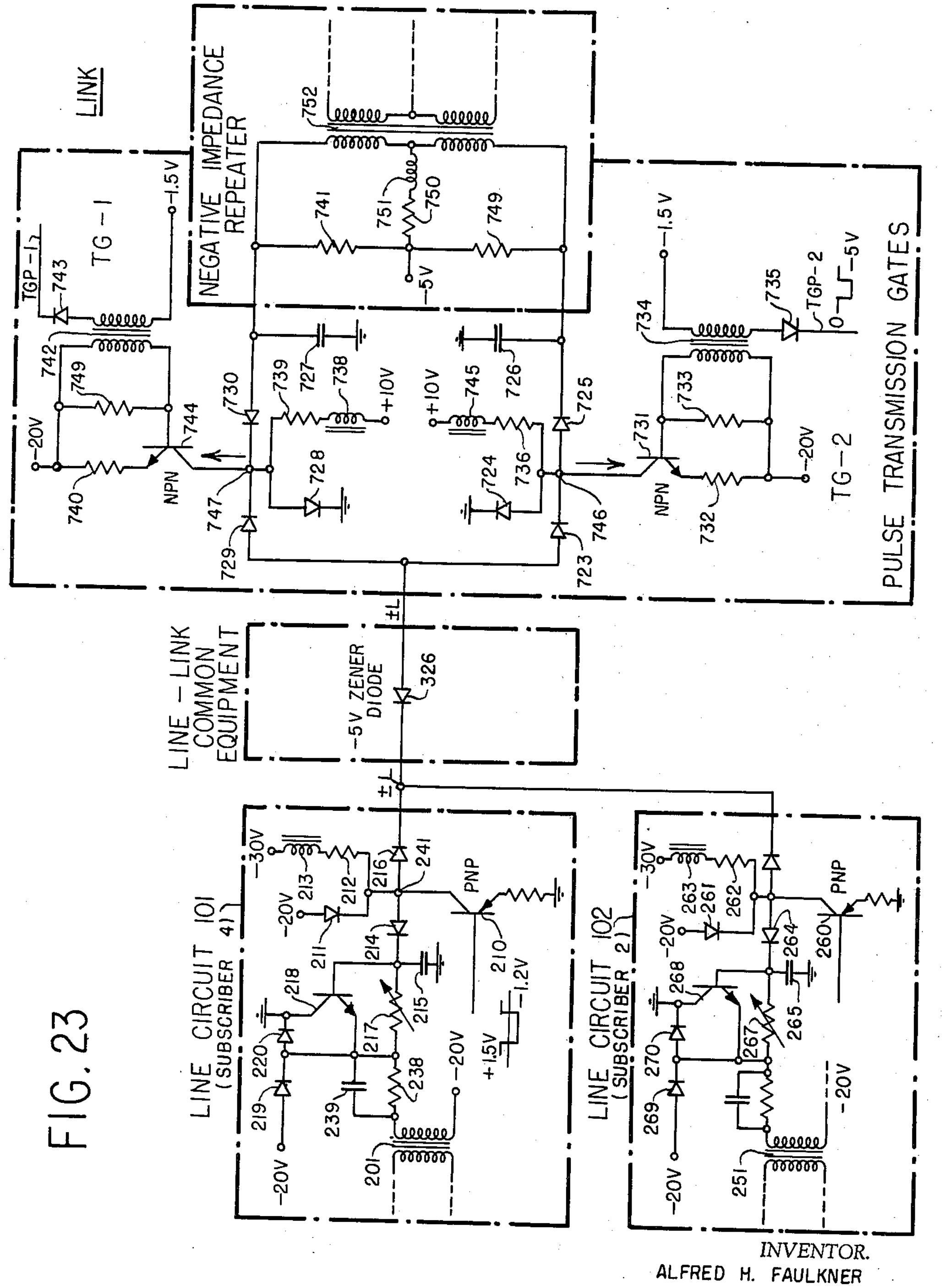
FIG. 23 illustrates the components of a transmission path as described in the section titled, "Transmission."

In order to explain the operation of the transmission system in greater detail the essential elements of this system have been separately shown on one drawing, namely FIG. 23. In this figure there is shown part of line circuits 101 and 102, part of the line-link common equipment and part of the transmission section of link 2, namely transmission gates TG–1 and TG–2 and part of the negative impedance repeater. A transfer of intelligence occurs between capacitors 215 and 727 during the calling party's time slot and between capacitors 265 and 726 during the called party's time slot. By this transfer or sampling process, which occurs 50,000 times per second, the voice frequency signal originating at the calling party's substation is reproduced at the far end.

Before the transmission of signals over the present transmission system is described the functioning of this system under a no-signal condition will first be explained.

Let us return to where calling subscriber 4 with whom line circuit 101 is associated has picked up the handset and an idle link has been seized. At this time transistor 210 in the line circuit and transistor 744 in the link circuit are simultaneously turned on during the time slot assigned to the calling party. The turning on of transistor 210 is described in the section entitled "Line Circuits." The pulse on lead TGP–1, which has been previously identified, is passed through diode 743 and is impressed on the primary of transformer 742. Because transistor 744 is of the NPN type transformer 742 reverses the sign of the pulse in order to turn this transistor on. The output pulse from transformer 742 is placed across the base to emitter circuit of transistor 744 whereby this transistor is turned on for the duration of the pulse on lead TGP–1.

Since transistors 210 and 744 are of opposite conductivity type their collector currents flow in opposite directions. More particularly, with both transistors 210 and 744 turned on current flows from the collector of transistor 210 towards point 241 where it tends to divide. Initially, however, current cannot flow over lead ±L since diode 216 is reverse biased because of the voltage at this time at point 747. Therefore, current flows through diode 214 and capacitor 215 at this time. It can be seen that point 241 climbs (initially) −20 volts toward less negative values.

Since, at the link end of the common highway, transistor 744 is the only other transistor which is turned on during this time, point 747 will also be changing in potential because current flows from point 747 into the collector of transistor 744. More particularly, because of the potential at point 241, the current flowing into point 747 cannot come through diode 729 so that it must come through diode 730 at this time. Therefore point 747 drops in potential from (initially) −5 volts toward more negative values.

If not for the presence of the 5 volts Zener diode 326 current would begin to flow over lead ±L when both points 241 and 747 reached the same potential, which, in view of the different voltage drops at both ends, would be approximately −10 volts under zero-signal conditions. However, because of the insertion of diode 326 in the common highway, point 241 is allowed to rise to as high as about −7.5 volts and point 747 is allowed to drop to as low as about −12.5 volts before current can flow over lead ±L.

Transistors 210 and 744, each being a junction transistor connected in a degenerative common emitter circuit, can be considered as constant current sources. In view of the fact that the impedance of such a pulse source as viewed from the transmission circuit, approaches infinity, the shunting effect of this pulse source on the transmission circuit is minimized and the transmission efficiency of the circuit rendered largely independent of signal amplitude.

The value of the aforementioned constant current supplied by transistors 210 and 744 and the value of capacitors 215 and 727 determine the rate of potential change on these capacitors prior to the time current begins to flow over the common highway. Since $$V=\frac{Q}{C}=\frac{idt}{C}$$

and, therefore, $$\frac{dV}{dt}=\frac{I_{const}}{C}$$

the foregoing rate of potential change is directly proportional to the above constant current and inversely proportional to the value of the capacitance.

The various circuit constants involved are preferably chosen so that under no-signal conditions current begins to flow over the common highway at the midpoint of the pulse period during which transistors 210 and 744 are turned on. The moment at which this current flow begins will hereafter be referred to as the equilibrium point. It should be noted, however, that in accordance with an important feature of the present invention the potential at which this equilibrium point is reached is a different one for the two capacitors 215 and 727, this predetermined difference being equal to the Zener voltage of diode 726. This voltage, −5 volts in the instant example, is preferably chosen to be the same as the totol voltage swing on each condenser in the absence of a signal.

Under this condition, therefore, the voltage on condenser 215 rises from about −12.5 volts at the beginning of the pulse cycle to about −7.5 volts which, under the assumption made above, is reached at the midpoint of the pulse; it remains at this level for the rest of the pulse and then gradually drops back to −12.5 volts in the interval between pulses. On the other hand, the voltage on condenser 727 drops from about −7.5 volts at the beginning of the pulse cycle to about −12.5 volts which it reaches at the midpoint of the pulse; it stays at this level for the remainder of the pulse and, thereafter, rises gradually to its original value of −7.5 volts.

The interposition of the Zener diode in the common highway thus has the effect of permitting the voltage excursions of the two condensers to overlap in relation to one another; in fact, under no-signal conditions and under the further assumptions made above, the voltage range covered by these excursions—lying, as it does between −7.5 volts and −12.5 volts in either case—is the same for both condensers, except, of course, that while the potential of one condenser varies in the positive direction the other varies in the negative direction and vice versa. It will readily be seen, therefore, that due to the introduction of the Zener diode 326 into the common highway, or, more broadly expressed, due to the prevention of current flow over the common highway until a predetermined difference in voltage between condensers 215 and 727 is reached, the total voltage range available in the transmission system may be more efficiently utilized, permitting a higher percent modulation than would otherwise be possible. In other words, the Zener diode enables a relative shifting of the operating points of the two condensers such that the available supply voltage is employed to best advantage.

In the transmission circuit shown in FIG. 23, after the equilibrium point has been reached current flows out of the collector of transistor 210 over the lead ±L into the collector of transistor 744, and capacitors 215 and 727 are kept at the respective equilibrium potentials during the remainder of the pulse. At the end of the pulse, that is, when transistors 210 and 744 are turned off, the potential on capacitors 215 and 727 begins to change in the opposite direction at a rate dependent upon the time constant of their respective paths. These paths extend, in the case of condensers 215, from the free terminal of this condenser through resistors 217 and 238 (certain functions of which will be later described in conjunction with transistor 218) and the secondary winding of transformer 201 to −20 volts; and in the case of condenser 727 from the free terminal of this condenser through high-value resistor 741, in parallel with the series combination of a primary winding of transformer 752, choke 751 and resistor 750, to −5 volts. The inductance of choke 751 is sufficiently high to have a negligible effect on the transmission circuit at speech frequencies.

The time constants of the two paths just traced are substantially the same. On the other hand, from what has been said above, it follows that the time required by capacitors 215 and 727 to reach the equilibrium point is not the same as and, as a rule, much shorter than the time required by these capacitors to return to their initial state of charge during the relatively long time interval during which transistors 210 and 744 are turned off.

Before entering into a description of the present transmission system in the actual transmission of intelligence, the function of transistor 218 in the line circuit will be described. Transistor 218 is connected in a grounded collector or "emitter-follower" arrangement and it functions as what may be termed an impedance converter.

The line circuit has a 1000 ohm impedance as seen looking into the secondary of transformer 201. The transmission path has a 15,000 ohm impedance looking away from the base of transistor 218. Transistor 218 is adjusted by means of the shunt resistor 217 to have a current gain of 15; without this shunt resistor the current gain would be higher than 15.

This results in a current ratio of 15 as between the emitter side of transistor 218 and the base side, which means that every milliampere of current flow in the emitter circuit will correspond to 1/15 of a milliampere flow in the base circuit. This arrangement, therefore, makes it possible to reduce the current level on the transmission path, lead ±L, without a drop in voltage level.

More particularly, in the transmission of intelligence from the link to line circuit 101 the signal impressed, in a manner described in detail hereinbelow, on condenser 215 and, hence, the base of emitter-follower 218 is reproduced in the emitter circuit of the device and thus impressed on transformer 201 for transmission to the subscriber line. It will thus be seen that during link-to-line transmission transistor 218 functions both as an impedance converter and a source of amplification. During line-to-link transmission the transistor, in conjunction with shunt resistor 217, presents a 1000 ohm termination to the line and extends the resulting signal to condenser 215 and thence on to the common highway. The power loss incurred in line circuit 101 in the direction of transmission, resulting from the change in impedance, is compensated by the power gain provided in the corresponding impedance converter of the distant subscriber's line circuit such as line circuit 102. The impedance conversion described above reduces the power level transmitted over the multiplex for a given power level on the line circuits, whereby the use of moderate currents and voltages in pulse transmission gates is made possible.

The function of diodes 219 and 220 which are associated with transistor 218 will be discussed in the section entitled, "Line Circuits."

What has been described so far is the operation of the transmission system before any intelligence is transmitted thereover and it has been stated that under these conditions current flows over the transmission lead ±L only during one half of the period during which transistors 210 and 744 are turned on.

Figure 7:
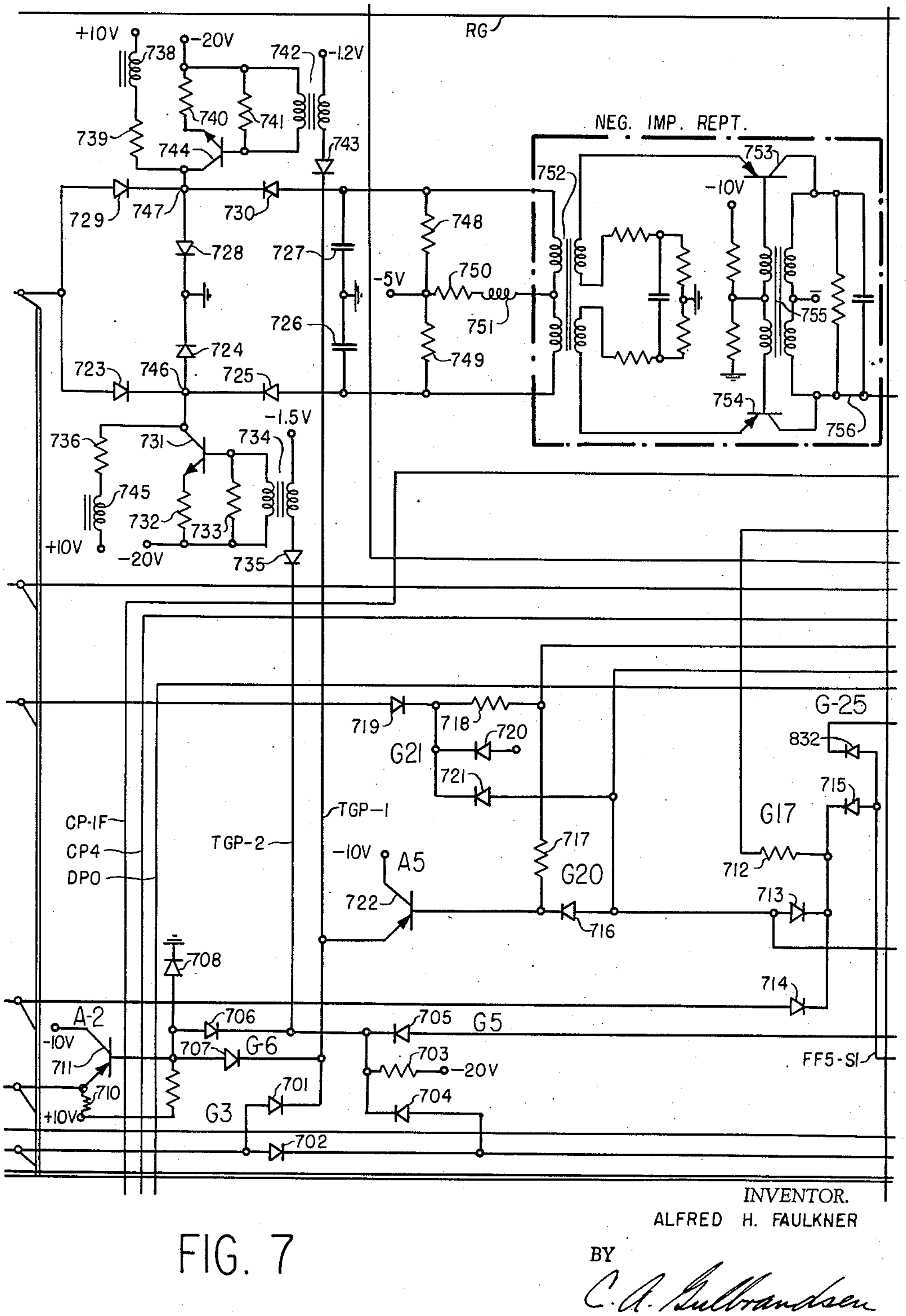
Figure 8:
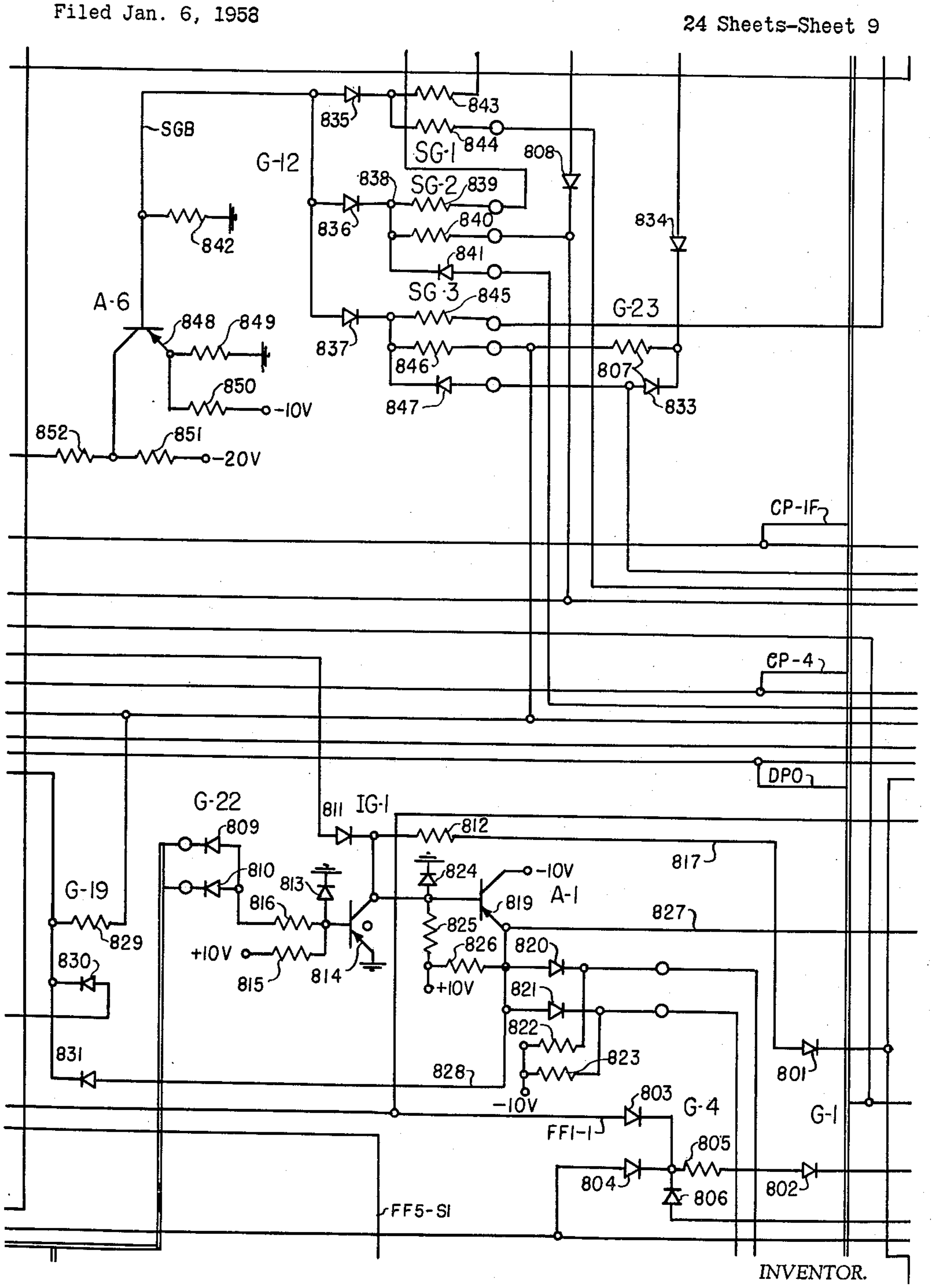
Figure 13:
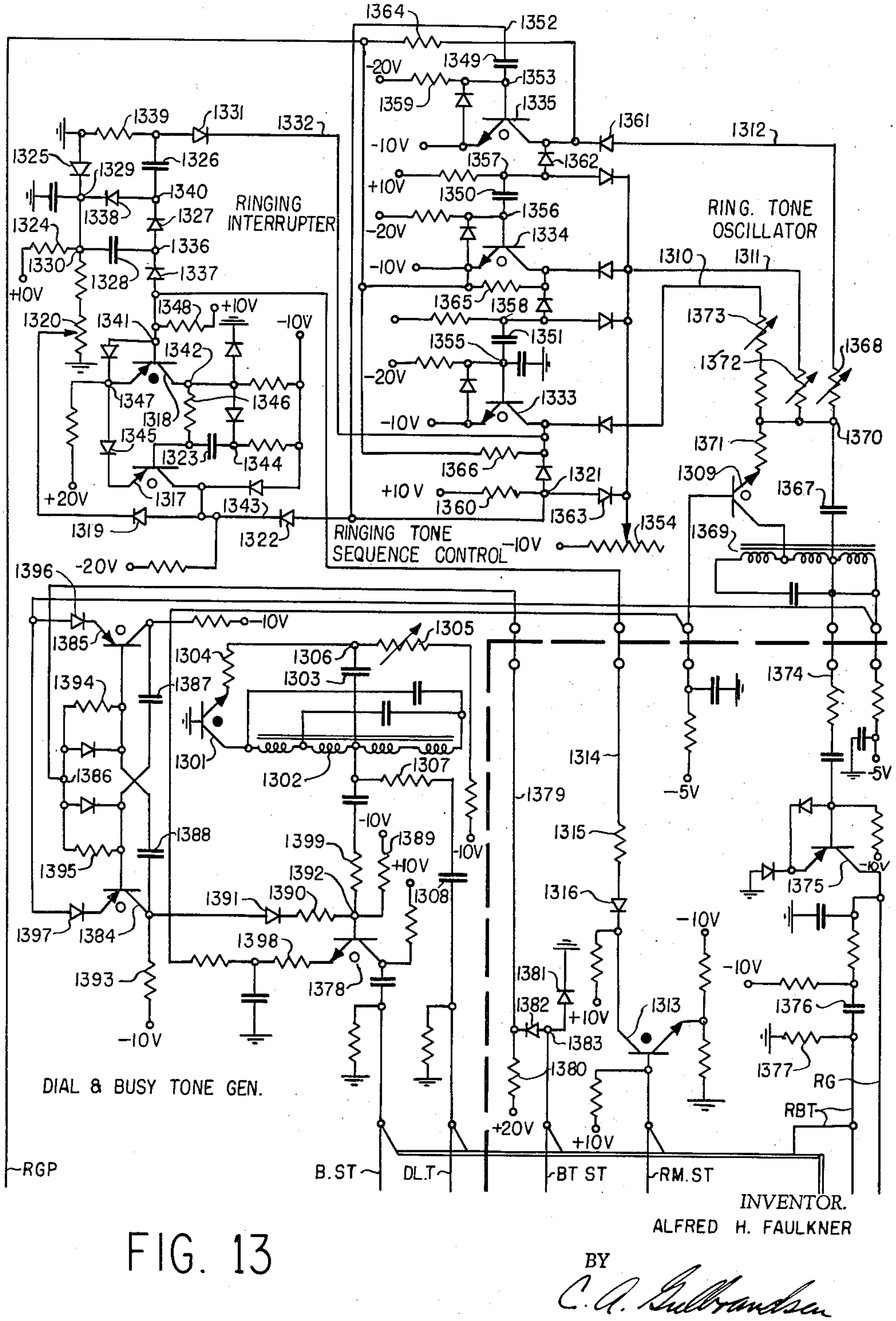
Figure 14:
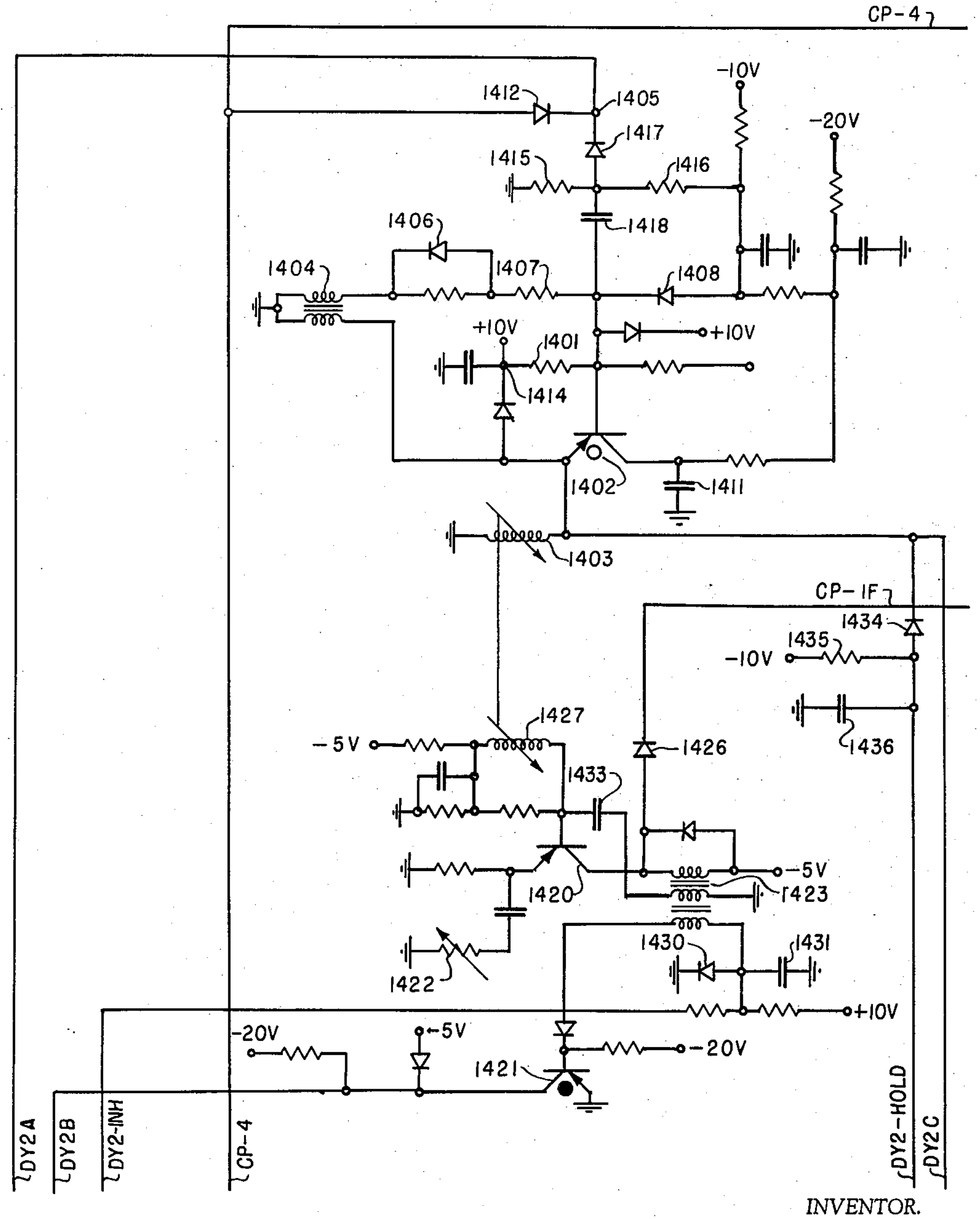
Figure 15:
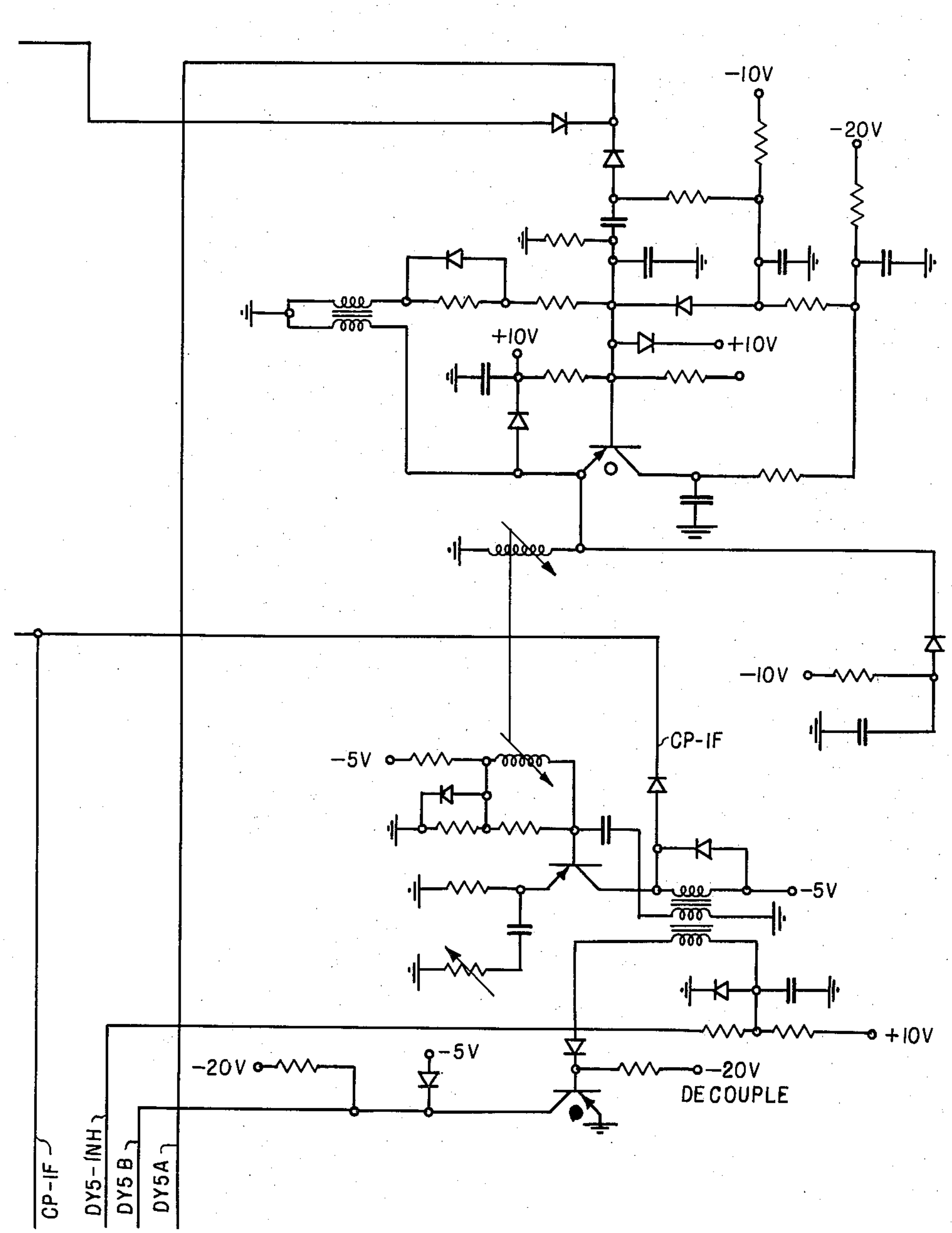

Let us now assume that, as shown in greater detail in FIGS. 7, 8 and 13, dial tone has been gated through to the negative impedance repeater and the negative impedance repeater has impressed the dial tone voltage by way of transformer 752 upon capacitor 727. (It is also impressed on capacitor 726 but, of course, without effect).

Due to the inclusion of the left-hand winding, as viewed in FIG. 23 of transformer 752 in the charging circuit traced above of condenser 727 the voltage across this condenser follows the dial tone signal during the intervals between the multiplex pulses, being influenced briefly by each of the pulses in the calling subscriber's time slot. As indicated above, the circuit constants are preferably chosen so that in the absence of a signal current flows into the collector of transistor 744 from diode 730 during the first half of the pulse period and from diode 729 during the second half of the pulse period. Similarly, current flows from the collector of transistor 210 through diode 214 during the first half of the pulse period and through diode 216 during the second half.

The presence of the signal voltage (which in the simplest case would be a sine wave of voice frequency) on condenser 727 influences the point in the pulse period at which current switches from one path to the other in the following manner. As the voltage on condenser 727 swings negative the voltage difference between condensers 727 and 215 at the start of a pulse is reduced, hence less time is required to reach the equilibrium point (corresponding to the predetermined voltage difference of 5 volts between the free ends of the two condensers). In consequence, the average current (over a pulse cycle) flowing from condenser 727 into transistor 744 is reduced and similarly the average current flowing out of transistor 210 into condenser 215 is reduced. The voltage across condenser 215 thus also swings negative. Similarly, as the voltage on condenser 727 swings positive the voltage difference between condensers 727 and 215 at the start of a pulse increases, hence more time is required to reach the equilibrium point, that is, the point where the voltage difference between the free ends of the two condensers is 5 volts. The average current flowing from condenser 727 into transistor 744 increases, causing a corresponding increase in the average current flowing from transistor 210 into condenser 215. The voltage across condenser 215 thus follows that across condenser 727 in the positive direction.

From the foregoing explanation it will be appreciated that the operation of the present transmission system depends on the manner in which the collector current pulses of transistors 210 and 744 divide at point 241 and 744, respectively; more particularly, this operation depends on the moment in the pulse cycle at which capacitors 215 and 727 are, for all practical purposes, "cut off" from their associated transistors 210 and 744, respectively, namely due to the constant current supplied by these transistors being diverted over the common highway upon reaching of the equilibrium point. It will be noted that both capacitors keep swinging, in response to each "sampling" pulse, in opposite directions around a voltage value which varies in accordance with the momentary voltage value of the signal, that is, is more negative than −10 volts during the negative half-cycle of the signal and less negative than −10 volts during the positive half-cycle.

During each of these sampling pulses the equilibrium point is reached by the two capacitors—at a relatively early moment (earlier than the midpoint of the pulse) during the negative half-wave of the voice-frequency signal and at a relatively late moment (later than the midpoint of the pulse) during the positive half-wave of the signal. At this equilibrium point, according to its above definition, the voltages of the two capacitors differ by the predetermined voltage spread which, in the instant example, is 5 volts, and from this time on current flows out of transistor 210 and into transistor 744 over the common highway; that is, these two voltages remain at the corresponding levels for the remainder of the pulse at which time they begin to swing back in opposite directions. The advantage, pointed out above, of the predetermined voltage spread due to diode 326, which resides in permitting the voltage excursions of capacitors 215 and 727 in response to each sampling pulse to overlap with respect to each other, thus also holds true during the presence of a signal.

Figure 5:
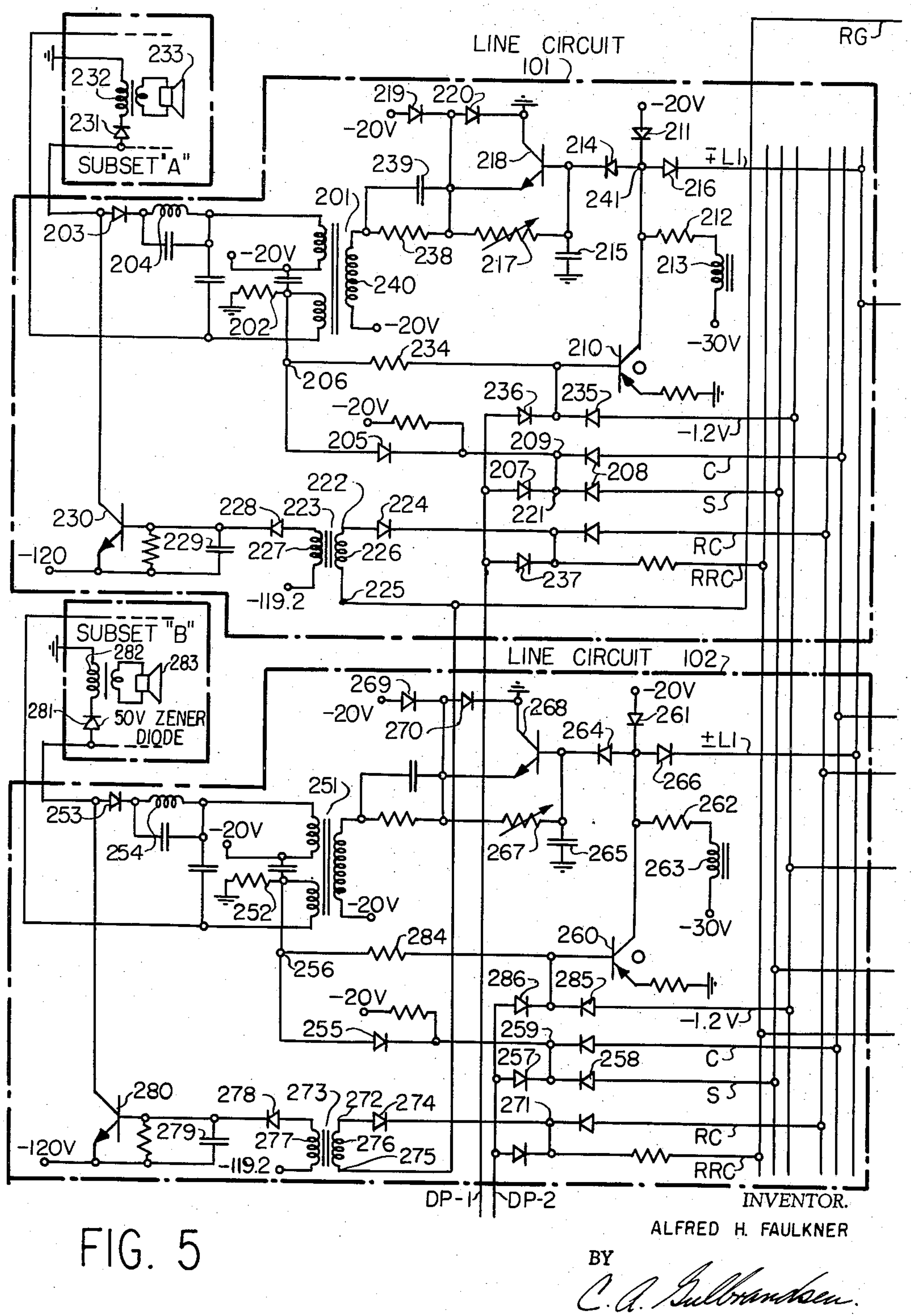

Through the line winding of transformer 201 and through a filter circuit not shown in FIG. 23, but shown in FIG. 5, which helps smooth out the waveform, the dial tone signal is transmitted to the subscriber's handset. Dial tone, busy tone, and ringback tone are all transmitted in this manner.

As has been stated above, when the called subscriber answers, lead TGP–2 will be pulsed simultaneously with in the circuit 102, associated with subscriber 2, namely in the time slot assigned to subscriber 2.

During conversation voice signals outgoing from and incoming to a given party are both transmitted over the common highway of the finder-connector link in this particular party's time slot. More particularly, the voice signals transmitted from the substation of subscriber 4 are sampled in its time slot 4 and transferred from capacitor 215 to capacitor 727 in a manner readily understood from the above description. The negative impedance repeater amplifies the signal to make up for any transmission losses and places the amplified signal on capacitor 726. When the called party 2 is sampled in time slot 2 the information on capacitor 726 is transferred to capacitor 265 and thence to the called party. In a similar manner intelligence from subscriber 2 is transmitted from capacitor 265 to capacitor 726 in time slot 2, amplified in the negative impedance repeater and then transferred from capacitor 727 to 215 in time slot 5 for transmission to subscriber 4.

*Release*

In the event that the called part disconnects first, the pulses on lead C in the called time slot are blocked as in a manner which has been explained; however, pulses in the calling time slot remain on lead C because they circulate over leads S and C through the calling line circuit. Thus there is no effect on the link circuit at this time. When the calling party subsequently disconnects, the pulses on lead C in the calling time slot are also blocked. This causes flip-flop FF2 to flop, because a pulse from delay line DY–2 on lead B is passed through inhibit gate IG–2 (because of the lack of coincidence of pulses in time slot 1 or the calling party's time slot) to input S–0 of flip-flop FF2. There now appears a —10 volts on lead 0 of flip-flop FF2. The —10 volts on lead 0 of flip-flop FF2 which is fed to input HD of the sequence switch driver and the —10 volts on lead 1 of flip-flop FF1 which is passed through gate G–11 to input RHD of the sequence switch driver enable the sequence switch driver to generate 2 pulses which advances the sequence switch to its normal or N position. The —10 volt step voltage on lead N is applied to differentiating circuit DF–2, to produce a brief pulse on the inhibit input INH, of delay line DY–2 to block the pulses circulating therein. The HOLD lead of delay line DY–2 then restores from —10 volts to ground. See section titled "Delay Line DY–2" for details. The removal of —10 volts from the HOLD lead of delay line DY–2 flops flip-flop FF1 and maintains it flopped and also maintains flip-flop FF2 flopped. Flip-flops FF1 and FF2 are incapable of being operated until —10 volts appears at the HOLD lead of delay line DY–2 and that will occur when pulses are again sent through the delay line when the link is selected for a call by the allotter again.

The absence of —10 volts from lead 1 of flip-flop FF1 plus the absence of —10 volts from lead ON–2 of the sequence switch blocks gate G–11 and thereby removes —10 volts from input RHD of the sequence switch driver thus preventing the generation of another pulse and thereby maintaining the sequence switch in its N or normal position.

With an absence of —10 volts on lead ON–2 gate G–13 is blocked thus blocking the recirculation of pulses in delay line DY–5 and also flops flip-flop FF5 and maintains it so. All gates which were opened during switch through are now closed as can be observed.

In the event that the calling party disconnects first, the pulses on lead C in the calling time slot are blocked while those in the called time slot remain. In the absence of a coincident pulse on lead C, inhibit gate IG–2 passes pulses from delay line DY–2 lead B to lead S–0 of flip-flop FF2 causing it to flop. But flip-flop FF2 is flipped by the next pulse on lead C in the called time slot, hence it oscillates at 50,000 cycles per second having —10 volts on lead F at least ten percent of the time depending on the particular time slots involved in the established connection. As long as flip-flop FF2 continues to oscillate between its flip and flop positions the sequence switch driver is not given time to generate a pulse and hence the link is held by the called line. When the called party subsequently disconnects flip-flop FF2 is no longer flipped by pulses on lead C and the release is effected in the same manner as previously described.

Release from a busy condition is similar to what has previously been described. When the calling party disconnects flip-flop FF2 flops from a pulse from lead B of delay line DY–2 which is passed through inhibit gate IG–2 to input S–0 of flip-flop FF2. This places —10 volts at input HD which combined with the —10 volts placed on RHD causes the sequence switch driver to generate three pulses and advance the sequence switch to its N or normal position in a manner understood by reference to the previous parts of this section.

DETAILED DESCRIPTION OF THE SYSTEM

*Clock*

The function of the clock circuit is to produce synchronously related gating and supervisory pulses to the system. The pulses vary from 0.5 microsecond in length to 0.7 microsecond in length. FIG. 21 illustrates the position and form of the pulses produced and should be referred to while reading the following detailed description of the clock circuit.

Figure 18:
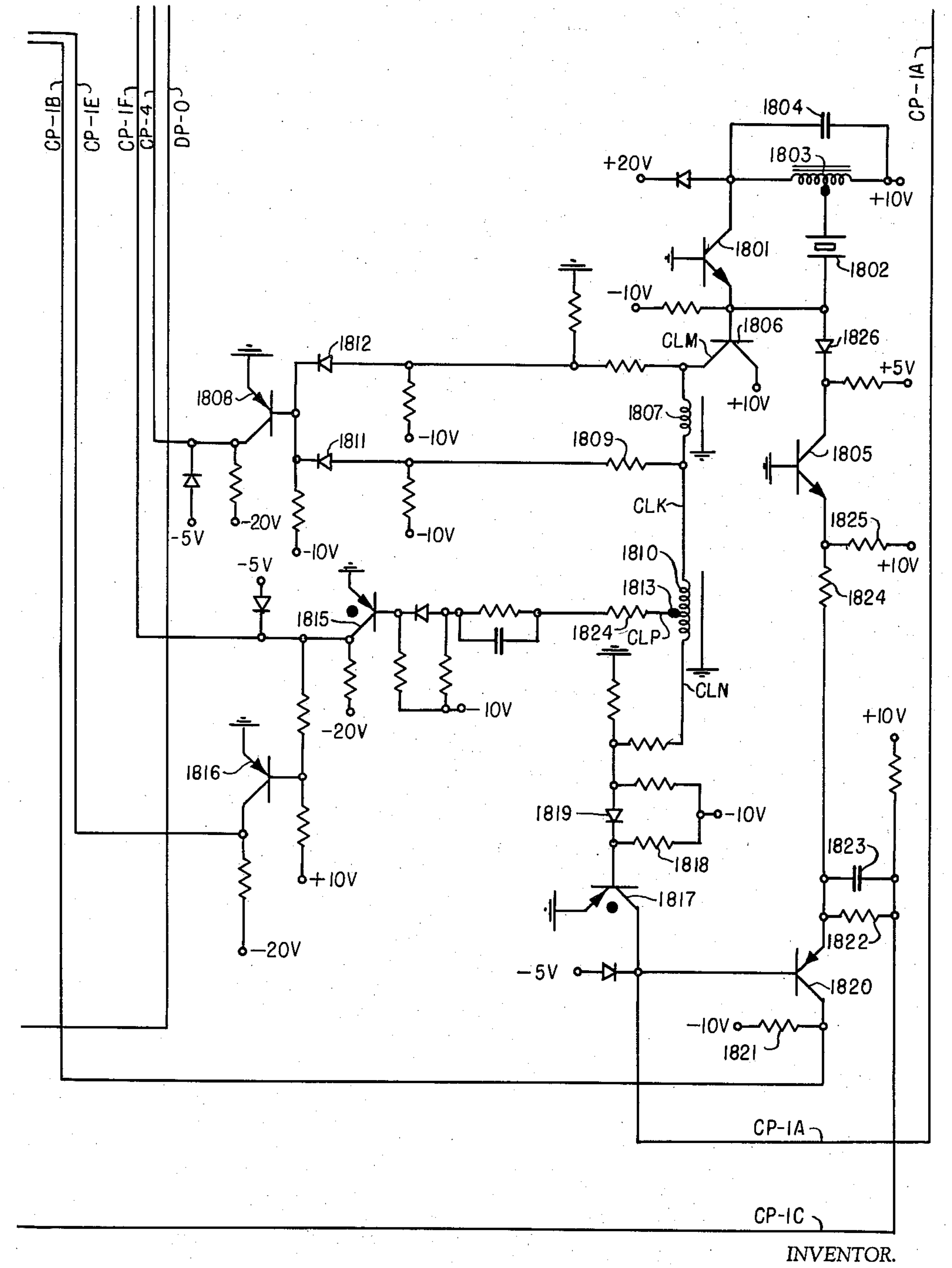

Referring to FIG. 18 there exists an oscillator circuit associated with transistor 1801 and a 1,000 kilocycle crystal 1802. The voltage waveform appearing across the tuned circuit comprising inductance 1803 and capacitor 1804 is sinusoidal but the transistor 1801 feeds energy to the tuned circuit only during the negative half cycles since the emitter base circuit is cut off during the positive half cycles.

Since the impedance of the emitter circuit is very low in the forward direction and high in the reverse direction, the voltage waveform at the emitter resembles a half wave rectified sine wave; the negative half cycles being suppressed by the low forward drop in the emitter circuit. This voltage waveform at the emitter of transistor 1801 is further modified by transistor 1805 which suppresses the voltage waveform at the emitter of transistor 1801 every other positive half cycle as will be hereinafter explained. Therefore, the voltage at the emitter of transistor 1801 and consequently the base of transistor 1806 consists of a positive half cycle, having a duration of 0.5 microsecond, followed by substantially zero voltage for three half cycles, or 1.5 microseconds. The amplitude of the positive peak is approximately 8 volts.

Transistor 1806 is operated as an emitter follower amplifier and the output pulse on lead CLM from transistor 1806 is fed into a 0.2 microsecond delay line 1807 and also into one of the clock pulse circuits associated with transistor 1808. The shape and duration of the pulse on lead CLM is illustrated in FIG. 21.

An output pulse on leak CLK from the 0.2 microsecond delay line 1807 lags the pulse on lead CLM by 0.2 microsecond which is illustrated in FIG. 21 also. The pulse on lead CLK is tapped off through resistor 1809 into the clock pulse circuit associated with transistor 1808 and also is fed into the center tapped 0.4 microsecond delay line 1810.

Both a pulse on lead CLM and lead CLK are fed into the base of transistor 1808 through diodes 1812 and 1811, respectively, which isolate leads CLM and CLK. It will be recalled from the preceding description that the pulses on lead CLM and on lead CLK are 0.5 microsecond long and spaced 0.2 microsecond apart. Thus the pulse on lead CLK commences before the pulse on lead CLM expires thus continuing the cut off of the normally saturated transistor 1808 until the pulse on lead CLK expires. This results in an approximately 0.7 microsecond long negative pulse on lead CP–4. The form and relative time position of the pulse on lead CP–4 is illustrated in FIG. 21.

As has been stated the pulse on lead CLK is also fed into the 0.4 microsecond center tapped delay line 1810 and after a 0.2 microsecond delay a pulse appears at the center tap point 1813 of delay line 1810 and that pulse will be now called the pulse on lead CLP and is illustrated in FIG. 21 also.

The pulse on lead CLP is fed to the base of transistor 1815 and there cuts off normally saturated transistor 1815 to produce the negative clock pulse on lead CP–1F at the collector of transistor 1815. The pulse on lead CP–1F is illustrated in FIG. 21.

The pulse on lead CP–1F is also fed into transistor 1816 where it causes normally cut off transistor 1816 to saturate during the pulse duration thereby producing the pulse on lead CP–1E which is also illustrated in FIG. 21.

As will be recalled the pulse on CLP was obtained from the center tap of delay line 1810. Now, however, the concern is with the output pulse from delay line 1810 which will be called the pulse at point CLN and this pulse is illustrated in FIG. 21 also.

This pulse cuts off normally saturated transistor 1817 causing its collector to swing from near ground to approximately −5 volts to produce the pulse on lead CP–1A which is illustrated in FIG. 21. In between the pulses at point CLN, transistor 1817 is biased into the saturation region by current flowing from −10 volts through resistor 1818 into its base. Diode 1819 is normally biased in the reverse direction to insure that all of this current flows into the base. A small change in voltage at the base is required to turn transistor 1817 off therefore the output pulse on lead CP–1A, is essentially rectangular having rise and decay times of about 0.1 microseconds.

The pulse on lead CP–1A is also applied to the base of transistor 1820 which functions as a split load phase inverter and amplifier. The inverted pulse obtained from the collector of transmitter 1820 is placed on lead CP–1B and is illustrated in FIG. 21. This pulse on lead CP–1B is transformer coupled at the other end of lead CP–1B as will be later seen and the inversion is not actually necessary but the pulse was derived from the collector circuit simply to permit convenient adjustment of its amplitude by suitable choice of resistor 1821 without affecting other pulses.

A pulse swinging from 0 to −5 volts is obtained at the emitter of transistor 1820. This pulse is dropped to +1 volt to −4 volts by the parallel resistor 1822 and capacitor 1823 and is now known as the pulse on lead CP–1C.

The emitter of transistor 1820 is also connected through resistor 1824 to the emitter of transistor 1805 which is normally reverse biased by resistor 1825 connected to +10 volts. During the time the pulse is on lead CP–1C transistor 1805 is driven into saturation and remains in this region for an additional 0.5 microsecond following the pulse due to hole storage. The base of transistor 1806 and the emitter of transistor 1801 is clamped to ground through diode 1826 and the collector of transistor 1805 during this period.

The effect of hole storage is to lengthen the period that the clamp is effective to insure that it completely overlaps the positive half cycle of the oscillator wave that is suppressed.

It can be seen that the first positive pulse presented to transistor 1806 causes a clamp effect to occur on the base of transistor 1806 from 0.8 to 1.0 microseconds later than the beginning of the first positive pulse and to last approximately 1 microsecond.

This is because the first positive pulse is delayed 0.6 microsecond in the delay lines 1807 and 1810 and from 0.2 to 0.4 microsecond in transistors 1817, 1820, and 1825 before the base transistor 1806 is clamped to ground. The clamp lasts approximately 1 microsecond, 0.5 microsecond due to saturation from the pulse from the emitter of transistor 1820 and 0.5 microseconds due to the hole storage in transistor 1805. Therefore the output from transistor 1801 to the base of transistor 1806 will be a positive half cycle of 0.5 microseconds duration followed by a pause of 1.5 microseconds.

*Pulse Distributor*

The pulse distributor produces pulses of approximately 2.0 microseconds in duration and −7 volts in amplitude. By referring to FIG. 21 there can be seen the time relation of the 2.0 microsecond pulse with the other pulses of the system.

Figures 16, 24, 25:
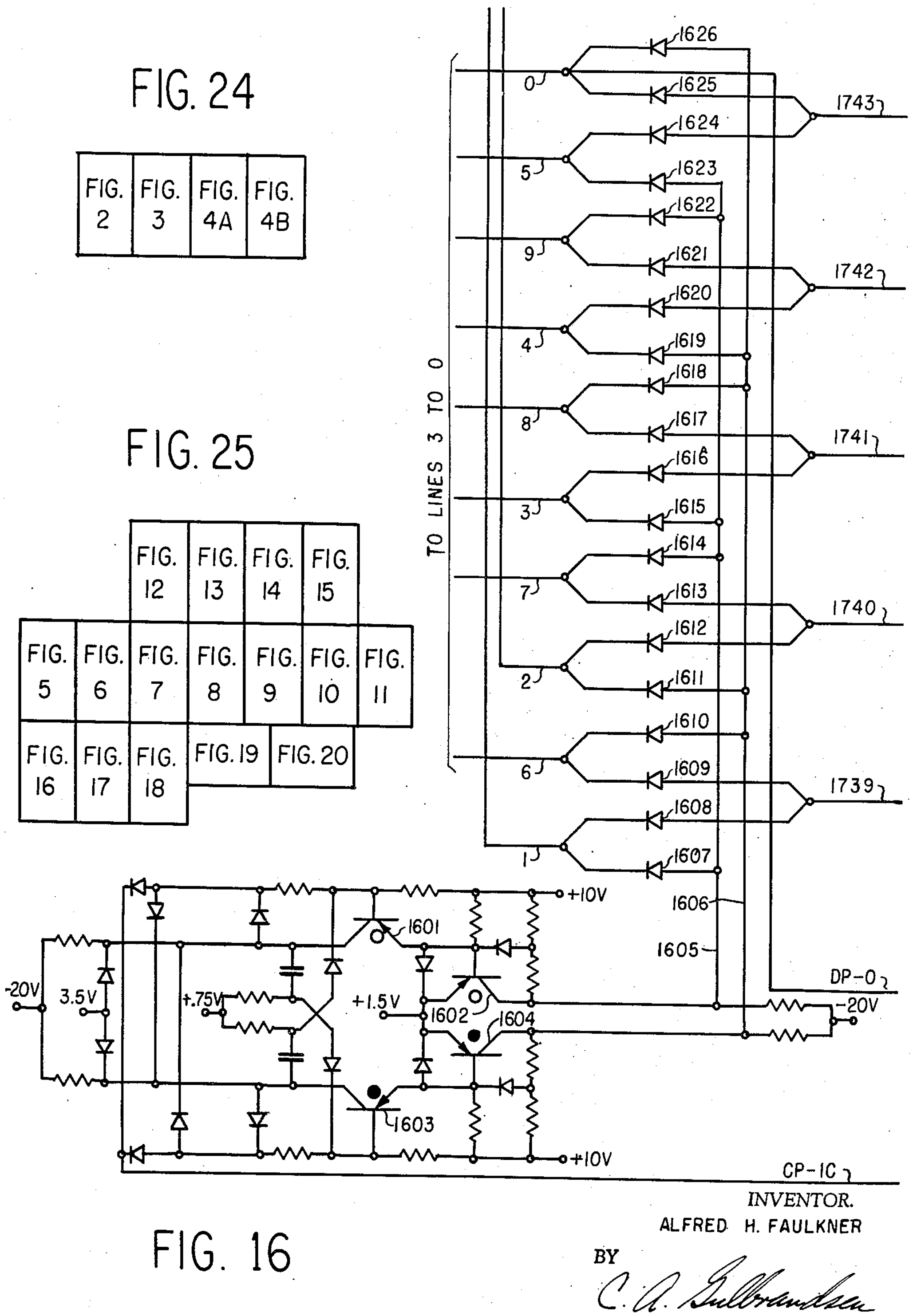
FIGS. 24 and 25 illustrate the manner in which the drawings should be arranged.

These pulses appear on leads DP–1 to DP–0 of FIG. 16 one at a time thus allotting each line of the system its particular time space.

The distributor is composed of three circuits; a ring-of-five counter circuit which produces five sequential pulses 2.0 microseconds in duration; a ring-of-two counter circuit which is identical to the ring-of-five counter circuit except that there are only two steps; and a diode matrix circuit which combines the pulses from the two counter circuits to produce a −7 volt pulse at its output lead DP–1 to DP–0. A detailed explanation of the three mentioned circuits of the pulse distributor follows.

Figure 17:
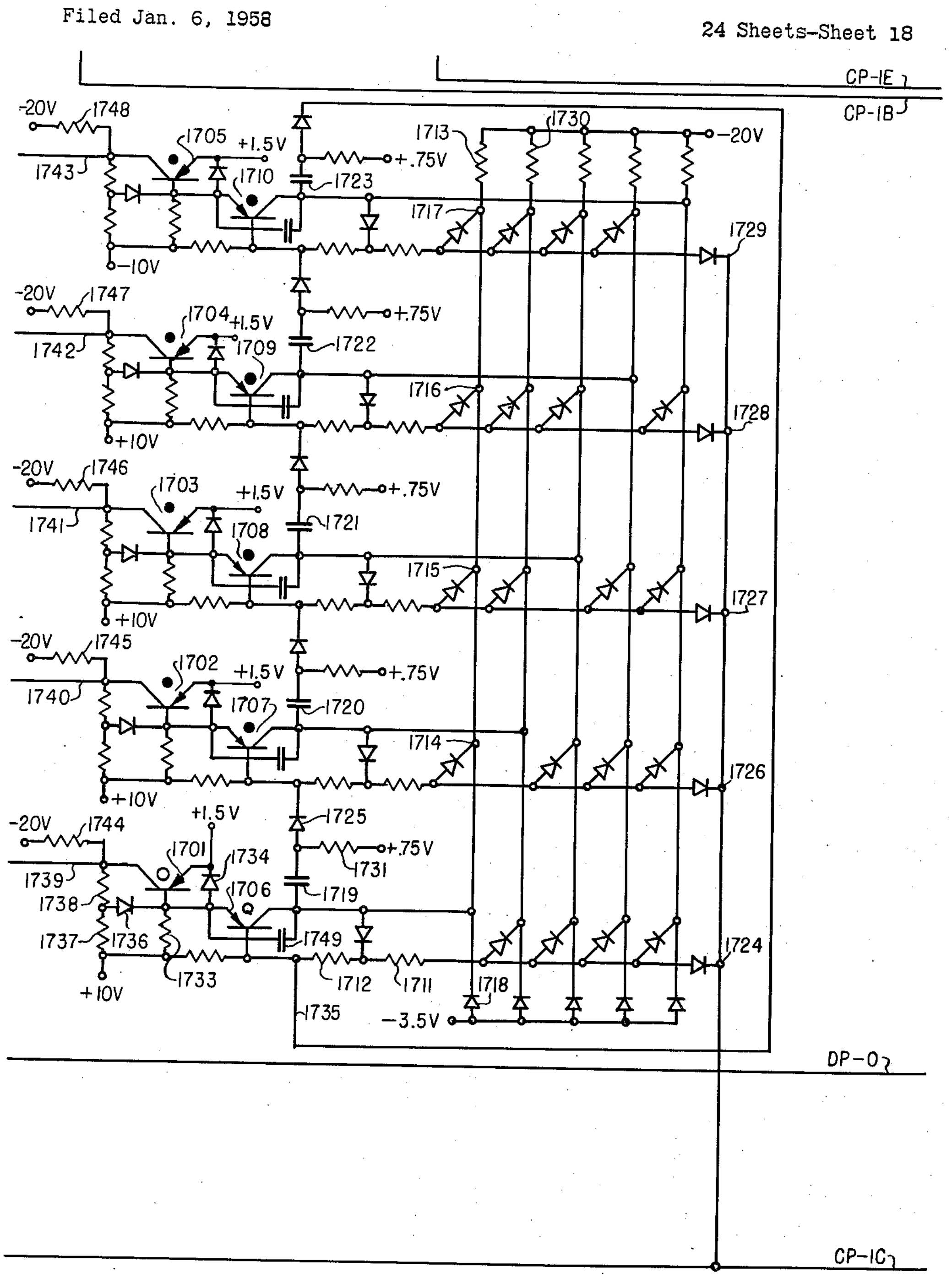

Referring to FIG. 17 there can be seen the pulse distributor ring-of-five counter circuit. This circuit has two transistors per stage typified by transistors 1701 and 1706. Transistors 1706 to 1710 are of the surface barrier type and are necessary to obtain reliable operation at the high speed at which this counter circuit operates. Since the current gain and power dissipation of these transistors is limited, it is necessary to use transistors to feed the external load circuit. These slave transistors 1701 to 1705 have a considerably lower alpha cut off frequency than the surface barrier type, but can dissipate much more power and provide high current gain. Being slaves, their slower response does not limit the counting rate in any way.

This counting chain is unique in that all stages except one are normally conducting, whereas in conventional counting chains only one stage is normally conducting, that is to say in counting circuits using one transistor per stage, which is the class in which this one belongs since the second transistor plays no role in the counting operation.

Figure 22:
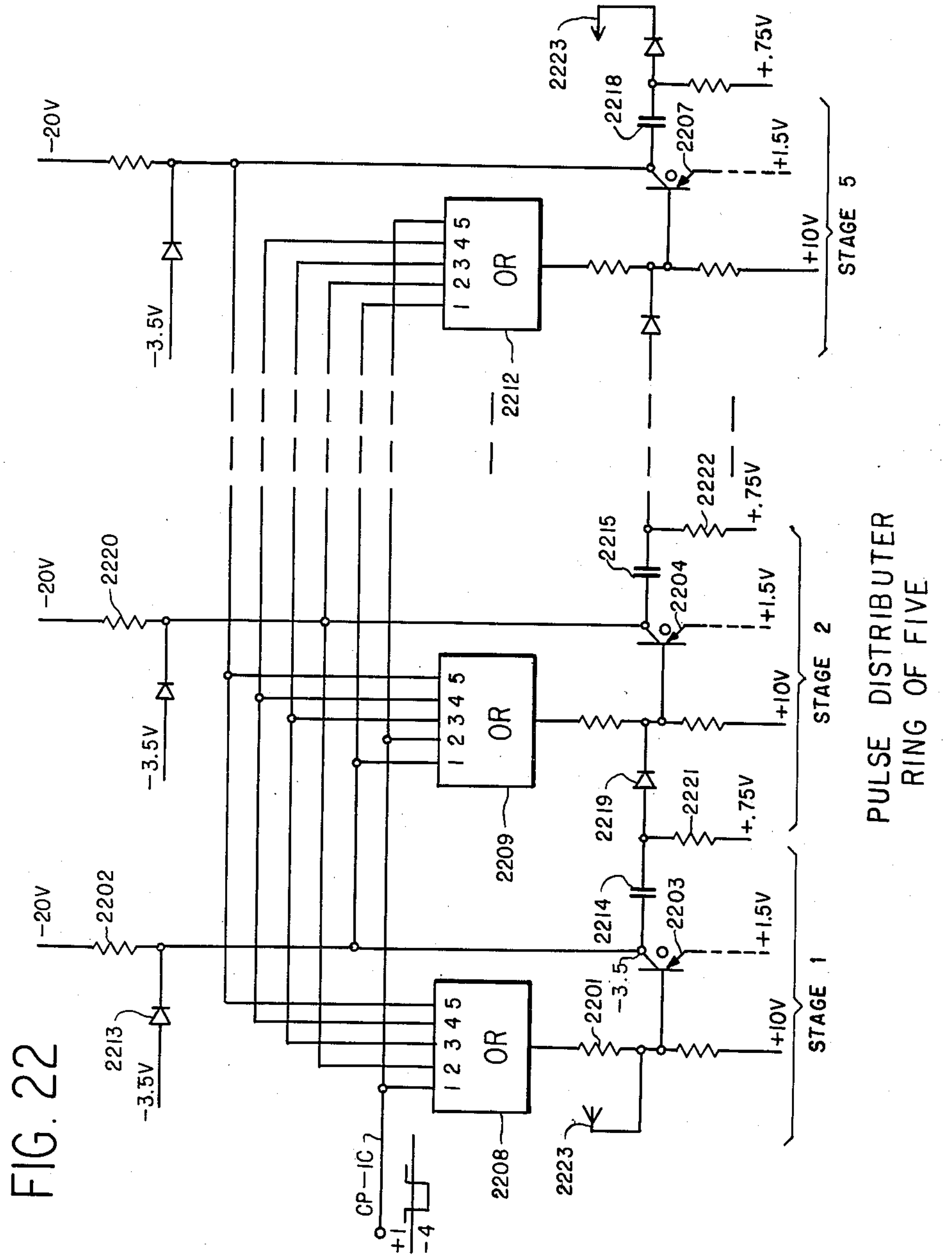
FIG. 22 illustrates a simplified schematic of the pulse distributor's ring-of-five circuit.

To facilitate explanation of the circuit operation a simplified schematic of the pulse distributor ring-of-five circuit is shown in FIG. 22. As shown therein, each stage is provided with an "OR" circuit having five inputs and an output feeding the base of the corresponding transistor through a resistor such as resistor 2201 which corresponds to resistors 1711 and 1712.

The collector of each transistor is connected to the corresponding input of the "OR" circuits of all other stages and to −20 volts through resistor 2202 which corresponds to resistor 1713. The remaining inputs to the "OR" circuits are connected to the input lead CP–1C.

Assume that transistors 2204 to 2207, which correspond to transistors 1707 to 1710, are conducting, then their collectors are at approximately +1.5 volts since the transistors 2204 to 2207 are saturated. In the absence of an input pulse, all five inputs of "OR" circuit 2208 are at approximately +1.5 volts and the base of transistor 2203 is reverse biased and therefore transistor 2203 is cut off.

With transistor 2203 cut off current flowing through resistor 2202 is fed to input 1 of "OR" circuits 2209 to 2212, which corresponds to points 1714 to 1717, providing the base current required to maintain transistors 2204 through transistor 2207 conducting. The collector of transistor 2203 is clamped at −3.5 volts through diode 2213, corresponding to diode 1718, to prevent collector breakdown, as the surface barrier transistors 2203 to 2207 are limited to low voltage operation. From the symmetry of the circuit it should be obvious that with any one of transistors 2203 to 2207 cut off, the other four will be conducting and these will maintain the cut off state of the one such transistor.

With the circuit as shown, capacitor 2214, which corresponds to capacitor 1719, is charged to approximately 4 volts. There is a negligible charge on capacitors 2215 to 2218, which correspond to capacitors 1720 to 1723 at this time. When a −4 volt pulse appears on the input lead CP–1C, the origin of which will be explained in the section titled "Clock," it feeds current through input 1 of "OR" circuit 2208, which corresponds to point 1724, to turn on transistor 2203 which thereupon saturates. The collector of transistor 2203 swings from −3.5 volts to nearly +1.5 volts, driving the base of transistor 2204 negative through capacitor 2214 and diode 2219, which corresponds to diode 1725, and shunts the base feed circuit to input 1 of "OR" circuits 2209 to 2212. Transistor 2204 cuts off due to the discharge of capacitor 2214, but transistors 2205 (not shown) to 2207 are maintained conducting by base current fed to the corresponding inputs of "OR" circuits 2210 (not shown) to 2212 from lead CP–1C, which corresponds to a current from lead CP–1C through points 1727 to 1729.

When transistor 2204 cuts off, a new base feed circuit is established through resistor 2220, which corresponds to resistor 1730, and input 2 of "OR" circuits 2208 and 2210 to 2212. Thus upon expiration of the input pulse from lead CP–1C transistor 2204 remains cut off and transistors 2203 and 2205 to 2207 remain conducting. Capacitor 2214 discharges through diode 2219 and the base emitter path of transistor 2204 in multiple with resistor 2221, which corresponds to resistor 1731, until diode 2219 becomes reverse biased, thereafter continuing to discharge solely through resistor 2221.

It should be apparent that the input pulse on lead CP–1C must persist long enough for transistor 2203 to turn on and in turn cut off transistor 2204, and yet expire before the charge on capacitor 2214 is dissipated since it is this charge that overrides the input pulse on lead CP–1C and turns off transistor 2204. If the pulse repetition rate is low, capacitor 2214 may be made large so as to obtain a wide tolerance on the duration of the input pulse. In the present case the pulse repetition rate is very high, hence the value of capacitor 2214 must be carefully considered.

The input pulses on lead CP–1C are 0.5 microsecond in duration with 1.5 microseconds spacing between successive pulses. Thus capacitor 2214 must discharge slowly enough to maintain transistor 2204 cut off during the 0.5 microsecond pulse and yet quickly enough so as not to prevent transistor 2204 from being turned on by the next subsequent pulse on lead CP–1C. Also during the 1.5 to 2.0 microsecond interval that transistor 2204 is cut off, the coupling capacitor 2215 must charge to nearly 4 volts through resistor 2222, which corresponds to resistor 1732. With properly selected components this ring-of-five counting circuit has been found to operate reliably at 500,000 steps per second with the input pulses on lead CP–1C ranging from 0.25 to 1.0 microseconds in duration.

It can be seen that with each subsequent pulse on lead CP–1C, the ring-of-five counter circuit will advance one step and since the stage associated with transistor 2207 is connected to the stage associated with transistor 2201 by lead 2223, which corresponds to lead 1735, the circuit will advance in a ring sequence.

Returning again to FIG. 17, the slave transistor 1701 of the first stage, is normally biased beyond cut off by +10 volts applied through resistor 1733 to the base of transistor 1701, the base of transistor 1701 being clamped to +1.5 volts through diode 1734. When transistor 1706 is turned on, as has been explained by an input pulse on lead CP–1C, its emitter current, about 4 ma., flows through resistor 1733 to +10 volts and through the base emitter path of transistor 1701 to +1.5 volts. Since approximately 2 ma. flows through resistor 1733, there is about 2 ma. left for the base input current to transistor 1701.

Since transistor 1701 has a minimum current gain of 30, there is ample drive to bring the collector of transistor 1701 to the saturation region with load currents up to 50 ma. The actual load is much less than this, the excess drive being provided primarily to secure fast response. To avoid hole storage effects in transistor 1701, which would delay turn off when transistor 1706 received current from the stage associated with transistor 1710, diode 1736, together with the voltage divider from +10 volts composed of resistors 1737 and 1738, is arranged to conduct when transistor 1701 approaches saturation to reduce the base current to a value just sufficient to maintain the collector of transistor 1701 close to, but not in, the saturation region.

The output from this ring-of-five counter circuit is taken out on leads 1739 to 1743. As is readily seen only one of these leads will have a negative potential thereon and that will be the lead that is associated with the stage which has its switching and slave transistor cut off. It also can be seen that the duration of the negative pulse is approximately 2.0 microseconds.

The front edge of the output pulse will lag the front edge of the pulse on lead CP–1C by the amount of time it takes to cut off the switching and slave transistors.

Although the circuit has five stable states as described above, it is not inherently stable when power is first applied unless forced into one of its stable states by some external means. Consequently it would oscillate at high frequency if nothing was done to prevent it. The means to prevent such oscillation is the small capacitor such as 1749 bridged between the emitter and collector of each of the transistors 1706 to 1710. These capacitors reduce the gain at high frequencies to prevent such oscillation, but are small enough so as to have an insignificant effect on the normal counting operation. It has been seen that when at least two of the capacitors 1749 to 1753 are provided, the circuit always sets itself to one of its five stable states the instant that power is applied.

Referring now to FIG. 16 there is a ring-of-two counter circuit associated with transistors 1601 to 1604 identical to the ring-of-five circuit previously described except that it is reduced from five stages to two stages. Therefore no detailed explanation of the circuit is deemed necessary.

The circuit is also triggered by pulses on lead CP–1C. The normal potential on output lead 1605 and 1606 is +1.5 volts except when a pulse appears thereon which drops the potential to −7 volts.

Therefore it can be seen that the output pulses on leads 1605 and 1606 will be approximately identical to the output pulses from the ring-of-five counter.

The output pulses from the ring-of-five counter circuit on leads 1739 to 1743 and the output pulses from the ring-of-two counter circuit on leads 1605 and 1606 are fed into a diode matrix circuit associated with diode 1607 to 1626 to expand the outputs of these two last-mentioned counter circuit to ten circuits.

The outputs of the ring-of-two counter circuit on leads 1605 and 1606 swing alternately from near +1.5 volts to approximately −7 volts. Similarly the five outputs from the ring-of-five counter circuit on leads 1739 to 1743 swing sequentially from near +1.5 volts to −7 volts and back to +1.5 volts.

As can be seen from the diode matrix circuit approximately +1.5 volts will appear on leads DP–1 to DP–0 whenever either or both diodes associated with one of the leads DP–1 to DP–0 has +1.5 volts placed thereon.

Therefore when a negative −7 volts appears on both diodes associated with any particular lead, both these diodes will be blocked and a −7 volts will appear on that lead for reasons which will be explained in the section titled "Line Circuits."

Thus lead DP–1 is at −7 volts during the 2 microsecond interval that both leads 1739 and 1605 have −7 volts placed thereon. The succeeding clock pulse on lead CP–1C causes the −7 volt condition to advance from lead 1739 to 1740 and from lead 1605 to 1606 therefore causing a −7 volts pulse to appear on lead DP–2. In like manner the −7 volts condition is advanced sequentially every two microseconds over leads DP–3 through lead DP–0.

*Ringing Tone Generator*

Instead of a conventional ringing signal this system uses three different audio tones in sequence. This sequence is repeated three times followed by a pause of about three seconds.

The tones are produced by a grounded base blocking oscillator with a tuned collector circuit associated with transistor 1309. The oscillator triggers when −10 volts is applied to any of the three input leads 1310, 1311 or 1312. An RC time-constant proportional to the resistance in the input lead determines the blocking frequency. Therefore by using different values for the resistors in the input leads the oscillator is able to generate three different tones, one at a time, depending upon which input lead is closed to −10 volts. The frequency of each tone can be individually adjusted by adjusting the value of the resistors in each of the input leads.

A tone sequence control circuit associated with transistors 1333, 1334, and 1335 which is similar in operation to a free-running multivibrator continuously places —10 volts on leads 1310, 1311, and 1312 in sequence, thereby producing the melodic tone combination.

The tone sequence control circuit is inhibited from operation by an interrupter circuit associated with transistors 1317 and 1318 which inhibit ringing tone in two situations. The first situation is when the ringing machine start control circuit associated with transistor 1313 is not operative. This is so provided so that ringing starts with a full sequence of the melodic tone combination. The second situation is when three sequences of three tones has been allowed, then the interrupter circuit causes the sequence tone control circuit to pause for about three seconds before the next three sequences of three tones is allowed. The details of the circuit follows.

Referring to FIG. 13 for a detailed description it will be assumed that a link is in condition to ring a called line, therefore lead RMST will have —10 volts placed thereon as can be seen by reference to the section titled "Ringing."

Transistor 1313 is normally biased on clamping lead 1314 to about —1.5 volts through resistor 1315, diode 1316, and the collector-emitter path of transistor 1313. When the —10 volts appears on lead RMST, transistor 1313 is cut-off causing diode 1316 to become reverse biased thereby unclamping the interrupter circuit associated with transistors 1317 and 1318. The start circuit is not essential but has the advantage that ringing starts immediately after seizure of a called line and the first ring is always a full sequence of the melodic tone combination.

When diode 1316 becomes blocked transistor 1317 which is normally cut-off is turned on and its collector is clamped through diode 1319 to a voltage between 0 and +1.2 volts, depending upon the setting of resistor 1320. The voltage at point 1321 will always be negative as will be explained later, therefore diode 1322 is blocked as long as transistor 1317 is on. Due to the fact that transistor 1317 is saturated and its collector is clamped to a voltage depending on the setting of 1320, its emitter voltage and the emitter voltage of transistor 1318 can be adjudged by means of resistor 1320.

The base current of transistor 1317 charges capacitor 1323 to about +10 volts. This charge remains on capacitor 1323 as long as transistor 1317 is saturated.

Positive 10 volts through resistor 1324 and a 5 volt Zener diode 1325 to ground, maintains a steady +5 volt potential at points 1329 and 1330 independent of variations in the voltage from the power supply. When a —10 volt pulse appears on lead 1332, and diode 1316 is still blocked, diode 1331 conducts and electrons flow through capacitor 1326, silicon-diode 1327, and capacitor 1328. This occurs when a sequence of three tones has been generated by the successive operation of transistors 1335, 1334, and 1333 as will be seen later.

The —10 volt pulse discharges capacitor 1328 to about 2 volts, and since the initial charge on the capacitor 1328 was about 5 volts, the voltage at point 1336 is about +3 volts. The silicon diode 1337 is therefore blocked because the voltage at point 1341 is about 1 volt. The voltage at point 1329 of about +5 volts blocks diode 1338. The total voltage across capacitor 1326 is about 13 volts as long as the —10 volt pulse is present. When the pulse is removed due to the continued operation of the tone sequence control circuit as will be seen later, capacitor 1326 discharges through resistor 1339 and diode 1338 until the voltage across capacitor 1326 is 5 volts. Since the voltage at point 1340 was at +5 volts during the discharging of capacitor 1326, and the voltage at point 1336 was about —3 volts, the silicon diode 1327 is blocked and the charge remains on capacitor 1328.

When the second sequence of three tones has been completed —10 volts again appears on lead 1332, the discharge current flows in the same path as described above and the voltage across capacitor 1328 drops to 1.4 volts. When —10 volts is removed from lead 1332 again due to the continued operation of the tone sequence control circuit, capacitor 1326 discharges again and diode 1327 blocks. The voltage at point 1336 is about +1.4 volts and the silicon diode 1337 is still blocked.

When —10 volts appears on lead 1332 for the third time, the discharge current flows in the same path as before. As capacitor 1328 discharges, the voltage at point 1336 drops from about +1.4 volts, and when the voltage at point 1336 drops to about .6 volt below the voltage at point 1341, diode 1337 conducts.

Transistor 1318 thereby turns on, and the voltage at point 1342 which was at about —10 volts when transistor 1318 was cut-off now approaches 0 volts. The base of transistor 1317 now rises to about +10 volts cutting itself off and causing —10 volts to appear at lead 1343. The appearance of —10 volts on lead 1343 stops the operation of the tone sequence control circuit and hence the ringing tone as will be seen later.

Therefore it can be observed that the tone sequence control circuit and hence the ringing tone is not operative when the ringing machine start control circuit is not operative and after the tone sequence control circuit has completed 3 sequences of three tones each, but as will be explained in the following there will be but a 3 second pause before the tone sequence control circuit will be allowed to continue operation after it has been shut off due to the completion of the three seqeunces of three tones.

Continuing, the base current of transistor 1318 is supplied from point 1329 which is at +5 volts through one germanium diode 1338, and two silicon diodes 1327 and 1337 in series, which causes a voltage drop of about one volt, thus the voltage at the base of transistor 1318 is about +6 volts. The emitter voltages for both transistors 1318 and 1317 are about equal. During the time transistor 1318 is on, capacitor 1328 is charged to about 5.5 volts. Due to the collector current of transistor 1318, the potential at point 1344 is at about ground. The voltage across capacitor 1323 is about 10 volts, thus the voltage at the base of transistor 1317 becomes +10 volts and transistor 1317 is cut-off. To prevent this inverse base to emitter voltage from causing transistor 1317 to break down, diode 1345 is connected in series with the emitter of transistor 1317. Hence it can be seen that —10 volts now appears on lead 1343 while transistor 1317 is cut-off.

Transistor 1318 will continue to be cut-off until capacitor 1323 discharges through resistor 1346 to about 5 volts where the base of transistor 1318 becomes negative with respect to its emitter and transistor 1318 begins to saturate. Then the voltage at point 1347 drops from about +6 volts to about +1 volt and transistor 1318 is cut-off.

Since no —10 volts now appears on lead 1343, the tone sequence control circuit will resume operation until another three sequences of three tones has been completed.

If the called party answers during the ringing period the tone sequence control circuit is not stopped and therefore ringing tone is not stopped in the ringing tone generator although the ringing tone will not be gated to the called subscriber as will be explained later. The reason for this is as has been stated, that being to insure a complete sequence of the melodic tone combination.

Explaining the above it can be seen that —1.25 volts would appear on the collector of transistor 1313 if —10 volts did not appear on lead RMST. If this occurs during the ringing period when transistor 1317 is turned on, the current available from the ringing machine start control circuit is about .20 ma. and the inverse base current fed through resistor 1348 is about .23 ma. Therefore, transistor 1318 cannot be turned on and hence transistor 1317 cannot be turned off during the ringing period. However, as soon as the ringing period is completed transistor 1318 will be turned on and transistor 1317 will be turned off.

Transistor 1318 will now turn on due to the three pulses on lead 1332 as has been explained and transistor 1317 will turn off. As long as transistor 1313 remains saturated the base voltage of transistor 1318 remains at about +3 volts and the emitter approximately the same. The collector is clamped to ground and after capacitor 1323 is completely discharged, a base current of about .03 ma. is supplied to transistor 1317. This base current, however, is not sufficient to provide a collector current in excess of 1.5 ma. which is required to bring the collector of transistor 1317 above −10 volts. Therefore, −10 volts is present on lead 1343 as long as transistor 1313 is saturated and operation of the tone sequence control circuit is prevented.

The number of pulses on lead 1332 required to turn transistor 1318 on depends upon the capacitance ratio of capacitors 1326 and 1328 and the emitter voltage at transistor 1318 when transistor 1317 is saturated. In order to compensate for the variation in the capacitance ratio due to standard tolerances, the emitter voltage for transistor 1318 is made adjustable by means of resistor 1320. Higher value for the capacitance ratio requires fewer pulses, and a lower emiter voltage at transistor 1318 requires more pulses.

Turning now to an explanation of the tone sequence control circuit associated with transistors 1333, 1334, and 1335, it can be seen that all these transistors are biased to cut-off and ground is normally placed on their output leads. When −10 volts is present on lead 1343, a capacitor 1349 is not charged since lead 1352 and point 1353 are at about −10 volts. Capacitors 1350 and 1351 have a charge which is dependent upon the setting of resistor 1354 since the voltage at points 1355 and 1356 is approximately −10 volts and the voltage at points 1357 and 1358 is determined by the setting of resistor 1354. During this time the tone sequence control circuit is not operative.

When −10 volts is removed from lead 1343, that is when transistor 1317 is turned on, the voltage at point 1321 is then determined by the voltage at the slider of resistor 1354, which is between 0 and −10 volts. Point 1321 is negative, diode 1322 is not conducting, and the interrupter circuit is not inhibiting the tone sequence control circuit.

Electrons flow from the −20 volt supply through resistor 1359, charge capacitor 1349, and flow through resistor 1360 to the +10 volt supply. Transistor 1335 saturates and places −10 volts on its output lead 1361. Diode 1362 conducts and capacitor 1350 discharges.

Transistor 1335 remains saturated until the voltage at point 1321 reaches the same value as the voltage at the slider of resistor 1354. Then diode 1363 conducts and the voltage across capacitor 1349 remains constant, that is, the charge current is zero. Therefore transistor 1335 cuts-off and ground is present at the collector of transistor 1335 which blocks diode 1362.

A similar charge current now flows through capacitor 1350 causing transistor 1334 to saturate and the circuit associated with transistor 1334 behaves in the same manner as the circuit associated with transistor 1335. When transistor 1334 turns off, transistor 1333 saturates. Again when transistor 1333 turns off, transistor 1335 starts to saturate and the tone sequence control circuit has completed one cycle. As has been explained after three cycles or what has been called three sequences of three tones the tone sequence control circuit is interrupted for about three seconds.

The time for one sequence of three tones can be adjusted by adjusting resistor 1354. A greater negative setting of the slider of resistor 1354 causes a shorter time for one sequence.

Collector current from transistors 1335, 1334, and 1333 flows through resistors 1364, 1365, and 1366 respectively to lead RGP to the line-link common equipment the effect of which is explained in the section titled "Ringing."

Also −10 volts or ground is impressed on leads 1310, 1311, and 1312 leading to the ringing tone oscillator to produce the melodic tone combination as will be hereinafter explained.

The ringing oscillator circuit will now be explained in detail. This oscillator is essentially a blocking oscillator where the frequency is determined by a RC time constant. The collector circuit is tuned to a frequency lower than the inverse valve of the RC time constant and tends to smooth the output waveform. This oscillator will oscillate at three different frequencies, one at a time, as will be explained later. These frequencies have been chosen as about 500 cycles per second, 600 cycles per second, and 400 cycles per second in that order.

An NPN transistor 1309, indicated as such, is used. The emitter direct current voltage (−10 volts or ground) is supplied by the tone sequence control circuit over leads 1310, 1311 and 1312. When ground is present on all oscillator input leads 1310, 1311 and 1312, transistor 1309 is biased to cut-off and output is ceased. This occurs when ringing tone is not required and when three sequences of the three tones have been allowed as has been previously explained.

When −10 volts appears on any input, for example, lead 1312, capacitor 1367 which is the feed back capacitor charges through resistor 1368 and part of transformer 1369. As capacitor 1367 charges the voltage at point 1370 drops. When it reaches approximately −5 volts, transistor 1309 turns on and its collector drops from +5 volts.

The current through capacitor 1367 changes direction and starts discharging capacitor 1367. This discharge current provides a positive feed back through resistor 1371 which limits the current during the first part of the cycle.

As capacitor 1367 discharges, the collector current has to increase in order to sustain a constant feed back current, but a constant feed back current only provides a constant collector current. Therefore, the feed back current starts to decrease causing a decrease in the collector current which causes the voltage across transformer 1369 to reverse. The feed back current now becomes negative and turns off transistor 1309 and feed back capacitor 1367 charges through the same path as described above. As capacitor 1367 charges, the voltage at point 1370 drops to about −5 volts causing transistor 1309 to turn on again and a second cycle is started.

The time constant involved in the charging path determines the oscillator frequency. Each input is therefore individually tunable by means of resistors 1368, 1372 and 1373.

It should now be clear that three different tones are produced one at a time followed by a pause and if necessary another sequence of three different tones one at a time.

Before the tone sequence emerges from the ringing tone generator circuits it is passed over lead 1374 to an amplifier associated with transistor 1375. This amplifier circuit is purposely overdriven by the nearly sinusoidal input signal to produce a rectangular output signal in order to affect the high efficiency of conversion of the multiplex control signals into audio frequency signalling in the line circuit.

The ringing tone is taken directly from the collector of transistor 1375 on lead RG and its use has been specifically explained.

The ring back tone signal level is reduced to an appropriate valve by the voltage divider of capacitor 1376 and resistor 1377 and is placed on lead RBT and is used in a manner described in the section titled, "Ringing."

*Dial and Busy Tone Generator*

A single oscillator is provided to produce both dial tone and busy tone. The output for dial tone is simply the tone produced by the oscillator circuit and is ever present for use on the dial tone lead DLT. The output tone from the oscillator circuit is also fed into a busy tone amplifier which is normally blocked by an interrupter circuit. The interrupter circuit is similar to a two-stage free running multivibrator circuit which alternately blocks and opens the busy tone amplifier at a period of about 1 cycle per second. The interrupter circuit is operated under control of a busy tone start control circuit which permits or inhibits the operation of the interrupter circuit.

Therefore, it can be seen that the busy tone will not be ever present on the busy tone lead BST unless the busy tone start control circuit is operated. A detailed description of the circuit follows.

Referring to FIG. 13, transistor 1301, there is associated therewith circuit elements comprising a free-running oscillator. The tank circuit is tuned to about 550 cycles per second and the RC time constant is adjusted to provide a blocking frequency of about 110 cycles per second. This mode of operation provides a tone similar to that generated by a brass base tone buzzer.

When the power is first applied the feed back capacitor 1303 charges through the series resistor 1305 and part of the transformer 1302. As capacitor 1303 charges the voltage at point 1306 becomes negative. When the voltage at point 1306 becomes slightly negative transistor 1301 is turned "on" and the collector begins to swing from +20 volts towards ground.

During that period a positive feed back current is provided through capacitor 1303 and resistor 1304 thereby decreasing the charge thereon. When the slope of the collector voltage becomes positive the feed back capacitor 1303 starts charging and cuts off transistor 1301. When the voltage at point 1306 drops below zero, transistor 1301 turns on again and another cycle is initiated.

Even though the charge time is about four times as long as the discharge time, the charge is not great enough to balance the discharge and after a few cycles, depending upon the network constants, the charge on the feed back capacitor 1303 reaches its minimum value and turns off transistor 1301 during the next few cycles until the feed back capacitor 1303 is charged to a point where the voltage at point 1306 is slightly negative, thereby completing one complete cycle.

The "Q" of the tank circuit is high enough to sustain the oscillations in the tank circuit for several cycles even when the transistor 1301 is completely cut-off during the whole cycle but at a continuously diminishing amplitude. The high frequency (about 550 cycles per second) is determined by the tuning of the tank circuit and the amplitude variations by the RC time constant which is adjustable by means of resistor 1305.

Dial tone is fed through resistor 1307 and capacitor 1308 to the dial tone lead DLT and as has been previously stated will be ever present on lead DLT whether it is needed or not.

Again as has been stated the tone from the oscillator circuit is also fed into a busy tone amplifier, but whether the amplifier will transmit the tone or not is dependent upon the circumstances that will now be explained.

No busy tone is transmitted through transistor 1378 of the busy tone amplifier circuit to busy tone lead BST unless the busy tone start control circuit is operated.

The busy tone start control circuit consists of lead BTST which is the busy tone start lead and is coupled to the busy test leads BT of the sequence switch in all the links through an isolating diode typified by diode 808, a 7 volt Zener diode 1382, diode 1381, resistor 1380 and control lead 1379.

Control lead 1378 is normally at +7 volts due to current flowing from +20 volts through resistor 1380, the 7 volt Zener diode 1382, and diode 1381. The busy tone interrupter is blocked under these circumstances as will be explained later. When a link is in condition to perform a busy test and signal a calling subscriber of a busy condition, it places −10 volts on lead BTST. The potential at point 1383 is then −10 volts causing −3 volts to appear on lead 1378. This change on lead 1378 from +7 volts to −3 volts enables the busy tone interrupter circuit to operate as will now be explained.

Turning now to the interrupter circuit associated with transistors 1384 and 1385 it can be seen that when +7 volts is present at point 1386 both transistor 1384 and 1385 will be cut-off and their collector voltages will be −10 volts and therefore capacitors 1387 and 1388 will be charged to approximately 17 volts. The busy tone amplifier will be blocked at this time as will be later explained.

When the potential at point 1386 becomes −3 volts that being when the busy tone start control circuit is operated either transistor 1384 or 1385 saturates and in so doing prevents the other from turning on.

Assuming transistor 1384 saturates, its collector potential changes from −10 volts to +5 volts, therefore, the base voltage of transistor 1385 becomes +22 volts and cuts off transistor 1385. The collector current of transistor 1384 is supplied through three different paths.

The first path is from −10 volts through resistor 1389, resistor 1390, and diode 1391 and this provides a potential of about −2 volts at point 1392 enabling the busy tone amplifier to conduct as will be explained later.

The second path is from −10 volts through resistor 1393 and is the collector voltage source.

The third path is from −3 volts through resistor 1394 and capacitor 1388 and this circuit discharges capacitor 1388 and when capacitor 1388 is completely discharged transistor 1385 saturates.

When transistor 1385 saturates, its collector becomes about +5 volts and due to the charge on capacitor 1387 the base of transistor 1384 swings to approximately +20 volts which causes transistor 1384 to cut-off. When transistor 1384 cuts-off approximately −10 volts is at point 1392 and transistor 1378 is cut-off thereby preventing the transmission of the tone from the oscillator circuit.

Since the collector potential of transistor 1384 is about −10 volts and the base of transistor 1385 is about +5 volts, the voltage across capacitor 1388 is approximately 15 volts.

Part of the collector current of transistor 1385 flows through resistor 1395 and discharges capacitor 1387 and when capacitor 1387 is completely discharged transistor 1384 saturates and the interrupter circuit has completed one cycle.

The diodes 1396 and 1397 are used to prevent a breakdown of transistors 1385 and 1384 due to the high inverse base emitter voltage when one transistor is cut-off by the other.

As has been explained point 1392 is normally at approximately −10 volts and the busy tone amplifier transistor 1378 is cut-off. However, when transistor 1384 saturates the potential at point 1392 becomes approximately −2 volts and transistor 1378 is biased as a "Class A" amplifier. It can be noted that a negative feed back is provided in the emitter circuit by resistor 1398.

Dial tone is fed to the base of transistor 1378 through a comparatively large resistor 1399 in order to prevent the variable load presented to the oscillator circuit by transistor 1378 from affecting the oscillator circuit.

Therefore it can be seen that the busy tone which will appear on the busy tone lead BST when needed only is an interrupted dial tone.

*Allotter*

The allotter circuit determines which idle link will be seized by a calling line. The allotter circuit allots one link at a time, that is there is only one link available at a time to be seized by a calling line. Also the allotter circuit allots the links for use sequentially so as to insure a more even use of all the links.

The allotter circuit in this description has but three stages although more could be readily added and this is because only three links are chosen to be used with this system. This is a choice of convenience and in no way is a limiting factor of either the system nor the allotter circuit.

There are two conductors between each link and the allotter circuit and they are leads AL—N and ON—N respectively, the numeral corresponding to the indicated "N" depending upon which link the two conductors are associated.

When a link is in an idle position −10 volts appears on its associated ON—N lead in the allotter circuit but this alone does not enable this idle link to be seized by a calling line. The allotter circuit in its sequential operation must determine which link is to be the next available link as far as use is concerned. When these two conditions occur, −10 volts is placed on the link's AL—N lead thereby enabling the link to be seized by the next calling line.

The allotter circuit has a sequential operation and it therefore will skip a position when that position happens to be in use. A detailed description follows.

Figure 19:
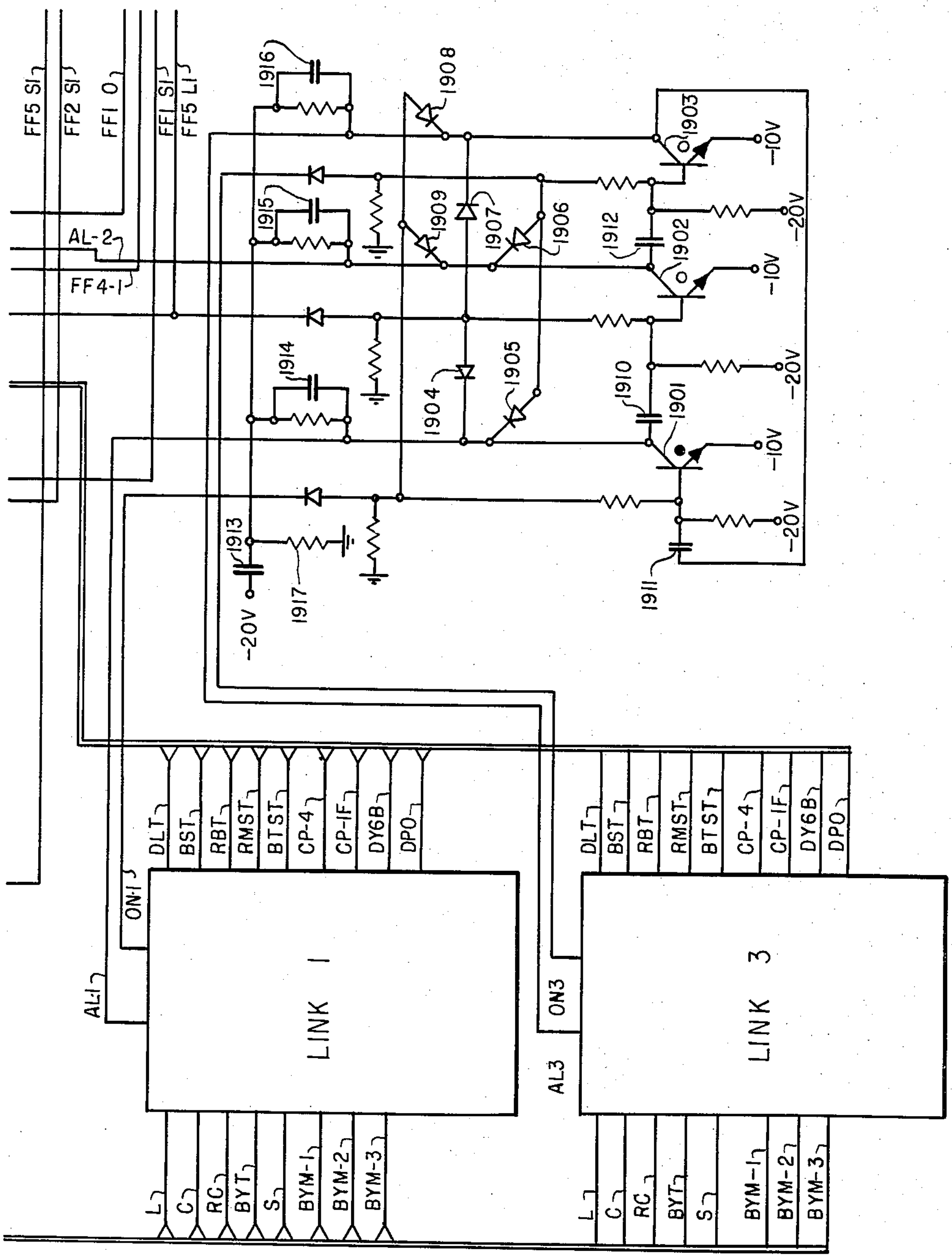

Referring to FIG. 19 there is contained the allotter circuit associated with transistors 1901, 1902 and 1903. The allotter is a ring-of-three counting chain arranged to feed −10 volts to one of its outputs AL–1, AL–2, or AL–3, provided at least one link is idle.

When the power is first turned on, one of the transistors saturates at random and in this explanation let us assume that it is transistor 1901. When transistor 1901 saturates it places −10 volts on the output lead associated therewith, namely lead AL–1.

The diodes 1904 and 1905 clamp the base circuit of transistors 1902 and 1903 to −10 volts, hence preventing transistors 1902 and 1903 from turning on. Diodes 1906, 1907, 1908, and 1909 are blocked while capacitor 1910 is charged to approximately 1.5 volts and capacitors 1911 and 1912 are charged to approximately 10 volts.

When −10 volts appears on lead ON–1, that being when link 1 is seized as has been previously stated, the base of transistor 1901 becomes negative with respect to the emitter of transistor 1901 and transistor 1901 turns off. The collector of transistor 1901 swings to ground and the positive charge current through capacitor 1910 turns transistor 1902 on. As transistor 1902 turns on, capacitor 1912 discharges to approximately 1.5 volts. This discharge current prevents transistor 1903 from turning on. When transistor 1902 is saturated it prevents transistors 1901 and 1903 from turning on by clamping diodes 1906 and 1909 to approximately −10 volts.

If link 2 is now seized, the allotter circuit steps to the third stage even if link 1 has become idle in the meantime because transistor 1901 is prevented from turning on by diode 1909 allowing approximately −10 volts to be placed on the base of transistor 1901.

If all three links are busy at the same time none of the transistors 1901 to 1903 in the allotter circuit will be saturated as can be readily seen. When one of the links becomes idle, the transistor in the allotter circuit associated therewith saturates because −10 volts is removed from its lead ON. If one of the other two links now becomes idle, the allotter circuit will remain in the same position since the two diodes from the collector of the saturated transistor to the base circuit of the other two transistors prevents these two transistors from turning on.

Capacitors 1914 to 1916 prevent high frequency operation of the allotter circuit and resistor 1917 and capacitor 1913 allow only one transistor to turn on when the power is first applied.

*DY–6 Scanner Circuit*

The magnetostriction delay line is used here as a generator of pulses of 1.5 microseconds in duration and −5 volts in amplitude spaced 22 microseconds apart. For the time relation of these scanner circuit pulses with the other pulses of the system, refer to the pulses on lead DY–6B in FIG. 21.

This scanner circuit is composed of a blocking oscillator circuit which feeds a transmitter coil wound around a nickel tubing, a nickel tubing which conducts the mechanical pulse generated by the transmitter coil down the nickel tubing to a receiving coil, and a receiving coil which has an electrical circuit associated therewith which shapes the electrical pulse generated in the receiving coil.

When the power is turned on an electrical pulse is generated in the blocking oscillator circuit. This electrical pulse is transformed into a mechanical pulse at the transmitting coil. The mechanical pulse is transmitted down the nickel tubing and after approximately 21 microseconds it appears at the receiving coil. The mechanical pulse is transformed into an electrical pulse at the receiving coil. This electrical pulse is then shaped and adjusted in the circuit associated with the receiving coil. This output electrical pulse is fed to the link circuit over lead DY–6B and its use in the system has already been explained. This output pulse is also fed back to the input of the DY–6 scanner circuit thereby causing another electrical pulse to be generated by the blocking oscillator circuit and the same process is repeated.

It has been stated that it takes, approximately 21 microseconds for the mechanical pulse to travel from the transmitting coil to the receiving coil but this is not the total delay of the scanner circuit. Approximately 1 microsecond delay occurs in the electrical circuit thereby adding to the 21 microseconds to give a total delay of approximately 22 microseconds.

In order to insure an accurately timed pulse on lead DY–6B, pulses from the "Clock" circuit on lead CP–1A are fed to the circuit associated with the receiving coil. These pulses prevent a pulse from being generated at the output of the scanner circuit when they are present in the circuit associated with the receiving coil and since these pulses are 0.5 microsecond in duration and spaced 2.0 microseconds apart, they accurately control the duration of the pulses from the scanner circuit at 1.5 microseconds in duration. The details of the scanner circuit follows.

When the power is first turned on, a positive bias current of about .2 ma. is supplied through resistor 1201 and transistor 1202 turns on. The emitter current of transistor 1202 flows through the transmitter coil 1203 of the magnetostriction delay line and the primary of transformer 1204 in parallel. A positive feed back then occurs through the secondary of transformer 1204 through diode 1206 and the series resistance 1207.

As the emitter current of transistor 1202 increases, the emitter of transistor 1202 swings toward −10 volts but the emitter of transistor 1202 cannot exceed this value since the base of transistor 1202 is clamped to about −10 volts by diode 1208. When the current through the transmitter coil 1203 starts to decrease, the voltage across the coil 1203 swings positive towards +10 volts and cuts-off transistor 1202. The diode 1209 conducts and capacitor 1210 is charged to about +10 volts. If no external pulse appears on the input of the blocking oscillator, the discharge current of capacitor 1210 would prevent transistor 1202 from turning on for about 200 microseconds.

Capacitor 1211 lowers the collector impedance during the time transistor 1202 is turned on.

The pulse generated by the blocking oscillator circuit is transformed into a mechanical pulse at transmitter coil 1203 and about 21 microseconds later the pulse appears in the receiver coil 1227. This pulse is amplified and timed in the receiver circuit as will be explained shortly hereinafter and fed to the input of the blocking oscillator circuit through a gate associated with diode 1212 and resistor 1213.

A threshold of about −1 volt is provided at the blocking oscillator input lead 1214 by resistor 1215 and resistor 1216. Diode 1217 is biased to cut-off until the potential on lead 1214 drops below −1 volt. Capacitor 1218 is inserted in order to separate the base bias of transistor 1202 from the input bias.

When the −5 volt pulse from the receiver appears, as will be explained shortly, on lead 1214, diode 1217 conducts and a charge current through capacitor 1218 turns on transistor 1202 and a pulse is generated in the same way as previously described. This process is repeated and it can be seen that the scanner circuit now operates as a pulse generator.

The receiver circuit has associated with it transistors 1220 and 1221 of which transistor 1220 is biased as a "Class A" amplifier. An emitter to base negative feed back circuit through ground is provided and the adjustment of variable resistor 1222 results in a method of adjusting the pulse width of the pulse passed through transistor 1220, namely the pulse from the receiver coil 1227. Winding of transformer 1223, and capacitor 1224, neutralize the inherent collector to base capacitance.

A pulse on lead CP–1A from the "Clock" circuit, the origin and nature of the pulse being previously explained in the section titled "Clock," is fed to the collector of transistor 1220 through resistor 1225 and diode 1226 to time and shape the pulse from the receiver coil 1227.

When the negative pulse appears in the receiver coil 1227, the current through transistor 1220 increases and the collector of transistor 1220 swings from −5 volts toward −2 volts. If a pulse from lead CP–1A is present at point 1228, the collector of transistor 1220 is clamped to −5 volts and therefore the collector of transistor 1220 cannot swing toward −2 volts before the clock pulse disappears. Therefore it can be seen that no pulse can be passed through the circuit associated with the receiving coil when there is a pulse on lead CP–1A.

The output pulse from transistor 1220 when not inhibited by the pulse on lead CP–1A is then fed to the primary winding of transformer 1223 where transformer 1223 steps this 3 volt pulse down to +1 volt on the secondary winding of transformer 1223. This voltage at the secondary of transformer 1223 causes silicon diode 1233 to conduct and transistor 1221 to turn off thus creating a −5 volt output pulse on lead DY–6B.

The pulse on lead DY–6B is then fed to the link circuit and also fed to the input of a gate circuit consisting of diode 1212 and resistor 1213. The pulse is gated through to lead 1214 where it is fed back to the oscillator circuit where another pulse is caused to be generated as has been explained.

In summary it can be stated that the scanner circuit is a use of a magnetostriction delay line wherein an accurately shaped pulse is generated every 22 microseconds to function in the overall system as has been previously described.

*Subsets A and B*

The subsets which terminate the various lines of the system are identical and well-known in the art with the exception that tone signaling is used in lieu of the usual ring.

There is illustrated in FIG. 5 two subsets; subset "A" which terminates line 1; and subset "B" which terminates line 2. The only parts of either subset which are shown are the 50 volt Zener diodes 231 and 281, the loudspeaker audio transformers 232 and 282 and the loudspeakers 233 and 283. All the other equipment is conventional and need not be explained. The Zener diode is a well-known item and need not be explained.

From the above it can be seen that the ringing signal will be an audio tone transformed from electrical energy into sound by the loudspeakers 233 and 283.

*Line Circuits*

As has been previously stated, the two line circuits 101 and 102 are utilized to terminate the lines 1 and 2. These two circuits as well as the line circuits terminating the other lines of the system, lines 3 to 0, are identical in circuitry and mode of operation. Since both line circuit 101 and 102 are identical in every respect, the following description will be confined to line circuit 101 illustrated in detail in FIG. 5.

When the subscriber at subset "A" of line circuit 101, initiates a call; a circuit is completed from ground through resistor 202, a winding on transformer 201, the subscriber's line loop, diode 203, inductor 204, and a second winding on transformer 201 to −20 volts. The loop resistance is compensated in the subscriber's subset "A" and all other subsets to provide a line current of 30 ma. Thus there is a 10 volt drop across resistor 202 which appears across diode 205 biasing it in the reverse direction.

Point 209 remains near ground, however, due to shunt paths through diodes 207 and 208 to ground on leads DP–1 and S, respectively. Actually there is approximately +1.5 volts on lead DP–1 and that is obtained from the pulse distributor circuit which was explained in detail previously and this pulse distributor circuit cyclically removes the +1.5 volts for 2 microseconds out of every 20 microseconds, defining time slot 1 allocated to line 1.

Point 209 remains near ground during time slot 1 due to the ground normally on lead S. As has been previously stated when a link is free to answer calls and is selected for use by the allotter it sends out a continuous train of pulses spaced at 22 microseconds intervals on lead S. For the time space relation of these pulses with the other pulses of the system refer to FIG. 21. When such a pulse appears on lead S in coincidence with a similar pulse on lead DP–1, point 209 swings to −5 volts and transmits a pulse over lead C to the scanning link through the line link common equipment.

Upon receipt of such a pulse over lead C the link ceases its scanning operation as has been previously stated and thereafter sends a continuous train of pulses in time slot 1 over lead S, these pulses being returned over lead C as long as the loop circuit to subset "A" remains closed.

The −10 volts appearing across resistor 202 is also applied to the base of transistor 210 through resistor 234. The base of transistor 210 is normally clamped to lead DP–1 and hence approximately +1.5 volts. Thus transistor 210 is cut-off except during time slot 1 when the base voltage of transistor 210 becomes −1.2 volts. The base voltage of transistor 210 is clamped to −1.2 volts through diode 235 and two silicon diodes in series to ground as will be explained later in the detailed explanation of the "Line-Link Common Equipment."

When transistor 210 conducts, a current of 12 milliamperes flows from the collector of transistor 210. A current of 2 milliamperes is normally flowing from −20 volts through diode 211, resistor 212, and inductor 213 to −30 volts. With transistor 210 conducting, this 2 milliampere current is obtained from the collector of transistor 210 since diode 211 will be reverse biased.

The remaining 10 milliamperes flows through diode 214 and discharges capacitor 215 during the first half of the current pulse, then is switched through diode 216 to the common transmission line ±L for the second half of the pulse. During speech transmission the current is switched earlier or later than the midpoint as described in the section titled "Transmission."

The average voltage across capacitor 215 is −10 volts, the discharge effected by transistor 210 in time slot −1 being partially made up for between pulses by the base input circuit of transistor 218. The base-emitter path of transistor 218 is shunted by variable resistor 217 which is adjusted so as to provide a net current gain of 15 in the emitter follower circuit in which transmitter 218 is connected as is more fully explained in the section titled, "Transmission." As a result of this current gain the 1000 ohm line impedance seen looking into transformer 201 is changed to 15,000 ohms looking into the base of transistor 218 but without any change in voltage level. This is described in detail in the section titled "Transmission."

Dial tone is transmitted from the link circuit to the line loop over the common highway ±L and through this transmission gate, which is explained in detail in the section titled, "Transmission," at this time to inform the subscriber that he may proceed to dial.

During dialling excessive voltages would be applied to the transmission circuit, due to the rapid decay of flux in transformer 201 upon interruption of the line circuit, if no measures were taken to prevent it. Diodes 219 and 220 limit the voltage applied to the emitter of transistor 218 to values between ground and —20 volts as can be readily observed.

Each time that the line loop is opened by the impulse contacts of the dial, the point 209 is clamped to ground through diode 205 and resistor 202, thus interrupting the train of pulses on lead C in time slot 1 for the duration of the dial impulse. Conduction of transistor 210 is also interrupted but this in inconsequential since there is no need for transmission at this time. The pulses on lead C in time slot 1 are interrupted in like manner when the subscriber hangs up. These interruptions in the pulse train control operations in the link in the manner described previously in the general explanation of the system.

Dial tone, busy tone, ring-back tone, and speech transmission are all sent over the transmission common highway ±L and through the transmission gate associated with transistor 210 as explained in the section titled "Transmission," and will not here be discussed.

When subset "A" through line 1 is called by another subscriber the ringing generator is started as has been stated causing —20 volts to be applied to lead RRC during the ringing interval, as will be explained later in the "Line-Link Common Equipment" explanation, and a train of pulses in time slot 1 is transmitted over lead RC by the link circuit serving the calling subscriber as has been previously stated. For the duration of the coincident pulses on leads DP–1 and RC, —5 to —7 volts is applied from point 221 to point 222 of transformer 223 through diode 224.

Lead RG which is connected to terminal 225 of transformer 223 is alternately clamped to ground and raised to —10 volts at the ringing frequency rate as can be understood by reference to circuit explanation titled, "Ringing and Tone Generator." Assuming that lead RG is clamped to ground the current flow in winding 226 of transformer 223 increases linearly at a rate determined by the applied voltage and the inductance of winding 226 of transformer 223, reaching 3 to 4 ma. by the end of time slot 1.

The secondary winding 227 of transformer 223 is effectively open circuited at this time since the induced voltage biases diode 228 in the reverse direction because of the winding arrangement of transformer 223.

When the pulse on lead DP–1 expires it clamps point 221 to +1.5 volts through diode 237 as can be seen by reference to the "Pulse Distributor" circuit explanation. The flux in transformer 223 now commences to decay, reversing the voltage induced in its secondary and hence causing current to flow through diode 228 and the base-emitter path of transistor 230.

The low forward resistance of this circuit beyond the characteristic knee limits the voltage across winding 227 of transformer 223 to between ½ and 1 volt. The flux therefore decays at only one tenth the rate at which it rose during the input pulse.

The primary voltage is also limited by reason of the nature of the secondary load, hence diode 224 remains reverse biased. Current flows in the secondary winding 227 of transformer 223 for practically the entire 18 microsecond interval between successive input pulses.

Capacitor 229 smooths the wave form so as to provide a continuous drive to the base of transistor 230. The amplified current from the collector of transistor 230 flows over lead —L and a 50 volt Zener diode 231 in subset "A" to ground through the speaker transformer 232.

As can be seen this current varies in accordance with the ringing signal on lead RG producing an audible signal at subset "A."

Now when the called subscriber answers the —10 volts developed across resistor 202 by closure of the line loop results in a pulse train on lead C as has been explained which causes the link circuit to interrupt the pulse train on lead RC as has been previously stated, thus stopping the ring.

*Line-Link Common Equipment*

In the line-link common equipment circuit there are actually three circuits which are not truly part of the line-link common equipment in a literal interpretation but for convenience and ease of understanding these three circuits will be explained herein.

Figure 6:
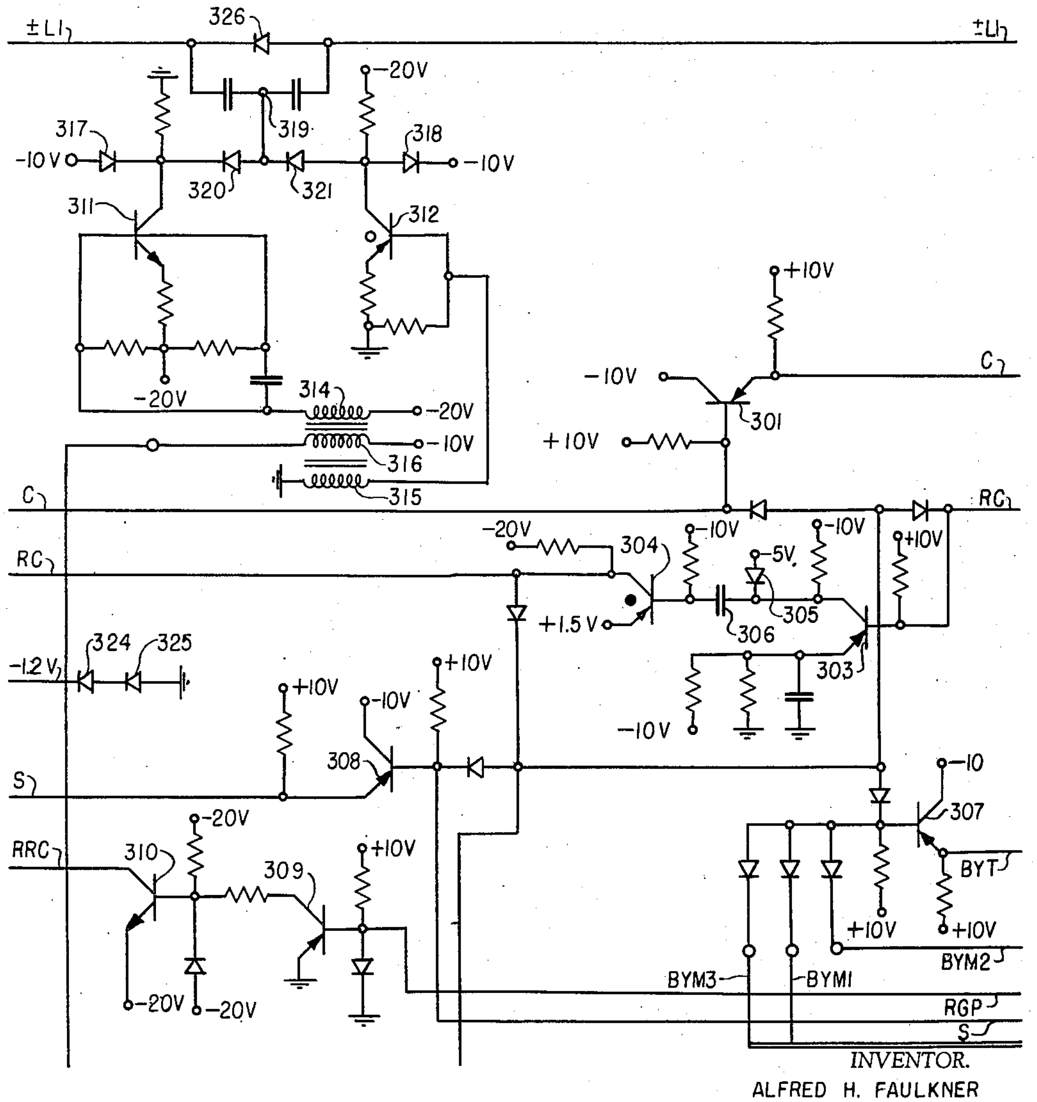

Strictly speaking the circuits common to both line and link are the circuits associated with leads ±L, C, S, and RC. The circuit associated with lead RGP and RRC is actually a part of the "Ringing Tone Generator" circuit and in this last-mentioned circuit explanation it has been stated that this circuit associated with lead RGP and RRC will here be explained. Also the busy mark circuit which is associated with leads BYM–1, BYM–2, and BYM–3 is, in actuality, equipment common to all the links and not the line-link but it is believed to be advantageous to explain it here. Turning to FIG. 6 a detailed explanation follows.

The lead C has associated therewith an emitter follower amplifier including transistor 301. The amplifier is biased as a "Class A" emitter follower amplifier and its function is to match the high impedance of the line circuit to the low impedance of the link circuit. The pulse on lead CP–1E which is illustrated in FIG. 21 is also fed to the base of transistor 301 in order to obtain a fast response. Therefore by this circuit a —5 volt pulse on the input at the base of transistor 301 is translated into a —5 volt pulse at the emitter of transistor 301 but with the desired impedance match.

Turning to lead S therein is an amplifier associated with transistor 308 identical to that on lead C but the input is from the link and the output is to the line circuit. Therefore the high impedance of the link is matched with the low impedance of the line.

The amplifier on the lead RC is a two stage amplifier and this amplifies the pulse amplitude. The input pulse is at —5 volt but the output pulse is a 8.5 volt pulse, going from +1.5 volt when the pulse is absent to —7 volt during the time the pulse is on.

Transistor 303 is biased to cut off and the emitter of transistor 303 is at about 1.25 volts. When the pulse appears on the RC lead from the link, a pulse on lead CP–1E appears at the same time thus aiding in a fast turn off of transistor 303. The collector of transistor 303 is clamped to —5 volts through diode 305. A capacitive coupling between the collector of transistor 303 and the base of transistor 304 is provided by the capacitor 306. Transistor 304 is normally saturated and +1.5 volts appears on the lead RC extending to the line. Therefore when the negative pulse appears on the RC lead from the link at the base of transistor 303, transistor 303 turns on and transistor 304 turns off placing —7 volts on lead RC going to the line circuit.

The amplifier associated with the busy mark leads BYM–1, BYM–2, BYM–3, and BYT does not match the line circuit to the link circuits but rather the links to each other. The function of the busy mark amplifier in the system has been previously explained in the general description of the system.

The busy mark amplifier associated with transistor 307 has three inputs any of which will trigger the amplifier. There is also a clock pulse on the lead CP–1E which causes a faster response to a pulse on any of the three input leads. Therefore a negative pulse on either lead BYM–1, BYM–2, or BYM–3, will cause a negative pulse on lead BYT. Since the transistor 307 is used in an emitter follower circuit and a −5 volt pulse is present on the input leads whenever there is a pulse at the input leads it can be seen that the output pulses on lead BYT are −5 volts in amplitude as well.

The ringing gate control amplifier comprises transistors 309 and 310 and has input and output leads RGP and RRC respectively. As has been stated it will be explained here for convenience.

In order to understand this circuit reference should be made to the section titled, "Ringing and Tone Generator," and further therein to the point where the operation of transistors 1333, 1334, and 1335 is explained. It can be seen that the collector current from transistors 1333, 1334, and 1335 flows through lead RGP to the base of transistor 309 when any of these three transistors is saturated. This current causes transistor 309 to saturate which in turn causes transistor 310 to saturate which places −20 volts on the output lead RRC. In order to understand the use of this circuit in the system refer to the section titled, "Ringing."

In order to cut down cross talk caused by the common highway lead ±L, a transmission clamp circuit is provided.

Both transistors 311 and 312 are cut off normally, a pulse on lead CP–1B from the "Clock" circuit is impressed on the primary winding of transformer 313 between transmission pulses. Reference can be made to FIG. 21 to see the relation of the pulse on lead CP–1B with the other pulses of the system.

The transformer 313 transforms the pulse on lead CP–1B at the primary of transformer 313 into a positive and negative pulse as caused by arrangement of the two secondary windings 314, and 315 of transformer 313. This causes transistors 311 and 312 to turn on.

The collector of transistor 311 swings negative and is clamped to −10 volts by diode 317. The collector of transistor 312 swings in a positive direction but it also is clamped to −10 volts that occurring through diode 318. Therefore point 319 is clamped to −10 volts through diodes 320 and 321 during the time the pulse is on lead CP–1B whether the previous potential was positive or negative. Thus a fixed voltage is maintained on lead ±L for the beginning of each new pulse thereby reducing cross talk.

Finally in this section there is the circuit associated with lead −1.2 volts. It has been stated in the section titled, "Line Circuits," that transistor 210 is clamped to −1.2 volts through two silicon diodes when a pulse appears simultaneously on leads DP–1 and S. These two silicon diodes are diodes 324 and 325 and there is approximately 0.6 volt drop across each. They have been placed in the line-link common equipment section for convenience but are actually common to the line circuits.

*Line Finder*

A functional diagram of a link circuit is shown in FIGS. 4A and 4B and it is there shown that the link circuit is composed of three units, those being the line finder, the connector, and the link transmission circuit.

The functional co-operation of the various sub-units of these three main units of the link in the overall system has been explained and it is the purpose hereto describe the sub-units of the line finder individually. Therefore each circuit of the sub-units of the line finder will be hereinafter explained or reference made to where an explanation may be obtained. The specific details of the various sub-units of the line finder follows.

*Gates G–1 to G–7 and Gates G–9, G–10, G–22 and G–24*

Figure 9:
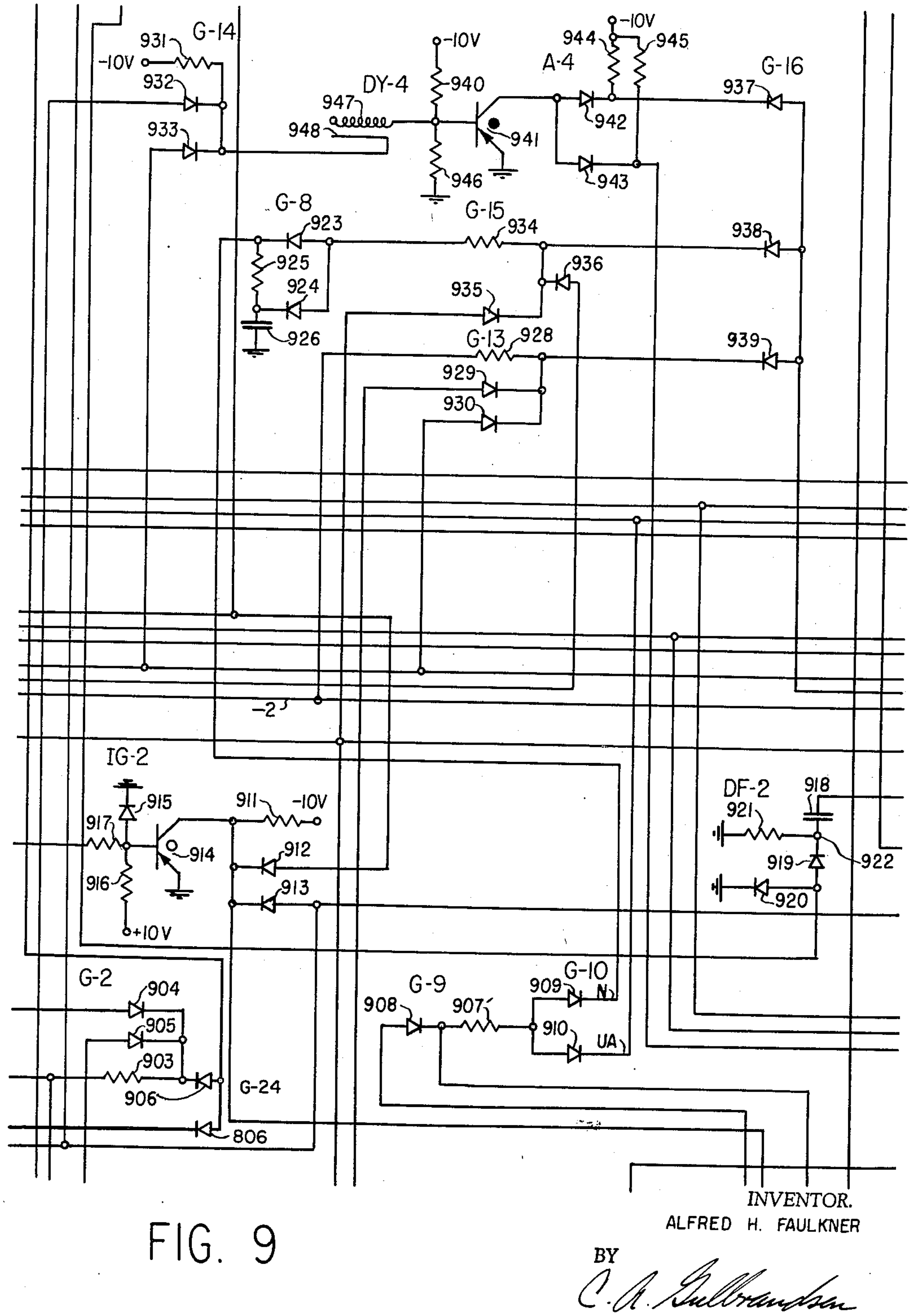
Figure 10:
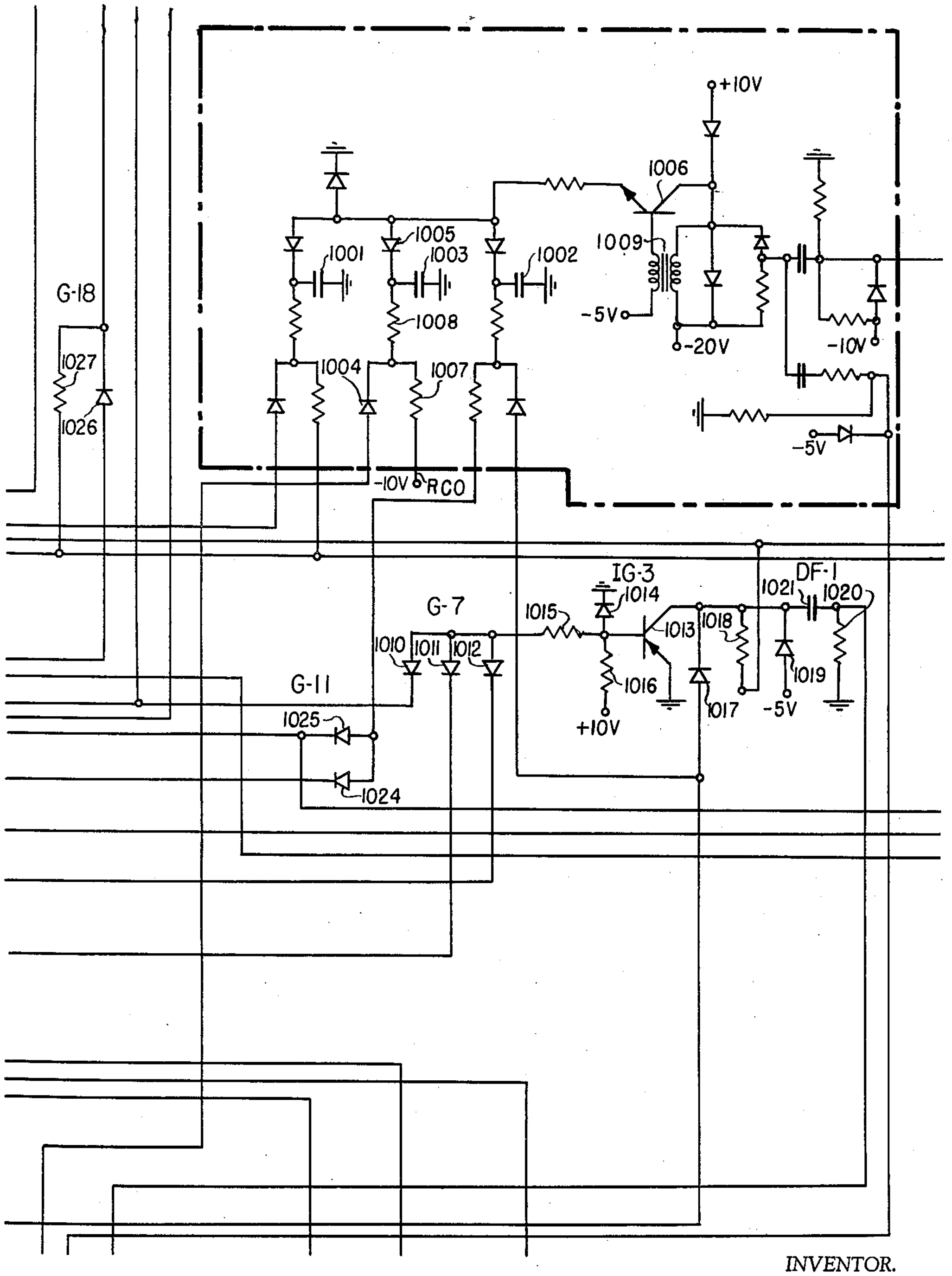

In FIG. 7, gate G–3 consists of diodes 701 and 702, gate G–5 consists of diodes 704 and 705 and resistor 703, and gate G–6 consists of diodes 706 and 707. In FIG. 8, gate G–1 consists of diodes 801 and 802, gate G–4 consists of diodes 803 and 804 and resistor 805, and gate G–22 consists of diodes 809 and 810. In FIG. 9 gate G–2 consists of diodes 904 and 905 and resistor 903, gate G–9 consists of resistor 907 and diode 908, gate G–10 consists of diodes 909 and 910, and gate G–24 consists of diodes 806 and 906. In FIG. 10, gate G–7 consists of diodes 1010, 1011 and 1012.

*Inhibit Gates IG–1, IG–2 and IG–3*

Inhibit gate IG–1 is explained in detail in the section titled, "Inhibit Gates," inhibit gate IG–2 consists of transistor 914, resistors 911, 916 and 917, and diodes 912, 913 and 915 and it is the same as inhibit gate IG–1 except that instead of the collector voltage being supplied through one input it is permanently supplied through resistor 911 with the two input leads being supplied through diodes 912 and 913. Functionally there is no difference between inhibit gate IG–1 and inhibit gate IG–2 this will become clear by reference to the section titled "Inhibit Gates." Inhibit gate IG–3 consists of transistor 1013, diodes 1014 and 1017, and resistors 1015, 1016 and 1018 and it is identical in operation to inhibit gate IG–1.

*Flip-Flop FF1 and FF2*

The detailed explanation of these two circuits may be found in the section titled "Flip-Flops."

*Delay Line DY–2*

The detailed explanation of Delay Line DY2 can be found under the section titled "Magnetrostriction Delay Lines" subtitled, "Delay Line DY2."

*Amplifier A–1 and A–2*

The detailed explanation of amplifier A–1 may be found in the section titled, "Amplifiers." Amplifier A–2 consists of transistor 711, resistors 709 and 710, and diode 708 and functionally performs the same as amplifier A–1 but amplifier A–2 has only one output lead that being lead BYM–2.

*Differentiating Circuit DF–1*

The differentiating circuit DF–1 consists of diode 1019, resistor 1020, and capacitor 1021 and is provided to convert step-function signals on lead FF2–0 and UA of inhibit gate IG–3 and a pulse train on input lead 1022 of inhibit gate IG–3 into a single pulse at the output lead of differentiating circuit DF–1, lead FF4–S1, for a purpose which is evident from the general description of the system.

Capacitor 1021 is normally discharged. When a line is found by the line finder circuit, −10 volts is applied to lead UA to prepare for receipt of the dial impulses. This −10 volts potential is applied through resistor 1017 to point 1023, but this point is clamped to ground by lead FF2–0 at this time. Upon receipt of a dial impulse lead FF2–0 switches to −10 volts for the duration of the impulse which can be seen by reference to the general explanation of the system and the detailed description of flip-flop 2 in the section titled "Flip-Flops."

Since the operation of the flip-flop controlling lead FF2–0 is initiated by an output pulse obtained from lead DY2B through gate G–7 as has been previously explained, this lead will always have a negative signal on it at the time that lead FF2–0 swings negative. Lead DY2C through gate G–7 swings negative shortly after lead DY2B swings negative, as has been previously explained, and remains negative until the expiration of the succeeding time slot. Thus transistor 1013 is conducting at this time and it blocks the signal at point 1023 until the expiration of the time slot following that in which the switch is made, to insure that the output of differentiating circuit DF–1 coincides with the start of a subsequent time slot.

Following the expiration of the pulse on lead DY2C transistor 1013 is cut-off and point 1023 swings negative permitting current to flow from −10 volts at lead UA through resistor 1018 and capacitor 1021 to the input lead FF4–S1 of flip-flop FF4. Wtihin 2 micro-seconds this capacitor charges to a point where diode 1019 conducts and interrupts the flow of current over lead FF4–S1. Capacitor 1021 continues to charge at a slower rate through resistor 1020.

The flip-flop FF4 controls gate circuits in the recirculating path of delay line DY–5, and flip-flop FF4 causes a 2 microsecond electrical delay line DY–4 to be inserted in the recirculating path when flip-flop FF4 is set to position 1 as has been explained in the general explanation of the system.

The next next output pulse from delay line DY–4 is then delayed 2 microseconds, displacing the succeeding output pulse from delay line DY–2 one time slot from its pervious position. The delayed pulse also resets flip-flop FF4, hence only one such shift in time position takes place. It is imperative that flip-flop FF4 be operated only once during a dial impulse. The rapid discharge of capacitor 1021 during the setting of flip-flop FF4 to position 1 provides such assurance.

It will be noted, however, that point 1023 does not remain at −5 volts continuously, instead it drops back to ground each time that transistor 1013 conducts in response to a pulse on the inhibit lead, lead 1022. Due to the fact that the duty cycle of the pulses is very low, point 1023 is at −5 volts for longer than it is at ground, hence capacitor 1021 never discharges sufficiently during such pulses to again operate flip-flop FF4.

From the above description it can be seen that it would be undesirable to operate flip-flop FF4 while a pulse is being recirculated from the output of delay line DY–5 to the input of delay line DY–5 due to the likelihood of mutilating the pulse. In order to prevent such an occurrence the output pulse from delay line DY–5 on lead DY5B is fed to the inhibit input of inhibit gate IG–3 through gate G–7 to block transmission of a pulse through differentiating circuit DF–1 until the recirculating operation has been completed.

*Differentiating Circuit DF–2*

The differentiating circuit DF–2 consists of diodes 919 and 920, resistor 921, and capacitor 918. The function of differentiating circuit DF–2 is quite different with respect to the function of differentiating circuit DF–1.

When the link circuit is idle, lead N of the sequence switch circuit is connected to −10 volts and capacitor 918 is charged to 10 volts. Diode 919 is then nonconducting. When the link circuit is in use lead N is returned to ground. Point 922 swings positive to nearly +10 volts and gradually returns to ground as capacitor 918 charges through resistor 921.

During release of the link, as has been previously explained, lead N is returned to −10 volts. A −10 volt transient is then transmitted through diode 919 to lead DY2–1NH of delay line DY–2 to interrupt the circulating pulse in delay line DY–2 as can be understood by reference to the section titled "Delay Line DY–2."

The transient is long enough to place delay line DY–2 in an idle condition and delay line DY–2 is ready to again circulate pulses when the allotter circuit again selects the corresponding link for use.

*Inhibit Gates*

Inhibit gate IG–1 is typical of all such gates used in this system and its detailed operation will be hereinafter explained.

This gate has three inputs, lead C, lead 817 from gate G–2, and lead 818 from gate G–22, and is arranged to produce a negative signal at its output, that being the collector of transistor 814, only when a negative signal is present at both of the first two input leads lead 817 and lead C, and is absent at the third or inhibit lead, lead 818.

The signal at the first input, lead 817, when present, is −10 volts and is from gate G–1. The second input, lead C, is normally at ground potential, swinging to −5 volts during a signal period. If there is no signal on inhibit lead 818 the transistor is reversed biased by the resistor 815 connected to +10 volts. Diode 813 limits the reverse voltage to a fraction of a volt. The transistor 814 is normally cut-off and therefore when both lead 817 and lead C have a negative voltage thereon it can be seen that the collector of transistor 814 and hence the output of inhibit gate IG–1 in this case rises to −5 volts.

However, even if there is a signal on leads C and 817 no output will occur if there is a negative signal on the inhibit lead 818. If a −5 volt signal appears at lead 818 a forward current of 0.4 ma. is caused to flow in the base of transistor 814 through resistor 816 thus driving transistor 814 into saturation and clamping the collector of transistor 814 and hence the output of inhibit gate IG–1 to ground. Thus a signal on the inhibit lead 818 prevents any output even though signals are present at both leads C and 817.

*Flip-Flop*

Figure 20:
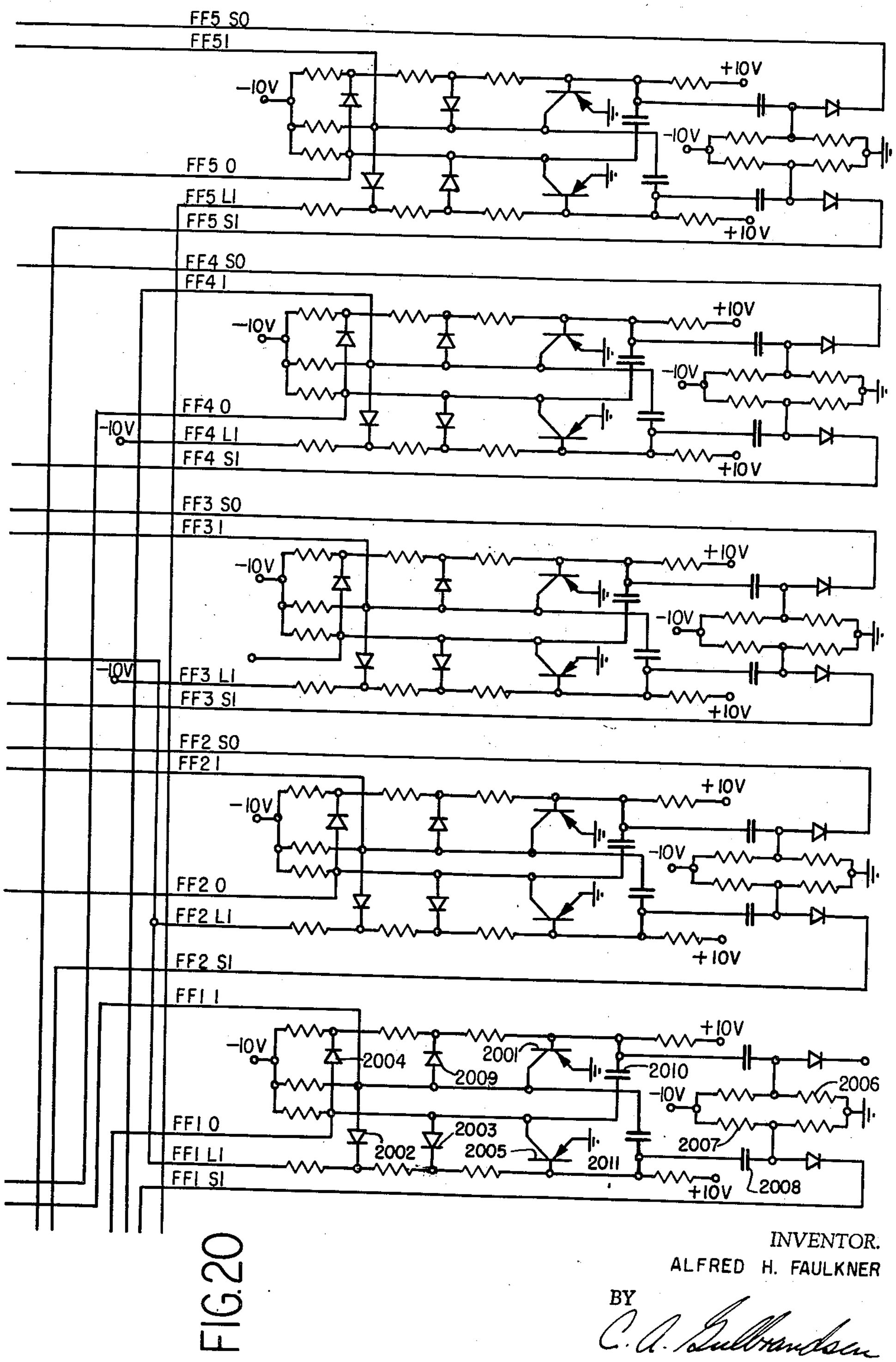

Referring to FIG. 20 there are shown the five flip-flop circuits used in each link. All five flip-flop circuits are identical in structure but not in use. One flip-flop circuit will be explained in detail and will suffice for an explanation of all five since they are identical.

The flip-flop circuits as used in this system have up to five external connections, leads S0, S–1, 1, 0, and L–1 which are preceded by the appropriate symbol for the flip-flop they are associated with such as FF–1–S0 representing lead S0 of flip-flop 1.

If −10 volts is present on flip-flop lead L–1 as is the normal situation for flip-flop circuits 1 to 5 then a pulse on the S–1 lead will place −10 volts on the 1 lead and remove −10 volts from the 0 lead and conversely a pulse on lead S0 will place −10 volts on the 0 lead and remove −10 volts from the 1 lead.

If −10 volts does not appear on lead L–1 then the flip-flop cannot be set to have −10 volts on lead 1.

If a pulse of over 20 microseconds in length is placed upon either lead S–1 or S0 when the other is at constant potential the flip-flop wil reset itself. That is a pulse of over 20 microseconds in duration on lead S–1 will cause −10 volts to be placed on lead 1 at the beginning of the pulse and ground to be placed on lead 1 at the end of the pulse.

However, a differentiating circuit placed in the S–1 lead will prevent the flip-flop from resetting itself regardless of the pulse duration.

Since the flip-flop circuit is symmetrical, a similar action will occur with a pulse of over 20 microseconds duration on lead S0.

Since this circuit can be set in either of its steady state conditions, it may act as a two position locking circuit and remains in the last position in which it is set even though the setting potential has been removed, alternatively it may be made to follow input pulses on one set lead when the other set lead is held constant.

Summarizing, a pulse of less than 20 microseconds in duration on lead S0 causes −10 volts to be placed on lead 0 and ground on lead 1 and a pulse of less than 20 microseconds on lead S1 causes −10 volts to be placed on lead 1 and ground on lead 0. This assumes −10 volts on lead L–1 which is the normal condition but if −10 volts does not appear on lead L–1 then −10 volts cannot appear on lead 1. If a pulse of over 20 microseconds or thereabout appears on lead S0 or S-1 then the flip-flop will reset itself at the end of the pulse. The details follow.

Refer to FIG. 20 flip-flop 1 and assume transistor 2001 is saturated and −10 volts appears on lead FF–1–L–1. In this description, the term "saturated" refers to a point on the collector characteristic immediately above the saturation line, that is to say near but not quite in the saturated condition. The flip-flop is shown in its "0" condition.

With transistor 2001 saturated, a slight negative voltage, in the order of −0.2 volt appears on the collector of transistor 2001, causing diode 2002 to conduct. The base of transistor 2005 is now maintained on a slight positive potential of approximately +1.1 volts. This causes transistor 2005 to remain cut-off and therefore diodes 2003 and 2004 are biased in their reverse direction.

To set the flip-flop to its "1" condition, a −5 volt to −10 volt pulse is applied to the set 1 lead, lead S–1. A threshold of −1.5 volts is established by a voltage divider in the input circuit, which consists of resistors 2006 and 2007, to prevent stray pulses of low amplitude from triggering the flip-flop. A negative differentiated pulse is applied to the base of transistor 2005 through input capacitor 2008 as a result of the pulse or step function applied to lead S–1.

Transistor 2005 saturates and lead 0 rises to approximately ground potential (actually about −0.2 volt due to the voltage drop in transistor 2005). Diode 2004 now conducts and the base of transistor 2001 rises to a positive potential. This causes transistor 2001 to cut-off and lead 1 to drop to −10 volts, since diodes 2002 and 2009 are biased in their reverse directions.

Diode 2003 or diode 2009 is blocked when either transistor 2005 or transistor 2001 is cut-off. When either transistor conducts diode 2003 or diode 2009 prevents its associated transistor from actually saturating by sharply reducing the base current as the saturation region is approached and thus prevents an accumulation of holes in the base region which would have to be collected during the off time. These diodes, therefore, decrease the fall time of the flip-flop output pulses or step functions.

Diodes 2002 and 2004 clamp the base circuit of the cut-off transistor to the collector of the saturated transistor which is at near ground potential. This insures that only one transistor conducts at a time, thus resulting in the bi-stable operation of the circuit.

To set the flip-flop to its "0" condition, a −5 volt to −10 volt pulse or step function is applied to lead S0, causing a negative pulse to be applied to the base of transistor 2001 in the same manner as has been stated above. This pulse causes transistor 2001 to saturate and its collector to drop to approximately −0.2 volt. This near ground potential on lead 1 causes diode 2002 to conduct and the base of transistor 2005 to rise from a negative to a positive potential. This causes transistor 2005 to cut-off and lead 1 to drop to −10 volts since diodes 2004 and 2003 are biased in their reverse direction.

When it is desired to restore the flip-flop to its "0" condition and maintain it in this condition regardless of pulses on lead S–1 as occurs during the release of the links, lead L–1 is used as follows: negative 10 volts is usually maintained and lead L–1 which allows the circuit to operate as described above. When −10 volts is removed from lead L1, the base of transistor 2005 goes positive and diode 2002 is biased in its reverse direction. The base of transistor 2001 goes negative causing it to saturate. Ground will now appear on lead 1 and −10 volts on lead 0 and a pulse on lead S1 cannot cause −10 volts to appear on lead 1.

In certain applications it is desirable to have the flip-flop follow the pulses on the S–1 lead when the potential on the S0 lead remains constant such as flip-flop 3. This may be accomplished by applying −8 volt pulses of approximately 20 microseconds duration or longer to lead S-1. At the beginning of the pulse the flip-flop will be set to 1 and at the end of the input pulse, due to the sufficiently large reverse surge in the input capacitor, it will be set back to the "0" condition.

To prevent this action in cases where the input to lead S–1 is a step function and the flip-flop is to remain set at the end of the step such as flip-flop 4, it becomes desirable to use a differentiating circuit ahead of the set lead to convert the step function into a short pulse. This assures that the flip-flop will respond only once at the beginning of the negative step voltage in response to the negative pulse on the set lead obtained by differentiation.

Since the flip-flop circuit is symmetrical, the features mentioned above also hold true for input pulses on the S0 lead when the potential on the S–1 lead remains constant.

The capacitors 2010 and 2011 coupling the base and collectors of opposite transistors are used to speed up the switching times of the transistors. For example, when transistor 2005 saturates its collector goes positive causing a positive pulse to pass through capacitor 2010 to the base of transistor 2001. This pulse forces transistor 2001 to be cut-off faster than it would otherwise cut-off by the method previously described.

*Magnetostriction Delay Lines*

When a magnetic force is applied to certain materials they will change their length. Whether it will be an elongation or contraction depends upon the properties of the material. Further, if these materials are elongated or contracted their permeability will change. These properties of the material can be used to convert an electrical pulse to a mechanical one, and vice versa. Since the propagation of the mechanical pulse is much slower than the propagation of an electrical pulse, the magnetostriction delay line becomes more convenient than an electrical delay line whenever a relatively long delay is required.

*Delay Line DY–2*

There is a magnetostriction delay line DY–2 provided for each link. The DY–2 delay line functions in this system primarily as a calling line memory device.

The application and use of this delay line DY–2 has been previously explained and a detailed explanation follows.

The magnetistriction delay line DY–2 is composed of a blocking oscillator circuit which feeds an electrical impulse to a transmitting coil which is wound around a nickel tube. The electrical pulse is transferred into a mechanical pulse at the transmitting coil and the mechanical pulse travels down the nickel tube to a receiving coil which transforms the mechanical pulse to an electrical pulse. An electrical circuit associated with the receiving coil shapes and forms the pulse.

This circuit not only delays any pulses delivered to the input thereof 20 microseconds before they reach the output but has auxiliary features as well.

An inhibit lead DY–2–INH is provided which when −5 volts is placed thereon will prevent any pulses which are in the delay line DY–2 from reaching the output lead DY–2B.

Also there is a lead DY–2–HOLD which will have −10 volts placed thereon during the time a pulse is at the input to delay line DY–2 and a short time thereafter. Thus if the output pulse from delay line DY–2 is fed back to the input of delay line DY–2 lead DY–2–HOLD will have −10 volts maintained thereon as long as recirculation occurs.

Also there is lead DY–2C which has −10 volts placed thereon whenever there is a pulse at the input of delay line DY–2.

The use of these auxiliary features in the system has been previously explained and a detailed explanation of delay line DY–2 follows.

When the power is first turned on an inverse base current of about 0.5 ma. is supplied to transistor 1402 and flows from +10 volts through resistor 1401, the base-emitter circuit of transistor 1402, and the transmitter coil 1403 to ground. Since this is not a self-starting circuit nothing will occur until a pulse appears at the input at point 1405.

A threshold of about −1 volt is provided at point 1405 by resistor 1415 and resistor 1416. Diode 1417 is biased to cut-off until the potential at point 1405 drops below −1 volt. Capacitor 1418 is inserted in order to separate the base of transistor 1402 from the input −5 volts.

No negative pulse will appear at point 1405 unless both lead CP–4 and 1413 have a negative pulse thereon. The pulse on lead CP–4 occurs every 2 microseconds and has been described in the section titled, "Clock." The relationship of the pulse on lear CP–4 with the pulses of the system may be seen by referring to FIG. 21. A negative −5 volt pulse appears on lead DY–2A under certain circumstances which have been described previously.

It therefore can be seen that due to diode 1412 no −5 volt pulse can appear at point 1405 unless a −5 volt pulse appears simultaneously on leads CP–4 and DY–2A. When this occurs transistor 1402 turns on and the emitter current flows through the transmitter coil 1403 and the primary of transformer 1404. A positive feedback is provided by the secondary of transformer 1404 through the diode 1406 and the series resistance 1407.

As the emitter current increases the emitter swings towards −10 volts. The emitter cannot exceed this value since the base of transistor 1402 is clamped to about −10 volts by diode 1408. A voltage dividing network is inserted between the −10 volts and −20 volts supply in order to maintain the negative clamping voltage a little lower than −10 volts and by that means a full −10 volts is obtained at the emitter of transistor 1402.

When the current through the transmitter coil 1403 starts to decrease, the voltage across the transmitter coil 1403 swings positive toward +10 volts and transistor 1402 is cut-off. The +10 volts at point 1414 therefore prevents transistor 1402 from turning on until the next pulse appears at point 1405. Capacitor 1411 lowers the collector impedance during the time transistor 1402 is turned on.

It can be now seen that −10 volts will occur on lead DY–2C whenever the transistor 1402 is conducting and only then. The use of the pulse of −10 volts on lead DY–2C has been previously explained.

Also it can be observed that diode 1434 will conduct when the emitter of transistor 1402 is at approximately −10 volts thus charging capacitor 1436 during that time. During all other times diode 1434 is blocked and capacitor 1436 is charged to −10 volts. However, capacitor 1436 is slowly discharged between conductions of transistor 1402 but substantially −10 volts is maintained thereon.

However, if no pulse appears at point 1405 and transistor 1402 does not conduct for a period of time capacitor 1436 will discharge to near ground.

Therefore it can be seen that −10 volts will be maintained on lead DY–2–HOLD constantly when delay line DY–2 is being constantly triggered which in this application is once every 20 microseconds.

The pulse which is sent to the transmitting coil 1403 is there transformed into a mechanical pulse and sent down the nickel tubing. Approximately 19 microseconds later the mechanical pulse appears at the receiving coil 1427 where it is transformed into an electrical pulse.

It has been stated that the mechanical pulse takes 19 microseconds to travel from the transmitting coil 1403 to the receiving coil 1427 and it is now stated that approximately 1 microsecond delay occurs in the electrical circuit associated therewith combining to produce a 20 microsecond delay line.

Transistor 1420 is biased as a "Class A" amplifier. A negative feedback from emitter to base occurs through ground, and variable resistor 1422 can therefore be used to adjust the pulse width of the pulse received from the receiving coil 1427. The center winding of transformer 1423 and capacitor 1433 neutralize the inherent collector to base capacitance of transistor 1420.

A pulse on lead CP–1F from the "Clock" circuit which has previously been described is fed to the collector of transistor 1420 through diode 1426 to time and shape the output pulse from transistor 1420.

When the negative pulse appears in the receiving coil 1427 the current through transistor 1420 increases and the collector of transistor 1420 swings from −5 volts toward −2 volts. If a pulse is present on lead CP–1F the collector of transistor 1420 is clamped to −5 volts and cannot swing toward −2 volts as long as the pulse on lead CP–1F remains. Therefore it can be seen that the pulse will have a time duration equal to that between two successive pulses on lead CP–1F. Thus, by proper adjustment of the pulse width, the output pulse from transistor 1420 will be 1.5 microseconds in duration.

The output pulse from transistor 1420 is fed into the primary winding of step down transformer 1423. Transformer 1423 transforms the 3 volt pulse in the primary winding down to a +1 volt pulse in the secondary winding. The +1 volt pulse causes diode 1430 to conduct and transistor 1421 to cut-off thereby causing a −5 volt pulse to occur at the output lead DY–2B. This pulse will be 1.5 microseconds in duration and −5 volts in amplitude and is illustrated in FIG. 21.

An inhibit lead DY–2–INH is provided by the circuit connected to the "cold" end of the secondary winding of transformer 1423. Point 1429 is clamped to ground by diode 1430 and capacitor 1431 bypasses pulses of short duration to ground. If −5 volts is applied to lead DY–2–INH the potential at point 1429 will be −1.5 volts. Since the base of transistor 1421 is at ground, diode 1433 is therefore blocked. Since only +1 volt is produced in winding 5—6 of transformer 1423 in response to the 3 volt pulse at the primary winding 1–2 of transformer 1423, and an additional +0.6 volt is necessary to make the silicon diode 1433 conduct it can be seen that diode 1433 will be blocked whenever −5 volts appears on lead DY–2–INH and therefore no pulse will appear on line DY–2B at this time.

*Delay Line DY–5*

Delay line DY–5 operates in exactly the same way as delay line DY–2 but as has been previously explained it does not serve the same function as delay line DY–2. Delay line DY–5 does not have the auxiliary features of line DY–2–HOLD or DY–2C which has been explained in the section titled, "Delay Line DY–2" but except for this distinction the operation is exactly the same and no detailed explanation is deemed necessary. For a detailed explanation of this circuit with the above in mind refer to the section titled "Delay Line DY–2."

*Amplifiers*

The amplifier A–1 connected to the output of inhibit gate IG–1 is typical of all amplifiers used in the line finder and connector of the link and shall be hereinafter described.

Amplifier A–1 consists of transistor 819, resistors 822, 823, 825 and 826, and diodes 820, 821 and 824. In the absence of an input signal the base of transistor 819 is clamped to ground through diode 824 causing the emitter of transistor 819 to float at approximately ground potential. A current of 3 ma. thus flows from +10 volts through resistor 826 to the emitter of transistor 819 where it divides into three branches; 1 ma. flows through diode 820 and resistor 822 to −10 volts; 1 ma. flows through diode 821 and resistor 823 to −10 volts; and the remaining 1 ma. flows in the emitter collector path of transistor 819 to −10 volts.

When a −5 volt signal appears at the base of transistor 819, the emitter of transistor 819 rises to nearly −5 volts also, cutting off diodes 820 and 821. With −5 volts at the emitter of transistor 819 a current of 0.5 ma. flows over lead 827 to the input of inhibit gate IG–2 and 4.5 ma. flows to +10 volts through resistor 826, thus the total collector current is 5 ma. Also at this time lead 828 also rises to −5 volts although no current is drawn. It should be apparent that the value chosen for the emitter resistor 826 depends on the number of outputs controlled by the transistor 819.

*Connector*

The connector is one of the three units composing a link circuit and it is represented in functional symbol form in FIG. 4. The functional co-operation of the sub-units of the connector in the system has been explained and it is the intention of the applicant to explain the details of these sub-units, or indicate where an explanation may be found.

*Gate G–8*

This gate G–8 consists of capacitor 926, resistor 925, and diodes 923 and 924 and is a special purpose circuit necessitated by the fact that the outputs of the sequence switch circuit, see section titled, "Sequence Switch," do not overlap. The input to delay line DY–5 is controlled by gates G–8 and G–13. Gate G–8 is enabled by the sequence switch when the sequence switch is in its normal position and −10 volts appears on lead N. Gate G–13 which is explained later is enabled when the sequence switch is in its off-normal position that is when lead ON has −10 volts thereon.

When the sequence switch advances from its normal position to its off-normal position there is a brief period when −10 volts does not appear on either lead N or lead ON. Capacitor 926 which is charged through resistor 925 while the sequence switch is in its normal position and lead N has −10 volts thereon, feeds the output lead 927 through diode 924 for an appreciable interval after −10 volts is removed from lead N in order to bridge this mentioned gap and thereby prevent false operation of delay line DY–5.

*Gates G–11, G–13 to G–21, G–23 and G–25 and Diodes 719, 808 and 834*

In FIG. 7 gate G–17 consists of resistor 712 and diodes 713, 714, and 715; gate G–20 consists of diode 716 and resistor 717; and gate G–21 consists of resistor 718 and diodes 720 and 721. Diode 719, along with similar diodes of other links, forms part of an "OR" gate. In FIG. 8, gate G–19 consists of diodes 830, 831 and 832 and resistor 829; gate G–23 consists of resistor 807 and diode 833 and gate G–25 consists of diodes 715 and 832. Diode 834, along with similar diodes of other links, forms part of an "OR" gate. In FIG. 9, gate G–13 consists of resistor 928 and diodes 929 and 930; gate G–14 consists of resistor 931 and diodes 932 and 933; gate G–15 consists of resistor 934 and diodes 935 and 936; and gate G–16 consists of diodes 937, 938 and 939. In FIG. 10 gate G–11 consists of diodes 1024 and 1025; and gate G–18 consists of resistor 1027 and diode 1026.

Diode 808 is an isolating diode and its function is explained in the section titled, "Dial and Busy Tone Generator."

*Flip-Flops FF3, FF4 and FF5*

The detailed explanation of flip-flop circuits can be found in the section titled, "Flip-Flops."

*Delay Line DY–5*

The detailed explanation for delay line DY–5 may be found in the section titled "Magnetostriction Delay Lines" sub-section "Delay Line DY–5."

*Amplifiers A–4 and A–5*

Amplifier A–4 consists of transistor 941, resistors 940, 944, 945, 946 and diodes 942 and 943. This amplifier is much the same as amplifier A–1 explained in the section titled "Amplifier" except that the output is taken from the collector of transistor 941 in this case. Amplifier A–5 consists of transistor 722 and is self-explanatory.

*Delay Line DY–4*

This delay line DY–4 consists of a coil 947 and a copper shield 948. The copper shield is at the same potential as point 949 which is the output of "and" gate G–14. A capacitive effect occurs between the copper shield 948 and the coil 947. Therefore if the potential of the copper shield 948 changes, a change will occur in the coil. This change causes a pulse to travel the length of coil 947 in one microsecond and at the open-circuited end that pulse is reflected and returns to other end of coil 947 in another microsecond. Thus a pulse delayed 2 microseconds emerges from the coil 947 and that is fed to the input of amplifier A–4.

*Sequence Switch Driver*

This circuit performs the function of generating −10 volt pulses which are delivered to the sequence switch to advance the sequence switch. The performance of the sequence switch driver circuit has been previously described in the general explanation of the system and the detailed description of the internal structure of the sequence switch driver circuit follows.

Referring to FIG. 10 it can be seen that there are three inputs to the sequence switch driver, namely a change over input RCO and CO, a hold input RHD and HD, and a busy test input RBY and BY. As long as the potential on one of the two input leads of any of the inputs is positive with respect to the other, the ungrounded side of the associated timing capacitor, either capacitor 1001, 1002, or 1003 will be at the more positive potential of the two in its steady state condition. The input signals to this circuit are pulses or step functions that are at either ground or −10 volt potential.

If, for example, −10 volts is on lead RCO and ground is on lead CO, the diode 1004 will conduct and timing capacitor 1003 will be in a discharged condition since both of its plates will be at essentially ground potential. Diode 1005 coupling capacitor 1003 to the blocking oscillator associated with transistor 1006 is thereby blocked.

When −10 volts appears on both leads RCO and and CO, diode 1004 is cut-off and the timing capacitor 1003 charges through resistor 1007 and resistor 1008. The charging time is determined by the values of the timing capacitor 1003 and the series resistors 1007 and 1008.

The negative charge on capacitor 1003 builds up until approximately −5 volts is reached and then the blocking oscillator transistor 1006 conducts and the low impedance path of the emitter circuit causes a rapid discharge. The transformer 1009 causes the base of transistor 1006 to go more positive and transistor 1006 to continue conducting until the timing capacitor is completely discharged. This action results in a negative 5 volt pulse on lead FF3–SO and a negative 10 volt pulse on lead IN which is the input lead to the sequence switch.

If −10 volts still remains on leads RCO and CO the timing capacitor again charges and another pulse is generated in the same manner. This process continues until −10 volts is removed from either or both leads RCO and CO.

The hold input and the busy test input operate the same as the change over circuit, the only difference being in the time required to charge the timing capacitors 1001 and 1002.

The change over timing circuit allows the input gate to be opened and closed at dial pulse rates without generating an output pulse, however, the post digital step function causes an output pulse to be generated which causes the sequence switch to advance as has been previously described. Only one pulse is generated at this time since the −10 volts is removed from lead CO as has been previously stated.

If the called line is idle, −10 volts appears simultaneously on the busy tests leads RBY and BY as has been previously stated and another output pulse is generated to advance the sequence switch which closes the busy test input gate to only allow one pulse to be generated by the sequence switch driver at this time.

After the call is completed and the link is being released −10 volts appears at lead RHD and HD and two pulses are generated to drive the sequence switch to its home or normal position as has been stated.

*Sequence Switch*

The sequence switch circuit has five steady state conditions and it is in its home or normal position when −10 volts appears on lead N. An input pulse on lead A causes the −10 volts condition to advance to lead UA and a subsequent pulse on lead A will cause the −10 volt condition to advance to lead BT and so on until it reaches its home position again and the cycle has been completed. When the −10 volt condition is advanced to lead UA there is also a −10 volt condition caused on lead ON and that condition remains there as long as the circuit is not in its home or normal position. A detailed description follows.

Figure 11:
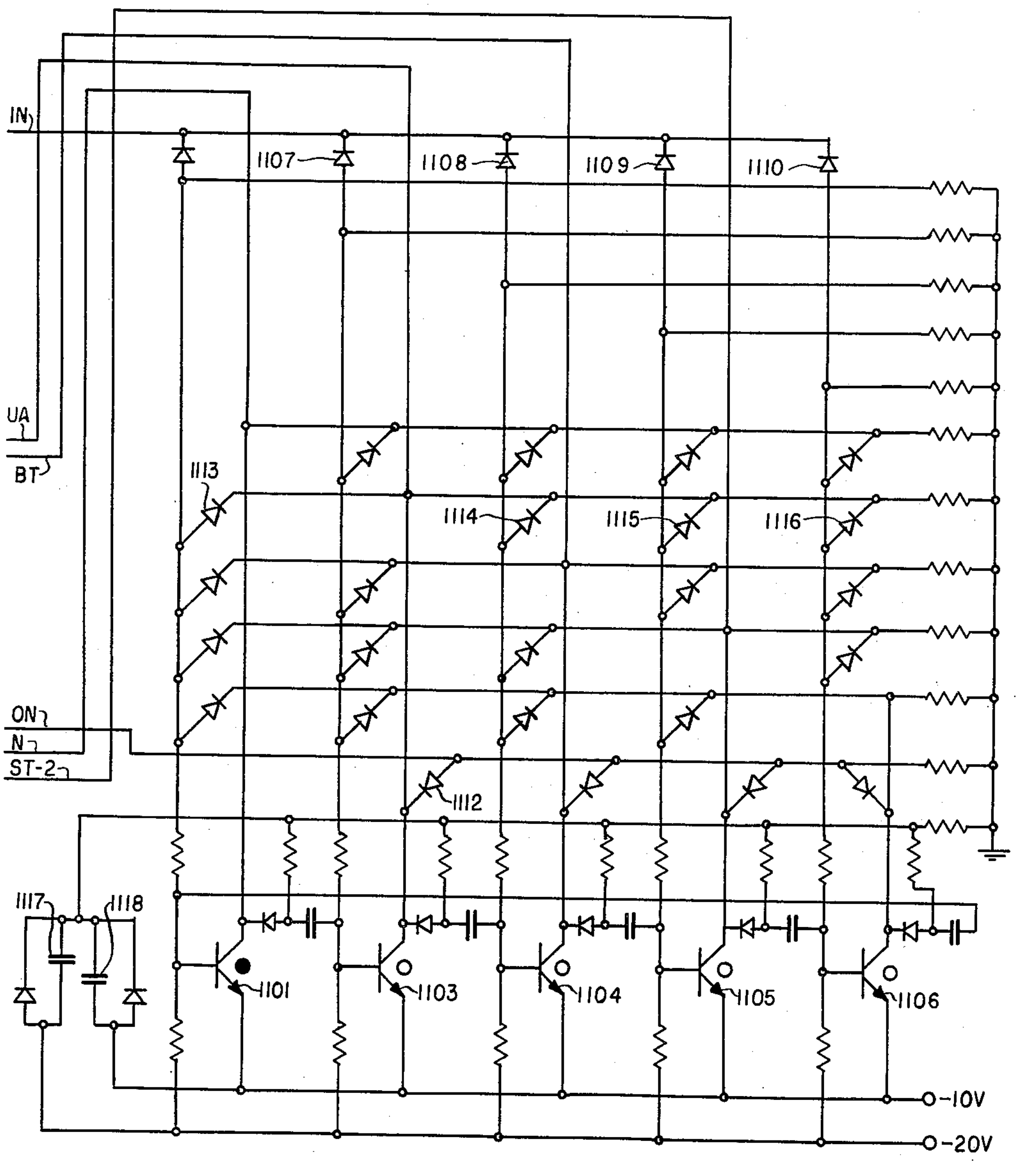
Figure 12:
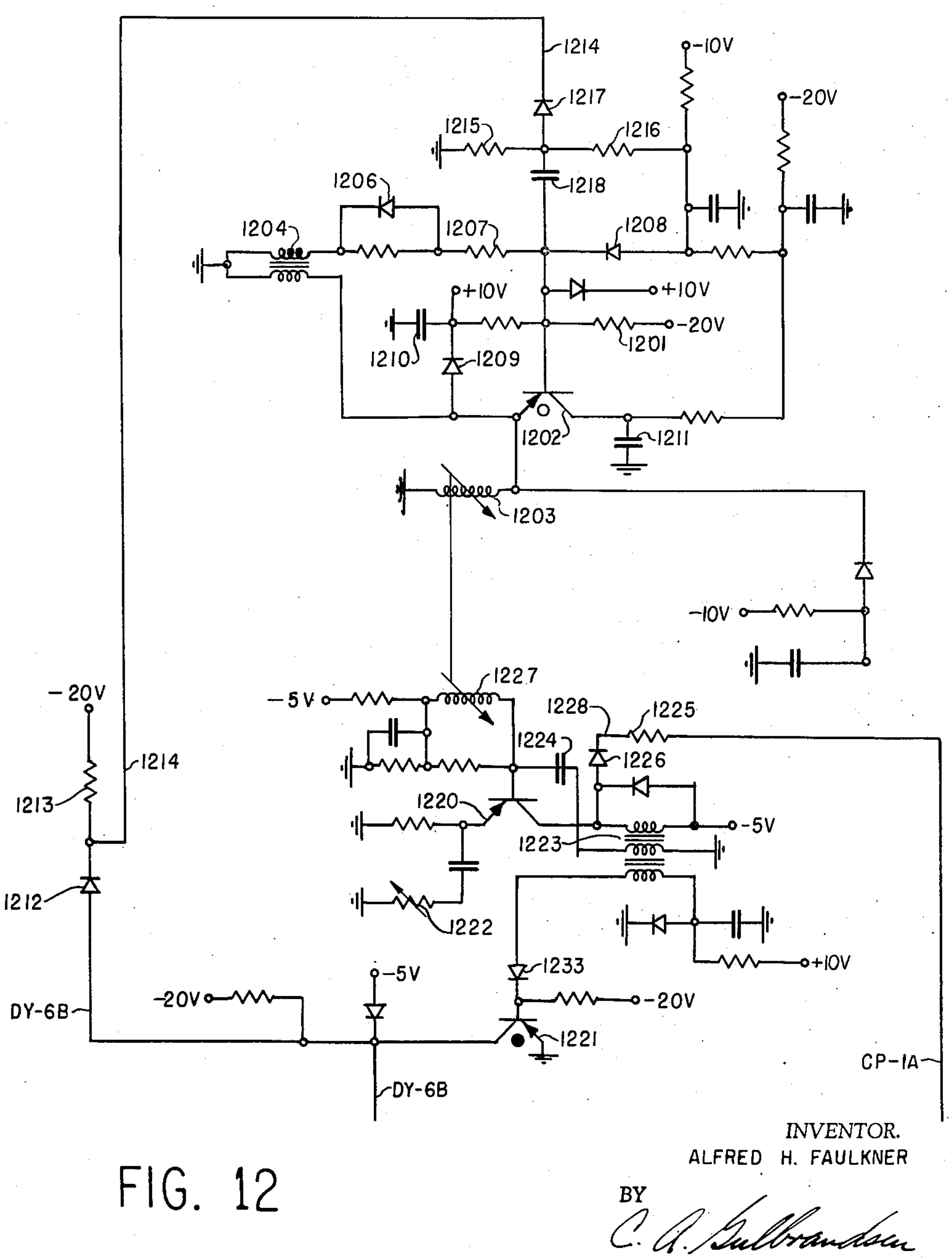

Referring to FIG. 11, assume that transistor 1101 is saturated as it is when the sequence switch is in its home position. The negative potential on the collector of transistor 1101 causes all diodes connected to the collector to be cut-off.

A negative 10 volt pulse approximately 80 microseconds in duration on the input lead IN causes transistor 1101 to drop below −10 volts thereby cutting off transistor 1101. The collector of transistor 1101 therefore rises from approximately −10 volts to near ground potential.

Capacitor 1102 discharges and charges in the opposite direction thereby creating a positive direction pulse which is applied to transistor 1103 at its base causing it to saturate. This pulse does not affect the other stages associated with transistors 1104 to 1106 since the diodes 1108 to 1110 connecting lead IN with the base circuits of each transistor are cut-off.

Upon saturation the collector of transistor 1103 drops to a potential of approximately −10 volts. A negative direction pulse is thereby transmitted through capacitor 1111 to transistor 1104 at its base but it is already cut-off so the negative pulse has no effect.

The negative potential on the collector of transistor 1103 of approximately −10 volts causes off normal lead coupling diode 1112 to conduct thereby dropping the potential on lead ON from ground to approximately −10 volts. At the same time diodes 1113 to 1116 conduct thereby maintaining the base voltages on all but the saturated transistor 1103 at a sufficiently negative potential to assure that all other stages are cut-off. As can be seen the input lead IN is also blocked from all but transistor 1103.

It can now be seen that the first pulse on input lead IN causes −10 volts to be placed on lead ON and lead UA.

When a second pulse occurs a similar action takes place and transistor 1103 is cut-off and transistor 1104 saturates. Therefore −10 volts is removed from lead UA and ground placed thereon and ground removed from lead BT and −10 volts placed thereon. It can also be seen that lead ON still has −10 volts thereon and shall continue to have −10 volts thereon until the sequence switch is in its home position that being when transistor 1101 is saturated.

A third pulse on input lead IN will cause −10 volts to be removed from lead BT and placed on lead ST–2 in the manner described.

A similar switching will occur with the next pulse on lead IN but the fifth position is not used in this system and instead of one pulse on lead IN two pulses occur thereby advancing the sequence switch through its fifth position back to its first position where −10 volts appears on lead N but as can be observed there is no diode similar to diode 1112 to place −10 volts on lead ON thereby removing −10 volts from lead ON and placing ground thereon. Thus the cycle of operation of the sequence switch has been completed.

When power is first applied to this circuit, or when one voltage is removed and again applied to the circuit, it becomes necessary to provide a means for preventing more than one stage from saturating at a time and causing a free running action. Capacitors 1117 and 1118 are provided for this purpose. When power is applied, a negative pulse through capacitors 1117 and 1118 cause a negative pulse to be applied to the base of all transistors through the coupling capacitors 1102, 1111 etc. causing all transistors to cut-off. At the end of the pulse one transistor saturates and the circuit is in its operating condition.

*Link Transmission Circuit*

As has been stated, the link is composed of three units, the link finder, the connector, and the link transmission circuit. In order to understand the method of transmission of intelligence in this system reference must be made to the section titled "Transmission" wherein the overall transmission is explained.

It is the intention of the applicant to explain the details of the sub-units of the "Link Transmission Circuit" at this point, or indicate where an explanation may be found.

*Gate G–12*

Gate G–12 is an "or" gate and consists of diodes 835, 836, and 837.

*Gates SG–1, SG–2, and SG–3*

Supervisory signal gate SG–2 is explained in detail in the section titled "Supervisory Signal Gates." Gate SG–1 consists of resistors 843 and 844 and its operation is very similar to the operation of gate SG–2 described in the section titled "Supervisory Signal Gates" and will become clear after reference to the aforementioned section. Gate SG–3 consists of resistors 845 and 846 and diode 847 and is also very similar to the operation of gate SG–2 and its operation will become clear after reference to the section titled, "Supervisory Signal Gates."

*Negative Impedance Repeater*

The negative impedance repeater which is shown in detail in FIG. 7 performs the function of amplifying the signals on capacitors 727 and 726, thereby compensating for the transmission loss of the system.

The active ((feed back) portion of a repeater of this kind is usually referred to as a "negative impedance converter" because in effect it converts the positive impedance of "gain adjusting network" 756 into a negative impedance. This negative impedance is inserted in series with the positive impedance of the line, i.e. the transmission path of the link, by the coupling afforded by input transformer 752. The voice frequency gain characteristic of the repeater is determined by this impedance.

The negative impedance repeater shown in FIG. 7 is of the series type (open-circuit stable type) and is generally similar to the series type repeater described in the article, "Two New Negative-Impedance Voice-Frequency Repeaters" by R. P. Dimmer which appeared in the December 1955 issue of the Automatic Electric Technical Journal, except that a somewhat different feed back arrangement is used. Briefly the negative impedance repeater, FIG. 7, operates as follows:

A signal from the calling line appearing on capacitor 727 is coupled to the emitter of transistors 753, 754 in push-pull fashion. Practically all the emitter current going into either transistor, depending on whether the positive or negative portion of the input signal is received, flows out of its collector into the load, developing a voltage across it. This voltage is cross-coupled by transformer 755 back to the base of the opposite transistor, and to the input terminals practically undiminished because of the low impedance of the operating transistor between emitter and base. Therefore, the voltage back to the input is practically the negative of the voltage across the load, and the negative of the load impedance appears at the input. The base voltages appear at the emitters because the transistors behave essentially like cathode followers. Note that the current enters the first transistor and leaves from the emitter of the second transistor, and vice versa, so that this repeater is acting essentially as a generator.

*Amplifier A–6*

Amplifier A–6 consists of transistor 848, and resistors 842, 849, 850, 851, and 852. As is stated in the section titled "Supervisory Signal Gates" lead SGB and hence the base of transistor 848 has approximately −1 volt normally thereon and this is due to the slight reverse current in the base circuit. Therefore the transistor can be considered to be cut-off.

When either gate SG–1, SG–2, or SG–3 passes a supervisory signal thereto approximately −5 volts appears on lead SGB, as explained in the last-mentioned section, with a supervisory signal imposed thereon. This signal is therefore amplified, since it turns transistor 848 on, and applied to the gain adjusting network of the negative impedance repeater (shown at the right-hand end of the dot-dash line rectangle so labeled in FIG. 7). From the negative impedance repeater the signal is impressed on the condenser 727 of the transmission circuit and from there transmitted to the calling party.

*Transmission Gates TG–1 and TG–2*

It is deemed preferable that the operation of these gates be described in conjunction with the whole of the transmission system and an explanation thereof will be found in the section titled "Transmission."

*Supervisory Signal Gates*

Gate SG–2 is typical of this class of circuits, which are employed to connect a tone signal source to the speech transmission circuit at appropriate times. A high degree of attenuation is required when the tone signal is not in use to prevent objectional background noise in the transmission circuit.

The gate SG–2 chosen by way of example consists of resistors 839 and 840 and diode 841 and is a form of an "and" circuit and is used to return busy tone to a calling subscriber in the event the called party's line is in use. This condition is indicated by −10 volts placed on lead BT by the sequence switch and on lead FF5–1 by flip-flop FF5. The busy tone generator, producing a signal level in the order of two volts, is connected to lead BST and is returned to ground at the source.

Normally both leads BT and FF5–1 are at ground potential. When this occurs the tone signal at point 838, that being the output of gate SG–2, is attenuated to about 0.5 volt. Since the output of gate G–12 is connected to lead SGB which has a potential of about −1 volt normally placed thereon, diode 836 of gate G–12 is reversed biased hence the tone signal transmitted to lead SGB is negligible. Furthermore, this lead connects to the input of a normally cut-off transistor amplifier in the transmission circuit amplifier A–6.

With −10 volts on both leads BT and FF5–1 the point 838 rises to an average value of about −5 volts, being limited to this value by a resistor 842 which is connected to point 838 through diode 836. The tone signal is superimposed on the −5 volt output and is fed to the amplifier A–6 circuit. Amplifier A–6 is turned on by the change in D.C. level on lead SGB and amplifier A-6 amplifies the superimposed tone signal and feeds it to the transmission circuit, as explained in the section titled, "Transmission."

The transistor pulse distributor shown herein in FIGS. 16 and 17 has been claimed in a copending divisional application Serial No. 794,610, filed February 20, 1959. The tone ringing arrangement including the ringing generator disclosed herein in FIG. 13 has been claimed in another copending divisional application Serial No. 794,619 filed February 20, 1959. The electronic switching system features relating to the sequence switch and sequence switch driver and associated circuits has been claimed in still another copending divisional application, now Patent No. 2,938,961.

What is claimed is:

1. In a time division multiplex communication system, a first group of transimission paths, a second group of transmission paths, a transmission channel between and common to said paths, first and second groups of gates, each gate interposed between its respective transmission path and the common channel, means for applying a train of enabling pulses of one polarity to one of said first-group gates and for applying, coincidently therewith, a train of enabling pulses of the opposite polarity to one of said second-group gates, means responsive to said respective trains of enabling pulses for causing potentials at the said ones of the first-group and second-group gates to change in opposite sense during a pulse interval, means including voltage control means interposed in said channel for substantially interrupting said changes of potential responsive to reaching an equilibrium point at which the potential difference between said ones of the gates is substantially equal in value and opposite in polarity to the potential introduced into said channel by said voltage control means.

2. In a time division multiplex communication system, the combination according to claim 1, wherein each of said paths has impedance means connected thereto, said potentials at said gates are developed across said impedance means, said means for interrupting the changes of potential comprises means for permitting current to flow over said common channel, and signal coupling means for shifting in accordance with an impressed signal the time position in the pulse interval at which said equilibrium point is reached.

3. In a time division multiplex communication system, the combination according to claim 2, wherein said impedance means connected to each path comprises a capacitor, and said change of potential at each of said one first-group gate and said one second-group gate is produced by pulse current from the corresponding means for applying enabling pulses to change the charge on the corresponding capacitor.

4. In a time division multiplex communication system the combination according to claim 3, wherein each of said gates includes rectifier means, the rectifier means in said first-group gates and said second-group gates being oppositely poled and so arranged that each provides two possible circuit paths for the corresponding enabling pulse, the first circuit path including the corresponding capacitor and the second including the common channel and the coincidently enabled gate at the other end thereof, whereby the potentials of the corresponding pair of first-group and second-group capacitors are caused to change, responsive to each corresponding pair of said enabling pulses, in opposite directions, by current flow in the first circuit path of each, until said equilibrium point is reached and the current flow is diverted over the second circuit path, and said signal coupling means comprises two-way signal coupling means connected to said transmission paths for shifting, in accordance with a signal impressed on one of said transmission paths, said time position in the pulse interval at which said equilibrium point is reached, whereby the mean potentials on both corresponding capacitors are caused to follow said signal for two-way transmission of intelligence over said common channel.

5. In a time division multiplex communication system the combination according to claim 4, wherein said transmission channel comprises a conductor, and said voltage control means comprises a constant voltage diode serially connected in said conductor.

6. In a time division multiplex communication system the combination according to claim 4, a plurality of line circuits individually terminating substations, each line circuit including a transmission path of said first group and its corresponding gate and signal coupling means, the signal coupling means being connected between the transmission path and the substation; said means for applying trains of enabling pulses comprising means for generating a plurality of trains of control pulses, all said control pulse trains having the same repetition rate but each being generated in a time slot different from that of the other pulse trains, a plurality of devices individually connected to each of said gates, and a plurality of control circuits individually connected to each of said devices, each device being responsive to control pulses on its control circuit to apply enabling pulses in the same time slot to its associated gate; means operated responsive to the initiation of a call at a first of said substations for applying a first of said control pulse trains by way of one of said control circuits to the device of a first of said first-group gates corresponding to said first substation and for simultaneously applying said first control pulse train to the device of a first of said second-group gates by way of the control circuit connected thereto, to thereby enable said first first-group gate and said first second-group gate for two-way transmission between their corresponding transmission paths.

7. In a time division multiplex communication system the combination according to claim 6, means for coupling supervisory tone signals to the transmission path of said first second-group gate for transmission to said calling substation via a circuit including said multiplex connection through said first second-group gate and said first first-group gate.

8. In a time division multiplex communication system the combination according to claim 6, wherein each of said devices comprises a transistor having emitter, base and collector electrodes connected in a grounded emitter configuration, with its base electrode connected to its said control circuit, and its collector electrode connected to the corresponding said gate.

9. In a time division multiplex communication system the combination according to claim 6, means controlled by the transmission of digital impulses from said calling substation for applying a second of said control pulse trains by way of a second of said control circuits to the device of a second of said first-group gates corresponding to the called substation, and for simultaneously applying said second control pulse train to the device of a second of said second-group gates by way of the control circuit connected thereto; to thereby enable said second first-group gate and said second second-group gate for two-way transmission between their corresponding transmission paths, and means including the transmission paths and signal coupling means of said first and second second-group gates for transferring any change of potential from one of the two capacitors connected to these second-group gates to the other, whereby a signal transmitted from either said calling or called substation is transmitted as a series of voltage variations to the simultaneously-pulsed second-group gate and capacitor, and thereafter retransmitted from the other pulsed second-group gate and capacitor to the other of said calling or called substations.

10. In a time division multiplex communication system the combination according to claim 9, wherein said transmission channel comprises a conductor, and said voltage control means comprises a constant voltage diode serially connected in said conductor.

11. In a time division multiplex communication system the combination according to claim 10, a plurality of link circuits, a first of said link circuits comprising said first and second second-group gates and their corresponding transmission paths and signal coupling means, and the other link circuits comprising similar pairs of second-group gates.

12. In a signalling system, a transmission channel having a first and a second end, signal transmitting means and a first capacitor coupled to the first end of said channel, signal receiving means and a second capacitor coupled to the second end of said channel, a first source of substantially constant current of one direction coupled to the juncture of said first capacitor with said first-channel end, a second source of substantially constant current of the opposite direction coupled to the juncture of said second capacitor with said second-channel end, means for activating said current sources only during predetermined intervals, means whereby said signal transmitting means determines the charge on said first capacitor at the beginning of each of said intervals, means operative initially during each of said intervals to cause the outputs of said current sources to be delivered to said respective capacitors to change the potentials thereof in opposite directions, means including voltage control means interposed in said channel for diverting the outputs of said current sources over said channel responsive to the potential difference between said capacitors becoming substantially equal in value and opposite in polarity to the potential introduced into said channel by said voltage control means to thereby interrupt said change of potential across each capacitor, and means whereby the voltage across said signal receiving means is determined by the charge on said second capacitor after said diversion of the output currents.

13. In a signalling system the combination according to claim 12, wherein said transmission channel comprises a conductor, and said voltage control means comprises a constant voltage diode serially connected in said conductor.

14. In a time division multiplex telephone system, a plurality of substations, a plurality of line circuits individually connected to said stations, a common channel comprising a conductor for voice transmission and a separate conductor for the transmission of on-off hook supervisory signals, a plurality of first-end voice-transmission gates interposed between the first end of said voice-transmission conductor and the corresponding ones of said line circuits, and a second-end voice-transmission gate connected to the second end of said voice-transmission conductor, a plurality of first-end supervisory-signal gates interposed between the first end of said supervisory-signal conductor and the corresponding ones of said line circuits, and a second-end supervisory-signal gate connected to the second end of said supervisory-signal conductor, control means for applying a train of enabling pulses to said first-end gates corresponding to a predetermined one of said substations and for simultaneously applying a train of enabling pulses to said second-end gates, impedance means respectively connected to said voice-transmission gates and respectively operated responsive to the pulses simultaneously applied thereto for causing the potentials at the first end and second end respectively of said voice-transmission conductor to change in opposite sense until said potentials have reached a point permitting the flow of current from one of the two voice-transmission gates over said voice-transmission conductor into the other voice-transmission gates, two-way voice-signalling coupling means connected to said first-end and second-end voice-transmission gates for shifting, in accordance with a voice signal impressed thereon the moment in the pulse cycle at which said point is reached, whereby the mean potentials on both corresponding impedance means are caused to follow said voice signal for two-way voice transmission over said voice-transmission conductor, and supervisory-signal transmitting and receiving means respectively connected to said first-end and second-end supervisory-signal gates, thereby permitting one-way transmission of supervisory signals over said supervisory-signal conductor.

15. A transmission circuit arrangement for a time division multiplex telephone system, comprising a first-group of transmission paths, a second-group of transmission paths, a transmission channel between and common to said paths, a first group of transmission gathes individually connected to said first-group transmission paths and interposed between said first-group paths and said channel, a second group of transmission gates individually connected to said second-group transmission paths and interposed between said second-group paths and said channel, a group of control conductors individually connected to said transmission gates, means for applying an enabling pulse to a predetermined first-group gate by way of its corresponding control conductor and for simultaneously applying an enabling pulse to a predetermined second-group gate by way of its corresponding control conductor, means at each of said predetermined gates operated responsive to said enabling pulses to cause a change of potential at said predetermined gates, the change of potential at said predetermined first-group gate being opposite in sense to the change of potential at said predetermined second-group gate, means including voltage control apparatus in said transmission channel for blocking said potential change when a predetermined relative potential exists between said first and second predetermined gates, and signal coupling means connected to said first and second group transmission paths for shifting, in accordance with a signal impressed on one of said transmission paths, the moment in the pulse cycle at which said predetermined relative potential is reached, whereby two-way signal transmission is provided over said common transmission channel.

16. A transmission circuit arrangement for a time division multiplex telephone system as claimed in claim 15, wherein said blocking means is rendered effective at the approximate time center of said enabling pulses when no signal is being transmitted between said first and second group transmission paths.

17. A transmission circuit arrangement for a time division multiplex telephone system as claimed in claim 16, wherein said signal coupling means is responsive to receipt of an input signal over the corresponding transmission path for causing said predetermined relative potential to be reached at a time removed from said time-center, the potential change at the other of said predetermined gate circuits being thereby varied in direct proportion to said input signal.

18. A transmission circuit arrangement for a time division multiplex system as claimed in claim 17, wherein said means at each of said predetermined gates for causing a change of potential thereat comprises a capacitor, the capacitor at one of said predetermined gates being charged while the capacitor at the other of said predetermined gates is discharged.

19. A transmission circuit arrangement for a time division multiplex system as claimed in claim 15, wherein each of said enabling-pulse applying means includes a transistor circuit, said first-mentioned enabling pulse being produced in the output circuit of a transistor of one conductivity type and said second-mentioned enabling pulse being produced in the output circuit of a transistor of the opposite conductivity type.

20. A transmission circuit arrangement for a time division multiplex system as claimed in claim 15, wherein said voltage control apparatus comprises a constant voltage diode, said diode connected in said common transmission channel so as to cause said relative potential between said first and second predetermined gates when no signal is being transmitted between them to be opposite in polarity to the potential existing between said first and second predetermined gates at the beginning of said enabling pulse.

21. In a signalling system, a transmission channel having a first and a second end, signal transmitting means connected to the first end of said channel, signal receiving means connected to the second end of said channel, a first source of substantially constant current of one direction connected to the juncture of said transmitting means with said first channel end, a second source of substantially constant current of the opposite direction connected to the juncture of said receiving means with said second-channel end, a voltage control device interposed in said transmission channel, the voltage of said device being of a polarity such as to oppose the flow of current from one of said constant current sources into the other, said signal transmitting means determining the quantity of electricity permitted to flow from one of said junctures to the other over said transmission channel, and the voltage across said signal receiving means being determined by said quantity of electricity.

22. In a telephone system employing time division multiplex apparatus, a plurality of substations, a line circuit for each of said substations, a pulse distributor having a plurality of output leads, each connected to one of said line circuits, means in said distributor for generating a plurality of pulse trains, each train in a different time slot and each transmitted over a different one of said output leads, a scanner, a delay line connected to and controlled by the output pulses of said scanner, a switching circuit, a normally closed gate circuit in each of said line circuits, means in the line circuit corresponding to a calling one of said substations operated responsive to the coincidence of the scanner pulses transmitted through said delay line and the distributor pulses received by said calling line circuit at the time that said call is initiated to transmit a pulse to said switching circuit in the time slot of said calling line, said switching circuit being thereafter effective to disconnect said delay line from said scanner and cause it to recirculate a pulse in the last-mentioned time slot.

23. In a telephone system employing time division multiplex apparatus as claimed in in claim 22, wherein the output pulses of said scanner are spaced by an interval differing at least by one time slot from the length of the multiplex pulse frame.

24. In a time division multiplex telephone system, a plurality of subscriber circuits; a pulse distributor having a plurality of output circuits individually connected to said subscriber circuits; means in said distributor for generating a continuous train of pulses and distributing said pulses to successive ones of said output circuits, thereby transmitting pulse trains in different time slots but of the same pulse repetition rate to said subscriber circuits, a scanner circuit having an output circuit; a delay line having input and output circuits, a pulse received at said delay-line-input-circuit appearing in said delay-line output-circuit after a time delay equal to a multiplex pulse frame; a normally open first gate circuit connected between said scanner output and delay-line-input circuits; means in said scanner circuit for generating pulses having a time spacing greater than the width of said frame; circuit means connected between said delay-line-output circuit and said substations whereby pulses appearing in said delay-line output circuit are transmitted to said substations; a switching circuit connected to said subscriber stations; a normally closed second gate circuit connected between said delay-line-input and delay-line-output circuits; and means in a call-initiating one of said subscriber stations operated responsive to the coincidence of a pulse-distributor pulse and scanner pulse thereat, for operating said switching circuit to thereby close said first gate circuit and open said second gate circuit, whereafter said scanner pulses are blocked from said delay line input circuit and pulses appearing in said delay line output circuit are transmitted through said second gate circuit to said delay line input circuit, pulses in the delay-line output circuit being thereafter recirculated through said delay line and thereby generated in synchronism with the pulse distributor pulses corresponding to the said calling subscriber stations.

25. In a time division multiplex telephone system the combination as claimed in claim 24, further including a normally closed transmission gate connected to said delay-line output circuit; a common transmission channel interconnecting said transmission gate and all of said subscriber stations; and means operated responsive to said synchronized pulses for transmitting signals between said transmission gate and said calling substation by way of said channel.

26. In a telephone system employing time division multiplex apparatus, with a plurality of gating units which may be enabled by trains of pulses having a given pulse repetition rate but which may occur in different time slots, a source of supervisory signals comprising a series of impulses, a register arrangement for generating a train of repetitive pulses and for selectively causing said pulses to appear in a time slot in accordance with said supervisory signals; said arrangement comprising a first delay line having an input circuit and an output circuit, a normal recirculating path including one gate circuit connected from said output circuit to said input circuit, means for introducing a pulse through the input circuit into the first delay line, which is then continuously recirculated from said output to said input circuit by way of said normal recirculating path, so that a train of pulses is produced in said output circuit with a pulse repetition rate corresponding to the delay of said first delay line, a second path including in series combination another gate circuit and a second delay line, said series combination being connected from said output circuit to said input circuit in parallel with said first path, switching means controlled by said supervisory signals to block said one gate in the first path and enable said other gate in the second path in response to each impulse of said supervisory signals to thereby cause the pulses produced in the output of the first delay line to be delayed by said second delay line, and a circuit connection from the output of said second delay line to said switching means for causing the switching means to re-enable the one gate circuit in the first path and inhibit the other gate circuit in the second path in response to the pulse appearing in the output of said second delay line, to thereby delay the pulses in said pulse train by an increment of time equal to the delay of said second delay line for each impulse of the supervisory signals.

27. A device for generating a train of pulses comprising a delay line having an input circuit and an output circuit; a normally open first gate circuit for normally transmitting therethrough a pulse to said input circuit; a normally closed second gate circuit connected between said input and output circuits, so that the input circuit, the delay line, the output circuit, and the second gate circuit form a loop in which pulses are normally blocked at the second gate circuit; a switching circuit connected to said first and second gate circuits for closing said first gate circuit while opening said second gate circuit so as to cause said pulse to be continuously recirculated from said output to said input circuit by way of said second gate circuit, whereby a train of pulses is produced in said output circuit with a pulse repetition rate corresponding to the delay of said delay line; a normally closed third gate circuit and a second delay line in series with and controlled by said third gate circuit, the last-mentioned series combination being connected in parallel with said second gate circuit; a second switching circuit connected to and controlling said second and third gate circuits; and means for operating said second switching circuit to open said third gate circuit and close said second gate circuit, thereby causing the pulses produced in the output of the first delay line to be delayed by said second delay line.

28. A device as claimed in claim 27, comprising a circuit connection between the output of said second delay line and said second switching circuit, said second switching circuit being returned to normal over said circuit connection to thereby restore said second and third gate circuits to their respective normal conditions responsive to the pulse appearing in the output of said second delay line, the operation of said second switching circuit being thereby effective to delay the pulses in said pulse train by an increment of time equal to the delay of said second delay line.

29. In a time-division multiplex telephone system, a plurality of lines each terminated by a line circuit, a common transmission channel having a high impedance compared to that of the lines, a transmission gate individual to each line circuit and interposed between said line circuit and said common channel, a plurality of connecting units each including an individual transmission gate connected to said common channel, means for selectively applying trains of recurring enabling pulses to said transmission gates to establish a plurality of effective two-way communication connections in separate time slots over the common channel, each connection extending between a line circuit and a connecting unit through the corresponding transmission gates each said line circuit also comprising a transistor in emitter-follower connection and having its emitter connected to the corresponding line and its base connected to the corresponding transmission gate, said transistor providing a current gain between its base circuit and its emitter circuit thereby to act as an impedance converter.

30. In a time-division multiplex telephone system, a plurality of lines each terminated by a line circuit, a two-way transmission channel common to said line circuits and having a high impedance compared to that of the lines, a transmission gate individual to each line circuit and interposed between said line circuit and said common channel, a plurality of connecting units each including an individual transmission gate connected to said common channel, means for selectively applying trains of recurring enabling pulses to said transmission gates to establish a plurality of effective two-way communication connections in separate time slots over the common channel, each connection extending between a line circuit and a connecting unit through the corresponding transmission gates, each said line circuit also comprising a transistor in common collector connection and having its emitter connected to the corresponding line and its base onnected to the corresponding transmission gate, said transistor providing a current gain between its base circuit and its emitter circuit, thereby to act as an amplifier and impedance converter in the channel-to-line direction of transmission, and a circuit element of relatively low impedance by-passing the emitter-base path of said transistor to facilitate line-to-channel transmission.

31. In a two-way communication system, two communication paths of relatively low impedance, a communication path of relatively high impedance between said low impedance paths, and two impedance converters each interposed between said high-impedance path and the corresponding low-impedance path, each said impedance converter comprising a transistor in common collector connection and having its base connected to said high-impedance path and its emitter to the corresponding low-impedance path, and a circuit element of comparatively low impedance by-passing the emitter-base path of each said transistor, the power loss due to the impedance mismatch at one end of said high impedance path being compensated by the power gain in the impedance converter at the other end of the last-mentioned path.

References Cited in the file of this patent

UNITED STATES PATENTS

| | | |
|---|---|---|
| 2,490,833 | Ransom | Dec. 13, 1949 |
| 2,619,548 | Lesti | Nov. 25, 1952 |
| 2,691,073 | Lowman | Oct. 5, 1954 |
| 2,731,512 | Levy | Jan. 17, 1956 |
| 2,753,403 | Carraciolo | July 3, 1956 |
| 2,773,934 | Trousdale et al. | Dec. 11, 1956 |
| 2,830,120 | Trousdale | Apr. 8, 1958 |
| 2,831,110 | Trousdale | Apr. 15, 1958 |
| 2,837,605 | Hochgrab et al. | June 3, 1958 |
| 2,844,718 | Guerin et al. | July 22, 1958 |
| 2,870,259 | Norris | Jan. 20, 1959 |